(12) United States Patent
Horie et al.

(10) Patent No.: US 11,637,334 B2
(45) Date of Patent: Apr. 25, 2023

(54) CELL SYSTEM

(71) Applicant: APB Corporation, Tokyo (JP)

(72) Inventors: Hideaki Horie, Tokyo (JP); Yasuhiro Shindo, Kyoto (JP); Yusuke Mizuno, Kyoto (JP); Ryosuke Kusano, Kyoto (JP); Yuki Nekohashi, Kyoto (JP); Yusuke Nakashima, Kyoto (JP); Kotaro Nasu, Kyoto (JP); Naoya Omae, Kyoto (JP)

(73) Assignee: APB CORPORATION, Tokyo (JP)

( * ) Notice: Subject to any disclaimer, the term of this patent is extended or adjusted under 35 U.S.C. 154(b) by 0 days.

(21) Appl. No.: 17/289,621

(22) PCT Filed: Dec. 14, 2020

(86) PCT No.: PCT/JP2020/046622
§ 371 (c)(1),
(2) Date: Apr. 28, 2021

(87) PCT Pub. No.: WO2021/117908
PCT Pub. Date: Jun. 17, 2021

(65) Prior Publication Data
US 2021/0313632 A1    Oct. 7, 2021

(30) Foreign Application Priority Data

Dec. 12, 2019 (JP) .................... 2019-224866
Dec. 12, 2019 (JP) .................... 2019-224886
(Continued)

(51) Int. Cl.
*H01M 10/613*    (2014.01)
*H01M 10/6564*   (2014.01)
(Continued)

(52) U.S. Cl.
CPC ......... *H01M 10/613* (2015.04); *H01M 4/668* (2013.01); *H01M 10/0525* (2013.01);
(Continued)

(58) Field of Classification Search
CPC .................... H01M 10/613; H01M 50/209
See application file for complete search history.

(56) References Cited

U.S. PATENT DOCUMENTS 6,114,059 A    9/2000  Watanabe et al.
6,632,538 B1 * 10/2003 Yamazaki .......... H01M 50/178
                                                  429/254
(Continued)

FOREIGN PATENT DOCUMENTS

CN    110061325    *  7/2019
CN    110061325 A  *  7/2019
(Continued)

OTHER PUBLICATIONS

International Search Report, issued by International Searching Authority in corresponding International Application No. PCT/JP2020/046622, dated Jan. 26, 2021.
(Continued)

*Primary Examiner* — Ula C Ruddock
*Assistant Examiner* — Thomas H. Parsons
(74) *Attorney, Agent, or Firm* — ArentFox Schiff LLP

(57) ABSTRACT

A cell system includes: a stacked-type cell module (100) having a plurality of lithium ion unit cells (1) being stacked and having through holes (3a, 3b) formed therein; a gas supply part (31); a cooling liquid supply part (32); a temperature sensor (35); and a control part (36) that controls switching between a normal control mode and a high-temperature control mode based on a signal from the temperature sensor (35). In the normal control mode, the control part (36) controls the gas supply part (31) to supply a gas to
(Continued)

the through holes (3a, 3b), and at the same time, controls the cooling liquid supply part (32) to stop supply of a cooling liquid, and in the high-temperature control mode, the control part (36) controls the cooling liquid supply part (32) to supply the cooling liquid to the through holes (3a, 3b) to which the gas is supplied, and at the same time, controls the gas supply part (31) to stop supply of the gas. According to this cell system, the increase in temperature of the cell is suppressed while having a simple configuration with a reduced formation region of through holes provided in a lithium ion cell.

14 Claims, 22 Drawing Sheets

(30) Foreign Application Priority Data

| Jan. 28, 2020 | (JP) | 2020-011851 |
|---|---|---|
| Jan. 28, 2020 | (JP) | 2020-011852 |

(51) Int. Cl.
*H01M 10/6567* (2014.01)
*H01M 50/209* (2021.01)
*H01M 4/66* (2006.01)
*H01M 10/0525* (2010.01)
*H01M 10/48* (2006.01)

(52) U.S. Cl.
CPC ..... *H01M 10/486* (2013.01); *H01M 10/6564* (2015.04); *H01M 10/6567* (2015.04); *H01M 50/209* (2021.01)

(56) References Cited

U.S. PATENT DOCUMENTS

| 7,097,937 | B2* | 8/2006 | Fredriksson | H01M 10/0413 |
| | | | | 429/210 |
| 8,512,890 | B2* | 8/2013 | Xie | H01M 50/545 |
| | | | | 429/120 |
| 8,617,735 | B2* | 12/2013 | Lee | H01M 10/6563 |
| | | | | 429/120 |
| 10,103,397 | B2* | 10/2018 | Kwon | H01M 12/08 |
| 2020/0243867 | A1* | 7/2020 | Kusano | H01M 10/052 |
| 2020/0274125 | A1 | 8/2020 | Okura et al. | |

FOREIGN PATENT DOCUMENTS

| JP | H11-073984 | A | | 3/1999 |
| JP | 2007-018753 | A | | 1/2007 |
| JP | 2009-009888 | A | | 1/2009 |
| JP | 2009009888 | | * | 1/2009 |
| JP | 2009009888 | A | * | 1/2009 |
| JP | 2014-125094 | A | | 7/2014 |
| JP | 2014-127338 | A | | 7/2014 |
| JP | 2017-134887 | A | | 8/2017 |
| JP | 2018-125213 | A | | 8/2018 |
| JP | 2019-053877 | A | | 4/2019 |

OTHER PUBLICATIONS

Written Opinion, issued by International Searching Authority in corresponding International Application No. PCT/JP2020/046622, dated Jan. 26, 2021.

* cited by examiner

F I G. 23
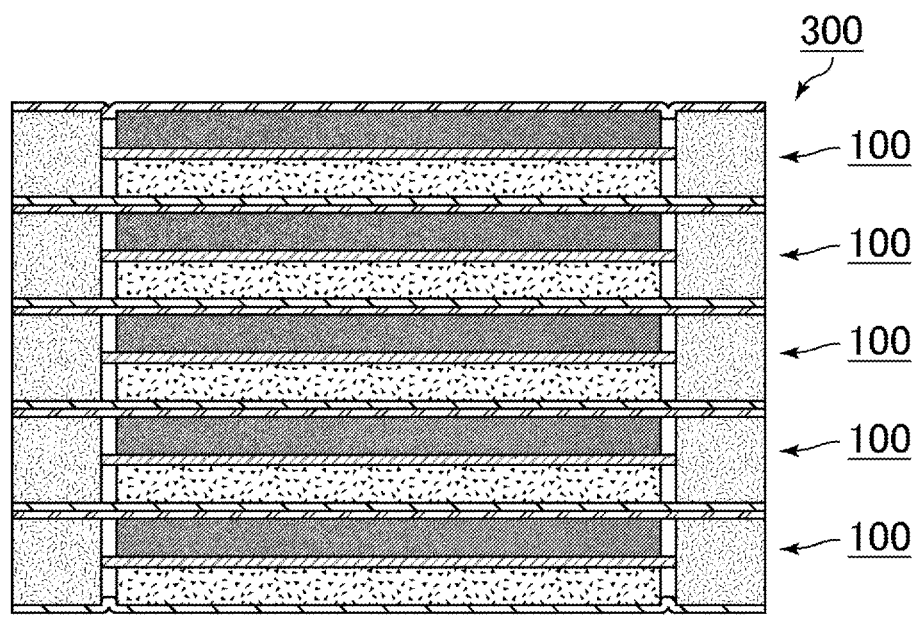
F I G. 24
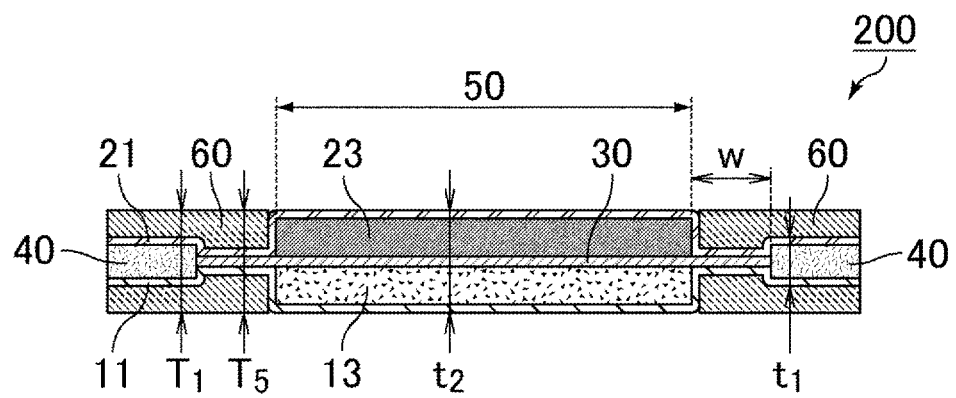

A-A LINE CROSS-SECTIONAL VIEW

F I G. 35
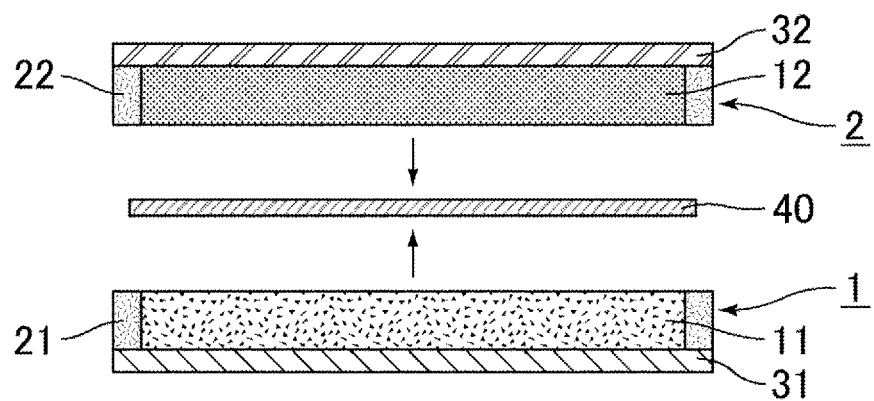

CELL SYSTEM

CROSS-REFERENCE TO RELATED APPLICATIONS

The present application is a National Stage entry of International Application No. PCT/JP2020/046622, filed on Dec. 14, 2020, which claims priority to Japanese Patent Application No. 2019-224866, filed Dec. 12, 2019, Japanese Patent Application No. 2019-224886, filed Dec. 12, 2019, Japanese Patent Application No. 2020-011851, filed Jan. 28, 2020, and Japanese Patent Application No. 2020-011852, filed Jan. 28, 2020. The disclosures of the prior applications are incorporated herein by reference in their entirety.

TECHNICAL FIELD

The present invention relates to a cell system including a stacked-type cell module in which a plurality of lithium ion unit cells are stacked.

BACKGROUND ART

Conventionally, cells such as lithium-ion secondary cells have been applied as in-vehicle batteries, for example. The lithium-ion secondary cells generate heat due to their internal resistance during the charging and discharging processes, and the amount of heat generated is large in large cells where a large current passes in particular. Therefore, in order to suppress the increase in temperature of the cell, a through hole for air to flow therethrough, which is intended for performing air cooling, and a through hole for cooling water to flow therethrough, which is intended for obtaining a higher cooling effect, have been devised inside the cell.

CITATION LIST

Patent Literature

Patent Literature 1: Japanese Laid-open Patent Publication No. 11-73984
Patent Literature 2: Japanese Laid-open Patent Publication No. 2017-134887
Patent Literature 3: Japanese Laid-open Patent Publication No. 2007-18753
Patent Literature 4: Japanese Laid-open Patent Publication No. 2018-125213
Patent Literature 5: Japanese Laid-open Patent Publication No. 2019-053877.

SUMMARY OF INVENTION

Technical Problem

However, when through holes according to each application are provided inside the cell as in the prior art, the proportion of the region where the through holes are formed inside the cell increases, causing a problem of a decrease in cell capacity. Further, when the through holes according to each application are provided, there is also a problem that the number of components increases, resulting in a complicated configuration if such a configuration as described in Patent Literature 1 is employed in which another component is connected to the through hole (flow path) of the cell.

The present invention has been made in consideration of the above-described problems, and an object thereof is to provide a cell system capable of suppressing the increase in temperature of a cell while having a simple configuration with a reduced formation region of through holes provided in a lithium ion cell.

Solution to Problem

As a result of conducting repeated earnest examinations based on the above findings, the present inventors have devised the following various aspects of the invention.

[1] A cell system includes:
a stacked-type cell module including a plurality of lithium ion unit cells being stacked, the lithium ion unit cells each including: a positive electrode that includes a positive electrode current collector containing a resin current collector layer and a positive electrode active material layer containing a positive electrode active material formed on the positive electrode current collector; a negative electrode that includes a negative electrode current collector containing a resin current collector layer and a negative electrode active material layer containing a negative electrode active material formed on the negative electrode current collector; and a separator arranged between the positive electrode active material layer and the negative electrode material layer, the stacked-type cell module having a through hole penetrating in a stacking direction formed therein;
a gas supply part that supplies a first gas to the through hole;
a cooling liquid supply part that supplies a cooling liquid to the through hole;
a temperature sensor that detects a temperature of the stacked-type cell module; and
a control part that controls switching between a normal control mode and a high-temperature control mode based on a detection signal output from the temperature sensor, in which
in the normal control mode, the control part controls the gas supply part to supply the first gas to the through hole and at the same time, controls the cooling liquid supply part to stop supply of the cooling liquid, and
in the high-temperature control mode, the control part controls the cooling liquid supply part to supply the cooling liquid to the through hole to which the first gas is supplied, and at the same time, controls the gas supply part to stop supply of the first gas.

[2] The cell system according to [1], in which
the normal control mode is a mode to be executed by the control part when the temperature detected by the temperature sensor is in a first range, and
the high-temperature control mode is a mode to be executed by the control part when the temperature detected by the temperature sensor is in a second range that is higher than the first range.

[3] The cell system according to [1] or [2], further includes:
a humidity sensor that detects humidity inside the through hole; and
an air compressor that supplies a second gas into the through hole when switching to the normal control mode from the high-temperature control mode, wherein
the control part controls supply of the second gas from the air compressor based on a detection signal output from the humidity sensor.

[4] The cell system according to [3], in which
the control part supplies the second gas into the through hole from the air compressor when switching to the normal control mode from the high-temperature control mode, and
the control part stops supply of the second gas from the air compressor when determining that the humidity inside the through hole falls within a predetermined range of the humidity of the outside air based on a detection signal output from the humidity sensor.

[5] The cell system according to [3] or [4], in which
the gas supply part also serves as the air compressor, and the first gas and the second gas are the same gas.

[6] The cell system according to any one of [1] to [5], in which
the through hole is a through hole formed in the stacked-type cell module, and
a reinforcing member that covers an inner peripheral surface of the through hole is provided.

[7] The cell system according to any one of [1] to [6], in which
the positive electrode current collector and the negative electrode current collector contain a conductive resin composition having a conductive filler, and
the positive electrode active material layer and the negative electrode active material layer contain coated electrode active material particles made of electrode active material particles having at least a part of surfaces thereof coated with a coating material containing a polymer compound.

[8] The cell system according to any one of [1] to [7], further includes:
a housing part that houses the stacked-type cell module; and
a liquid supply part that supplies a liquid into the housing part, in which
the control part controls switching to an abnormal control mode based on a detection signal output from the temperature sensor, and in the abnormal control mode, the control part controls supply of the liquid from the liquid supply part so as to make the stacked-type cell module submerged.

[9] The cell system according to [8], in which
the liquid supply part includes a liquid cooling tube spirally arranged inside the through hole, and supplies the liquid into the liquid cooling tube.

[10] The cell system according to [9], in which
an arrangement density of the liquid cooling tube is the highest at the center portion inside the through hole.

Advantageous Effects of Invention

According to the present invention, it is possible to suppress the increase in temperature of a cell while having a simple configuration with a reduced formation region of through holes provided in a lithium ion cell.

BRIEF DESCRIPTION OF DRAWINGS

FIG. 23 is a cross-sectional view schematically illustrating one example of a battery pack in which the unit cells illustrated in FIG. 19 are stacked.

FIG. 24 is a cross-sectional view schematically illustrating another example of the unit cell composing the battery pack.

FIG. 35 is a cross-sectional view schematically illustrating one example of a method of preparing one aspect of a lithium ion cell using an electrode for a lithium ion cell.

DESCRIPTION OF EMBODIMENTS

Hereinafter, there will be explained in detail various embodiments of the present invention with reference to the drawings.

First Embodiment

First, as a first embodiment, there will be explained in detail a cell system to cool a heat-generated lithium ion cell with reference to the drawings. This cell system is used as an in-vehicle battery, or the like, for example.

Figure 1A:
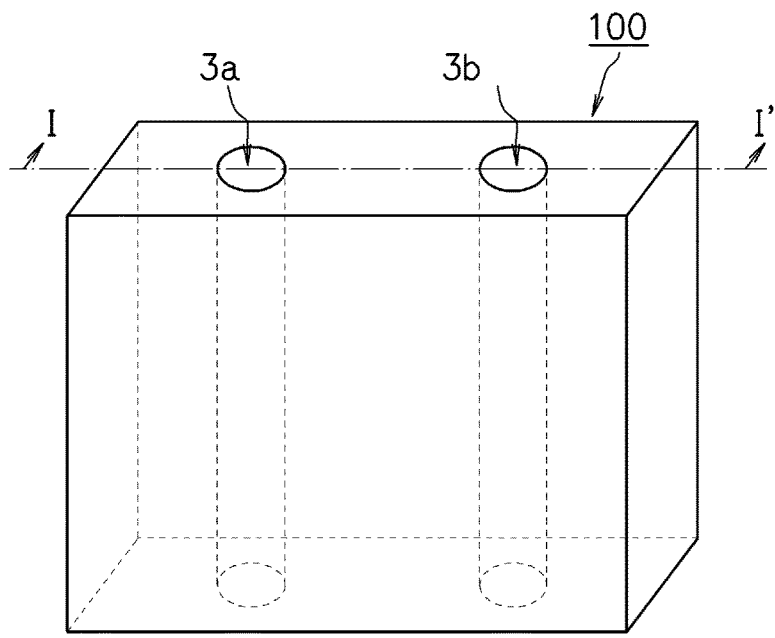
FIG. 1A is a schematic perspective view illustrating a stacked-type cell module to be applied to a cell system according to a first embodiment.
Figure 1B:
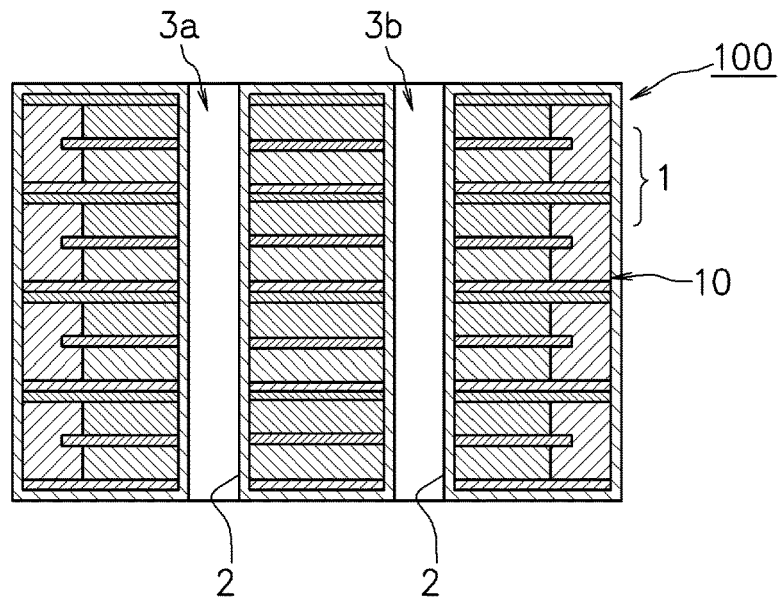
FIG. 1B is a schematic cross-sectional view taken along I-I' of the stacked-type cell module in FIG. 1A.
Figure 1C:
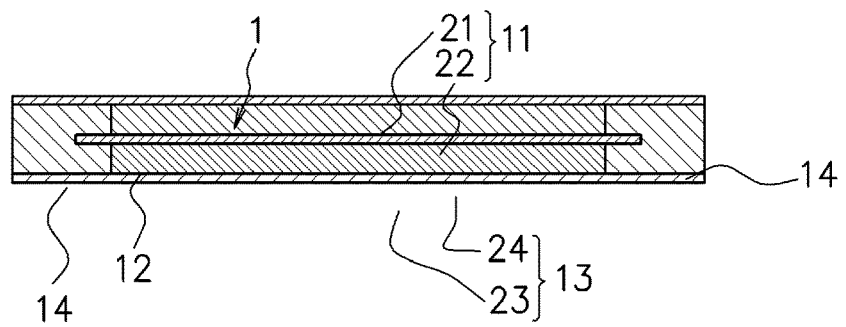
FIG. 1C is a schematic cross-sectional view of, of a lithium ion unit cell, which is a component of the stacked-type cell module to be applied to the cell system according to the first embodiment, a portion where no through holes exist.

FIG. 1A to FIG. 1C are schematic views illustrating a stacked-type cell module to be applied to the cell system according to this embodiment, FIG. 1A is a schematic perspective view, FIG. 1B is a schematic cross-sectional view taken along I-I' in FIG. 1A, and FIG. 1C is a schematic cross-sectional view of, of a lithium ion unit cell, a portion where no through holes exist.

A stacked-type cell module 100 to be applied to the cell system according to this embodiment includes a battery pack 10 in which a plurality of lithium ion unit cells 1 are stacked and connected in series. Incidentally, for convenience of illustration, FIG. 1B illustrates, as an example, a state where four layers of the lithium ion unit cells 1 are stacked, but tens to hundreds of layers of the lithium ion unit cells 1 are stacked in some cases.

The lithium ion unit cell 1 is formed in a manner that a positive electrode 11 and a negative electrode 13 are stacked with a separator 12 arranged therebetween, a sealing portion 14 surrounding and sealing an outer peripheral portion of the positive electrode 11, the separator 12, and the negative electrode 13 is provided, and an electrolytic solution is enclosed within the sealed inside. The positive electrode 11 is formed of a positive electrode resin current collector 21 and a positive electrode active material layer 22 that are stacked. The negative electrode 13 is formed of a negative electrode resin current collector 23 and a negative electrode active material layer 24 that are stacked.

(Positive Electrode Resin Current Collector)

The positive electrode resin current collector 21 preferably contains a conductive filler and a matrix resin. Examples of the matrix resin include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethyl acrylate (PMA), polymethyl methacrylate (PMMA), polyvinylidene fluoride (PVdF), epoxy resin, silicone resin, mixtures thereof, and so on. From the viewpoint of electrical stability, polyethylene (PE), polypropylene (PP), polymethylpentene (PMP), and polycycloolefin (PCO) are preferred, and polyethylene (PE), polypropylene (PP), and polymethylpentene (PMP) are further preferred.

The conductive filler is selected from materials having electrical conductivity.

Concrete examples of the material include metals [such as nickel, aluminum, stainless steel (SUS), silver, copper, and titanium], carbon [graphite and carbon black (such as acetylene black, ketjen black, furnace black, channel black, and thermal lamp black), and so on], mixtures thereof, and so on, but the material is not limited to these. One of these conductive fillers may be used alone, or two or more of them may be used in combination. Further, alloys or metal oxides of these may also be used. From the viewpoint of electrical stability, they are preferably aluminum, stainless steel, carbon, silver, copper, titanium, and mixtures thereof, more preferably silver, aluminum, stainless steel, and carbon, and further preferably carbon. Further, these conductive fillers may also be one obtained by applying a conductive material (a metal material among the above-described conductive filler materials) around a particle-based ceramic material or a resin material by plating or the like.

The average particle diameter of the conductive filler is not particularly limited, but from the viewpoint of electric properties of the cell, it is preferably 0.01 µm to 10 µm, more preferably 0.02 µm to 5 µm, and further preferably 0.03 µm to 1 µm. Incidentally, in this description, the "particle diameter" means the largest distance L between any arbitrary two points on a contour line of a particle. As the value of the "average particle diameter," there is employed a value calculated as the average value of particle diameters of particles observed in several to several dozen visual fields using an observation means such as a scanning electron microscope (SEM) or a transmission electron microscope (TEM).

The shape (form) of the conductive filler is not limited to the particle form, but may be a form other than the particle form, and may be a form that has been put to practical use as what is called a filler-based conductive resin composition, such as carbon nanotubes.

The conductive filler may be a conductive fiber having a fibrous shape. Examples of the conductive fiber include carbon fibers such as PAN carbon fibers and pitch carbon fibers, a conductive fiber made by uniformly dispersing a highly conductive metal or graphite in a synthetic fiber, a metal fiber made by fiberizing a metal such as stainless steel, a conductive fiber made by coating a surface of an organic fiber with a metal, a conductive fiber made by coating a surface of an organic material with a resin containing a conductive substance, and so on. Among these conductive fibers, the carbon fibers are preferred. Further, a polypropylene resin kneaded with graphene is also preferred. In the case of the conductive filler being the conductive fiber, its average fiber diameter is preferably 0.1 µm to 20 µm.

The weight ratio of the conductive filler in the resin current collector is preferably 5% by weight to 90% by weight, and more preferably 20% by weight to 80% by weight. In particular, in the case of the conductive filler being carbon, the weight ratio of the conductive filler is preferably 20% by weight to 30% by weight.

In addition to the matrix resin and the conductive filler, the resin current collector may contain other components (a dispersing agent, a cross-linking accelerating agent, a cross-linking agent, a coloring agent, an ultraviolet absorbent, a plasticizer, and so on). Further, a plurality of resin current collectors may be used in a stacked manner, and a resin current collector and a metal foil may be used in a stacked manner.

The thickness of the positive electrode resin current collector 21 is not particularly limited, but it is preferably 5 µm to 150 µm. When a plurality of resin current collectors are stacked and used as the positive electrode current collector, the overall thickness after stacking is preferably 5 µm to 150 µm.

The positive electrode resin current collector 21 can be obtained, for example, by molding a conductive resin composition, which is obtained by melt-kneading the matrix resin, the conductive filler, and a dispersing agent for filler to be used as necessary, into a film form by a well-known method. As a method of molding the conductive resin composition into a film form, for example, well-known film molding methods such as a T-die method, an inflation method, and a colander method can be cited. Incidentally, the positive electrode resin current collector 21 can also be obtained by a molding method other than the film molding.

(Positive Electrode Active Material Layer)

The positive electrode active material layer 22 is preferably a non-bound body of a mixture containing a positive electrode active material. Here, the non-bound body means that the position of the positive electrode active material is not fixed in the positive electrode active material layer and that the positive electrode active materials are not irreversibly fixed to each other and the positive electrode active material is not irreversibly fixed to the current collector.

The case where the positive electrode active material layer 22 is a non-bound body is preferable because the positive electrode active materials are not irreversibly fixed to each other, thus making it possible to separate the positive electrode active materials without mechanically destroying the interface between the positive electrode active materials, and even when stress is applied to the positive electrode active material layer 22, movement of the positive electrode active material makes it possible to prevent the destruction of the positive electrode active material layer 22. The positive electrode active material layer 22, which is a non-bound body, can be obtained by such a method as to make a positive electrode active material layer 13 into a positive electrode active material layer 22 that contains a positive electrode active material and an electrolytic solution and does not contain a binding agent.

Incidentally, in this description, the binding agent means a chemical agent incapable of reversibly fixing the positive electrode active materials to each other and reversibly fixing the positive electrode active material to the current collector, and examples of the binding agent include well-known solvent-drying binding agents for lithium ion cells such as starch, polyvinylidene fluoride, polyvinyl alcohol, carboxymethyl cellulose, polyvinylpyrrolidone, tetrafluoroethylene, styrene-butadiene rubber, polyethylene, and polypropylene, and so on. These binding agents are used by being dissolved or dispersed in a solvent, and when the solvent is volatilized and removed by distillation, the binding agents become solid without surfaces exhibiting adhesiveness, thus failing to reversibly fix the positive electrode active materials to each other and the positive electrode active material to the current collector.

Examples of the positive electrode active material include composite oxides of lithium and transition metals {composite oxides with one transition metal (such as $LiCoO_2$, $LiNiO_2$, $LiAlMnO_4$, $LiMnO_2$, and $LiMn_2O_4$), composite oxides with two transition metal elements (such as, for example, $LiFeMnO_4$, $LiNi_{1-x}Co_xO_2$, $LiMn_{1-y}Co_yCo_2O_2$, $LiNi_{1/3}Co_{1/3}Al_{1/3}O_2$, and $LiNi_{0.8}Co_{0.15}Al_{0.05}O_2$), and composite oxides with three or more metal elements [such as, for example, $LiM_aM'_bM''_cO_2$ (where M, M', and M" are different transition metal elements and a+b+c=1 is satisfied, for example, $LiNi_{1/3}Mn_{1/3}Co_{1/3}O_2$)], and so on}, lithium-containing transition metal phosphates (for example, $LiFePO_4$, $LiCoPO_4$, $LiMnPO_4$, and $LiNiPO_4$), transition metal oxides (for example, $MnO_2$ and $V_2O_5$), transition metal sulfides (for example, $MoS_2$ and $TiS_2$), conductive polymers (for example, polyaniline, polypyrrole, polythiophene, polyacetylene and poly-p-phenylene and polyvinylcarbazole), and so on, and two or more of them may be used in combination. Incidentally, the lithium-containing transition metal phosphate may be one in which a part of the transition metal site is replaced with another transition metal.

The volume average particle diameter of the positive electrode active material is preferably 0.01 µm to 100 µm, more preferably 0.1 µm to 35 µm, and further preferably 2 µm to 30 µm, from the viewpoint of electric properties of the cell.

The positive electrode active material may be a coated positive electrode active material having at least a part of its surface coated with a coating material containing a polymer compound. When the periphery of the positive electrode active material is coated with the coating material, the change in volume of the positive electrode is mitigated, thereby making it possible to suppress the expansion of the positive electrode.

As the polymer compound constituting the coating material, those described as resins for coating active materials in Japanese Laid-open Patent Publication No. 2017-054703, International Publication Pamphlet No. WO2015-005117, and so on can be suitably used.

A conductive agent may be contained in the coating material. As the conductive agent, the same one as the conductive filler contained in the positive electrode resin current collector 21 can be suitably used.

The positive electrode active material layer 22 may contain an adhesive resin. As the adhesive resin, for example, there can be suitably used one prepared by mixing a small amount of an organic solvent with the resin for coating nonaqueous secondary cell active materials, described in Japanese Laid-open Patent Publication No. 2017-054703 and adjusting the glass transition temperature of the mixture to room temperature or less, one described as an adhesive in Japanese Laid-open Patent Publication No. 10-255805, and so on. Incidentally, the adhesive resin means a resin that has adhesiveness (properties that allow adhesion by applying slight pressure without the use of water, solvent, heat, or the like) without becoming solid even when a solvent component is volatilized and dried. On the other hand, a solution-drying binder for electrodes used as the binding agent means a binder that dries and solidifies by volatilizing a solvent component, thereby firmly bonding and fixing active materials to each other. Therefore, the above-described binding agent (solution-drying binder for electrodes) and the adhesive resin are different materials.

The positive electrode active material layer 22 may contain an electrolytic solution containing an electrolyte and a nonaqueous solvent. As the electrolyte, ones used for well-known electrolytic solutions, and so on can be used, and examples of the electrolyte include inorganic acid lithium salts such as $LiPF_6$, $LiBF_4$, $LiSbF_6$, $LiAsF_6$, $LiN(FSO_2)_2$, and $LiClO_4$, organic acid lithium salts such as $LiN(CF_3SO_2)_2$, $LiN(C_2F_5SO_2)_2$, and $LiC(CF_3SO_2)_3$, and so on, and $LiN(FSO_2)_2$ (to be also called LiFSI) is preferred.

As the nonaqueous solvent, ones used for well-known electrolytic solutions, and so on can be used, and for example, a lactone compound, a cyclic or chain carbonic acid ester, a chain carboxylic acid ester, a cyclic or chain ether, a phosphoric acid ester, a nitrile compound, an amide compound, a sulfone, a sulfolane, and so on and mixtures thereof can be used.

Examples of the lactone compound include five-membered rings (such as γ-butyrolactone and γ-valerolactone), six-membered ring lactone compounds (such as δ-valerolactone), and so on.

Examples of the cyclic carbonic acid ester include propylene carbonate, ethylene carbonate, butylene carbonate, and so on. Examples of the chain carbonic acid ester include dimethyl carbonate, methyl ethyl carbonate, diethyl carbonate, methyl-n-propyl carbonate, ethyl-n-propyl carbonate, di-n-propyl carbonate, and so on.

Examples of the chain carboxylic acid ester include methyl acetate, ethyl acetate, propyl acetate, methyl propionate, and so on. Examples of the cyclic ether include tetrahydrofuran, tetrahydropyran, 1,3-dioxolane, 1,4-dioxane, and so on. Examples of the chain ether include dimethoxymethane, 1,2-dimethoxyethane, and so on.

Examples of the phosphoric acid ester include trimethyl phosphate, triethyl phosphate, ethyl dimethyl phosphate, diethyl methyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphosphoran-2-one, 2-trifluoroethoxy-1,3,2-dioxaphosphoran-2-one, 2-methoxyethoxy-1,3,2-dioxaphosphoran-2-one, and so on. Examples of the nitrile compound include acetonitrile, and so on. Examples of the amide compound include DMF, and so on. Examples of the sulfone include dimethyl sulfone, diethyl sulfone, and so on. One of the nonaqueous solvents may be used alone, or two or more of them may be used in combination.

Among the nonaqueous solvents, the lactone compound, the cyclic carbonic acid ester, the chain carbonic acid ester, and the phosphoric acid ester are preferred from the viewpoint of cell power output and charge-discharge cycle characteristics, and the lactone compound, the cyclic carbonic acid ester, and the chain carbonic acid ester are further preferred, and a mixed solution of the cyclic carbonic acid ester and the chain carbonic acid ester is particularly preferred. A mixed solution of the ethylene carbonate (EC) and the dimethyl carbonate (DMC), or a mixed solution of the ethylene carbonate (EC) and the propylene carbonate (PC) is most preferred.

The positive electrode active material layer 22 may contain a conductive aid. As the conductive aid, a conductive material that is the same as the conductive filler contained in the positive electrode current collector 11 can be suitably used.

The weight ratio of the conductive aid in the positive electrode active material layer 22 is preferably 3% by weight to 10% by weight.

The positive electrode active material layer 22 can be prepared, for example, by applying a slurry containing the positive electrode active material and the electrolytic solution to the surface of the positive electrode resin current collector 21 or a base material, and removing an excess electrolytic solution. In the case where the positive electrode active material layer 22 is formed on the surface of the base material, the positive electrode active material layer 22 may be combined with the positive electrode resin current collector 21 by a method such as transfer. The above-described slurry may contain the conductive aid and the adhesive resin as necessary. Further, the positive electrode active material may also be a coated positive electrode active material.

The thickness of the positive electrode active material layer 22 is not particularly limited, but from the viewpoint of cell performance, it is preferably 150 μm to 600 μm, and more preferably 200 μm to 450 μm.

(Negative Electrode Resin Current Collector)

As the negative electrode resin current collector 23, the one having the same constitution as that described for the positive electrode resin current collector 21 can be appropriately selected and used, and can be obtained by the same method. The thickness of the negative electrode resin current collector 23 is not particularly limited, but it is preferably 5 μm to 150 μm.

(Negative Electrode Active Material Layer)

The negative electrode active material layer 24 is preferably a non-bound body of a mixture containing a negative electrode active material. The reason why the negative electrode active material layer is preferably a non-bound body, the method of obtaining the negative electrode active material layer 23, which is a non-bound body, and so on are the same as the reason why the positive electrode active material layer 22 is preferably a non-bound body and the method of obtaining the positive electrode active material layer 22, which is a non-bound body.

Examples of the negative electrode active material include carbon-based materials [graphite, non-graphitizable carbon, amorphous carbon, and resin burned bodies (such as, for example, burned and carbonized phenol resin, furan resin, and so on), cokes (such as, for example, pitch coke, needle coke, and petroleum coke), carbon fiber, and so on], silicon-based materials [silicon, silicon oxide (SiOx), silicon-carbon composites (such as carbon particles coated with silicon and/or silicon carbide, silicon particles or silicon oxide particles coated with carbon and/or silicon carbide, and silicon carbide), silicon alloys (such as a silicon-aluminum alloy, a silicon-lithium alloy, a silicon-nickel alloy, a silicon-iron alloy, a silicon-titanium alloy, a silicon-manganese alloy, a silicon-copper alloy, and a silicon-tin alloy), and so on], conductive polymers (such as, for example, polyacetylene and polypyrrole), metals (such as tin, aluminum, zirconium, and titanium), metal oxides (such as titanium oxide and lithium titanium oxide), metal alloys (such as, for example, a lithium-tin alloy, a lithium-aluminum alloy, and a lithium-aluminum-manganese alloy), and so on, mixtures of these with carbon-based materials, and so on. Among the above-described negative electrode active materials, those that do not contain lithium or lithium ions thereinside may be subjected to a pre-doping process in which part or all of the negative electrode active material is pre-doped with lithium or lithium ions in advance.

Among these, from the viewpoint of cell capacity, or the like, the carbon-based materials, the silicon-based materials, and the mixtures thereof are preferred, as the carbon-based material, graphite, non-graphitizable carbon, and amorphous carbon are further preferred, and as the silicon-based material, silicon oxide and silicon-carbon composites are further preferred.

The volume average particle diameter of the negative electrode active material is preferably 0.01 μm to 100 μm, more preferably 0.1 μm to 20 μm, and further preferably 2 μm to 10 μm from the viewpoint of electric properties of the cell.

In this description, the volume average particle diameter of the negative electrode active material means the particle diameter at an integrated value of 50% (Dv50) in a particle size distribution determined by the microtrack method (laser diffraction scattering method). The microtrack method is a method for determining the particle size distribution while using the scattered light obtained by irradiating particles with laser light. Incidentally, for the measurement of the volume average particle diameter, a microtrack manufactured by NIKKISO CO., LTD., or the like can be used.

The negative electrode active material may be a coated negative electrode active material having at least a part of its surface coated with a coating material containing a polymer compound. When the periphery of the negative electrode active material is coated with the coating material, the change in volume of the negative electrode is mitigated, thereby making it possible to suppress the expansion of the negative electrode.

As the coating material, the same one as the coating material that is a component of the coated positive electrode active material can be suitably used.

The negative electrode active material layer 24 contains an electrolytic solution containing an electrolyte and a nonaqueous solvent.

As the composition of the electrolytic solution, the same electrolytic solution as that contained in the positive electrode active material layer 22 can be suitably used.

The negative electrode active material layer 24 may contain a conductive aid. As the conductive aid, the same conductive material as the conductive filler contained in the positive electrode active material layer 22 can be suitably used.

The weight ratio of the conductive aid in the negative electrode active material layer 24 is preferably 2% by weight to 10% by weight.

The negative electrode active material layer 24 may contain an adhesive resin. As the adhesive resin, the same one as the adhesive resin, which is an arbitrary component of the positive electrode active material layer 22, can be suitably used.

The negative electrode active material layer 24 can be prepared, for example, by applying a slurry containing the negative electrode active material and the electrolytic solution to the surface of the negative electrode resin current collector 23 or a base material, and removing an excess electrolytic solution. In the case where the negative electrode active material layer 24 is formed on the surface of the base material, the negative electrode active material layer 24 may be combined with the negative electrode resin current collector 23 by a method such as transfer. The above-described slurry may contain the conductive aid, the adhesive resin, and so on, as necessary. Further, the negative electrode active material may also be a coated negative electrode active material.

The thickness of the negative electrode active material layer 24 is not particularly limited, but from the viewpoint of cell performance, it is preferably 150 μm to 600 μm, and more preferably 200 μm to 450 μm.

(Separator)

Examples of the separator 12 include well-known separators to be used for a lithium ion unit cell such as a porous film made of polyethylene or polypropylene, a laminated film of the above-described porous films (such as a laminated film of a porous polyethylene film and porous polypropylene), a nonwoven fabric made of synthetic fibers (such as polyester fibers and aramid fibers), glass fibers, or the like, and those made by attaching ceramic fine particles such as silica, alumina, or titania to surfaces of these.

The lithium ion unit cell 1 has a composition in which an electrolytic solution is enclosed by sealing the outer peripheries of the positive electrode active material layer 22 and the negative electrode active material layer 24. As a method of sealing the outer peripheries of the positive electrode active material layer 22 and the negative electrode active material layer 23, there can be cited a method of sealing the outer peripheries while using the sealing portion 14, for example. The sealing portion 14 is arranged between the positive electrode resin current collector 21 and the negative electrode resin current collector 23, and has a function of sealing the outer periphery of the separator 12.

The sealing portion 14 is not particularly limited as long as it is a material durable against the electrolytic solution, and polymer materials are preferred and thermosetting polymer materials are more preferred. Concrete examples of the material include an epoxy-based resin, a polyolefin-based resin, a polyurethane-based resin, a polyvinylidene fluoride resin, and so on, and the epoxy-based resin is preferred due to its high durability and easy handling.

As a manufacturing method of the lithium ion unit cell 1, the lithium ion unit cell 1 can be obtained, for example, by stacking the positive electrode resin current collector 21, the positive electrode active material layer 22, the separator 12, the negative electrode active material layer 23, and the negative electrode resin current collector 24 in this order, injecting the electrolytic solution, and sealing the outer peripheries of the positive electrode active material layer 22 and the negative electrode active material layer 24 with the sealing portion 14. As a method of sealing the outer peripheries of the positive electrode active material layer 22 and the negative electrode active material layer 24 with the sealing portion 14, there can be cited a method of applying and curing a liquid sealing material to perform sealing.

Further, the sealing portion 14 may be a frame made of a polymer material that is durable against the above-described electrolytic solution and having a through hole in which the positive electrode active material layer 22 or the negative electrode active material layer 24 is housed. In the case where the sealing portion 14 is a frame, the lithium ion unit cell 1 can be obtained by a method in which the positive electrode resin current collector 21 or negative electrode resin current collector 23 is bonded to one frame surface of the frame to seal one end of the through hole and the frames are bonded to each other with the separator provided on the other frame surface of the frame to perform sealing.

In this embodiment, as illustrated in FIG. 1A and FIG. 1B, in the battery pack 10, through holes that penetrate parallel to the stacking direction of the lithium-ion secondary unit cells 1 are formed side by side. Incidentally, the stacking direction of the lithium-ion secondary unit cells 1 does not have to be a direction perpendicular to a top (or bottom) surface of the battery pack 10. Further, the through holes do not have to be formed parallel to the stacking direction. Although two through holes are illustrated as an example in FIG. 1A and FIG. 1B, only one or three or more through holes are formed in some cases. A waterproof insulating film 2 is formed over the entire surface of the battery pack 10 so as to cover inner peripheral surfaces of the through holes. The through holes and the insulating film 2 form through holes 3a, 3b. To the through holes 3a, 3b, a gas such as air (a first gas) or a cooling liquid such as water is supplied when cooling the battery pack 10. Both of the through holes 3a and 3b are used as common through holes for the first gas and the cooling liquid, which also serve to supply the first gas or the cooling liquid. Even in the case where three or more through holes are provided, they are similarly used as common through holes for the first gas and the cooling liquid.

Incidentally, an exterior film may be provided to cover at least a part of the surface of the battery pack 10, in this case, the entire surface of the battery pack 10 except for entrances and exits of the through holes 3. The exterior film is made of a flexible insulating material and a well-known material used in cells can be used, which is a laminate film preferably. As the laminate film, a three-layer laminate film having a nylon film on the outer side, an aluminum foil in the middle, and an adhesive layer of modified polypropylene, or the like on the inner side can be preferably used.

Here, a reinforcing member covering the insulating film 2 and both edge portions may be formed inside the through holes 3a, 3b. The reinforcing member is made of, for example, an insulating material, a waterproof layer, or the like. Providing the reinforcing members in the through holes 3a, 3b makes it possible to prevent occurrence of damage to the through holes 3a, 3b, peeling of the insulating film 2, or the like caused by contact of a cable or the like with a wall surface of the through holes 3a, 3b, for example, when a cable or the like is inserted.

Figure 2:
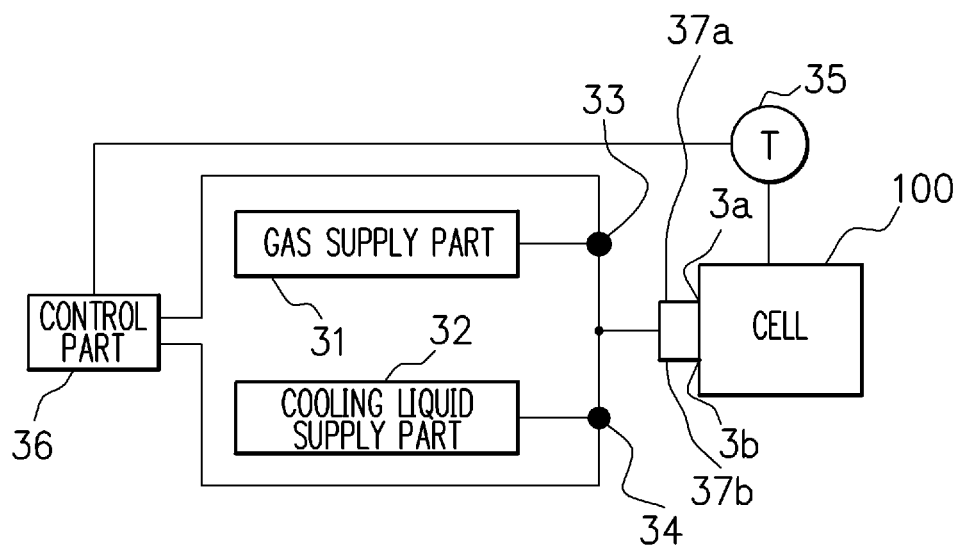
FIG. 2 is a schematic diagram illustrating a schematic configuration of the cell system according to the first embodiment.

The cell system according to this embodiment is configured as follows, including the stacked-type cell module 100 configured as described above. FIG. 2 is a schematic diagram illustrating the schematic configuration of the cell system according to this embodiment.

This cell system includes the stacked-type cell module 100, a gas supply part 31, a cooling liquid supply part 32, valves 33, 34, a temperature sensor 35, and a control part 36. The control part 36 controls the operations of the gas supply part 31, the cooling liquid supply part 32, and the valves 33, 34 according to the temperature of the stacked-type cell module 100 measured by the temperature sensor 35.

The gas supply part 31 supplies the gas such as air (the first gas) to the through holes 3a, 3b in the stacked-type cell module 100 in order to cool the battery pack 10 when the battery pack 10 in the stacked-type cell module 100 generates heat. The cooling liquid supply part 32 supplies the cooling liquid such as water to the through holes 3a, 3b in the stacked-type cell module 100 in order to cool the battery pack 10 when the battery pack 10 in the stacked-type cell module 100 generates heat.

The valve 33 is opened or closed, to thereby perform the supply or stop of the first gas to the through holes 3a, 3b in the stacked-type cell module 100 by the gas supply part 31. The valve 34 is opened or closed, to thereby perform the supply or stop of the cooling liquid to the through holes 3a, 3b in the stacked-type cell module 100 by the cooling liquid supply part 32. The through holes 3a, 3b are common supply channels for the first gas supply and the cooling liquid, pipes 37a, 37b connected to the through holes 3a, 3b are communicated with both the valves 33 and 34, the first gas is supplied to all the through holes 3a and 3b when the gas supply part 31 is used, and the cooling liquid is supplied to all the through holes 3a and 3b when the cooling liquid supply part 32 is used.

The temperature sensor 35 is a thermometer that measures the temperature of the battery pack 10 in the stacked-type cell module 100.

The cell system according to this embodiment is driven as follows by the control of the control part 36 with the case where the temperature detected by the temperature sensor 35 is within a first range, for example, a range from room temperature to less than 50° C. set to a normal control mode and the case where the temperature detected by the temperature sensor 35 is within a second range, for example, a range from 50° C. to less than 100° C. set to a high-temperature control mode.

When determining, based on a detection signal output from the temperature sensor 35, that a temperature measured value of the battery pack 10 in the stacked-type cell module 100 is a normal temperature within the first range, the control part 36 executes the normal control mode to open the valve 33 and close the valve 34 simultaneously. As a result, the air is supplied from the gas supply part 31 to the through holes 3a, 3b in the battery pack 10 of the stacked-type cell module 100, to cool the battery pack 10. On the other hand, when determining, based on a detection signal output from the temperature sensor 35, that the temperature measured value of the battery pack 10 in the stacked-type cell module 100 is a high temperature within the second range, the control part 36 executes the high-temperature control mode to open the valve 34 and close the valve 33 simultaneously. As a result, the cooling liquid is supplied from the cooling liquid supply part 32 to the through holes 3a, 3b in the battery pack 10 of the stacked-type cell module 100, to cool the battery pack 10.

The stacked-type cell module 100 is normally arranged so as to make the through holes 3a, 3b located in the vertical direction when in use, as illustrated in FIG. 1A and FIG. 1B, but the stacked-type cell module 100 is sometimes arranged so as to make the through holes 3a, 3b located in the horizontal direction. In this case, after use, the cooling liquid tends to remain in the through holes 3a, 3b. Thus, a cooling liquid drainage channel may be formed in the middle of the through holes 3a, 3b to drain the remaining cooling liquid.

As explained above, according to the cell system in this embodiment, the through holes 3a, 3b in the stacked-type cell module 100 are used as the common supply channels for the first gas supply and the cooling liquid, respectively, and thus, the proportion of the formation region of the through holes inside the cell can be kept as small as possible, and the number of members can be reduced. As above, the cell system in this embodiment can securely suppress the increase in temperature inside the cell while having a simple configuration with a reduced formation region of the through holes provided in the lithium ion cell.

Second Embodiment

Figure 3:
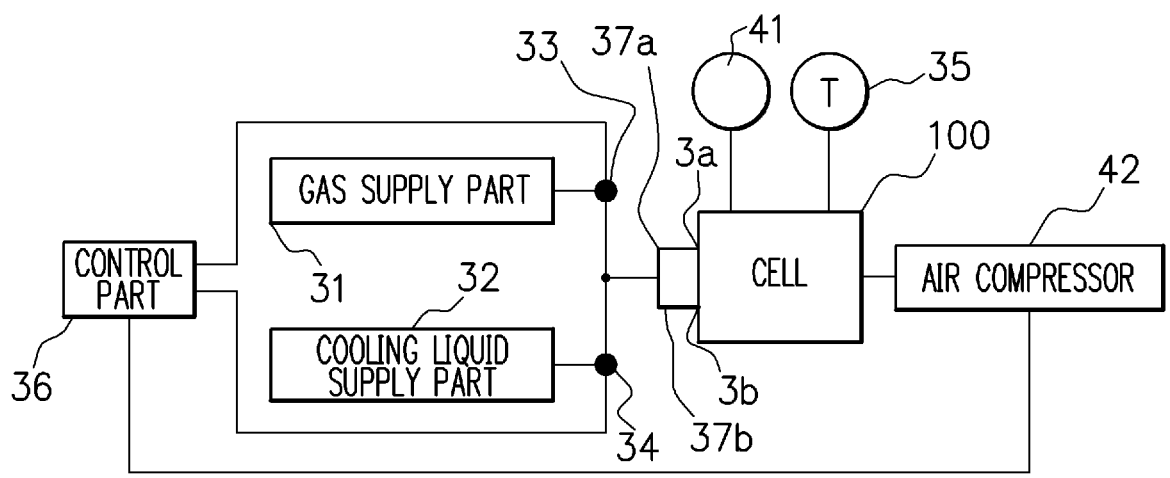
FIG. 3 is a schematic diagram illustrating a schematic configuration of a cell system according to a second embodiment.

Next, a second embodiment will be described. As in the first embodiment, this embodiment discloses a cell system including the stacked-type cell module 100. FIG. 3 is a schematic diagram illustrating a schematic configuration of the cell system according to this embodiment. The same components as those of the cell system in the first embodiment are denoted by the same reference numerals and symbols, and their detailed explanation is omitted.

This cell system includes a humidity sensor 41 and an air compressor 42, in addition to the stacked-type cell module 100, the gas supply part 31, the cooling liquid supply part 32, the valves 33, 34, the temperature sensor 35, and the control part 36.

The humidity sensor 41 is a hygrometer that measures the humidity inside the through holes 3a, 3b of the stacked-type cell module 100. The air compressor 42 supplies a gas such as air (a second gas) into the through holes 3a, 3b of the stacked-type cell module 100 when switching from the high-temperature control mode to the normal control mode described above.

In the cell system, when the high-temperature control mode is executed, the battery pack 10 in the stacked-type cell module 100 is cooled, and when the temperature measured value of the battery pack 10 by the temperature sensor 35 becomes a value within the first range from a value within the second range, the control part 36 switches from the high-temperature control mode to the normal control mode. At the end of the high-temperature control mode, some moisture of the cooling liquid may remain in the through holes 3a, 3b of the stacked-type cell module 100 due to the execution of the high-temperature control mode. In this case, due to the remaining moisture, the humidity is higher in the through holes 3a, 3b than in the outside air.

In this embodiment, after the high-temperature control mode is finished and before the normal control mode is started, the air compressor 42 removes the remaining moisture of the cooling liquid in the through holes 3a, 3b.

Concretely, when the control part 36 finishes the high-temperature control mode and stops the supply of the cooling liquid to the through holes 3a, 3b, and then determines, based on a detection signal output from the humidity sensor 41, that the humidity measured value in the through holes 3a, 3b of the stacked-type cell module 100 is higher than the humidity of the outside air, the control part 36 drives the air compressor 42 to supply the gas such as air (the second gas) into the through holes 3a, 3b. When the control part 36 determines that the humidity in the through holes 3a, 3b has decreased due to the driving of the air compressor 42 and that the humidity measured value in the through holes 3a, 3b falls within a predetermined range of the humidity of the outside air or the humidity measured value in the through holes 3a, 3b is the same as the humidity of the outside air, the control part 36 finishes the driving of the air compressor 42 to stop the supply of the second gas, and executes the normal control mode and drives the gas supply part 31 to supply the first gas into the through holes 3a, 3b.

According to the cell system in this embodiment, in addition to the above-described various effects exhibited in the first embodiment, when switching from the high-temperature control mode to the normal control mode, by the driving of the air compressor 42, the moisture of the cooling liquid remaining in the through holes 3a, 3b in the stacked-type cell module 100 can be immediately removed, resulting in that it is possible to securely perform the air cooling by the normal control mode.

Modified Example

In this embodiment, the cell system including the air compressor 42 has been explained as an example, but the gas supply part 31 may also function as the air compressor 42 without using the air compressor 42. In this case, for example, the gas supply part 31 can be executed by switching between the above-described normal control mode in which the gas supply speed (air volume) for air cooling the battery pack 10 of the stacked-type cell module 100 is normal, and a high-pressure supply mode in which the gas supply speed (air volume) is larger than a first supply mode, which is intended for removing the moisture remaining in the through holes 3a, 3b.

In the modified example, when the control part 36 finishes the high-temperature control mode and stops the supply of the cooling liquid to the through holes 3a, 3b, and then determines, based on a detection signal output from the humidity sensor 41, that the humidity measured value in the through holes 3a, 3b in the stacked-type cell module 100 is higher than the humidity of the outside air, the control part 36 sets the gas supply part 31 to the high-pressure supply mode and drives it, to supply the first gas into the through holes 3a, 3b. When the control part 36 determines that the humidity in the through holes 3a, 3b has decreased due to the execution of the high-pressure supply mode and that the humidity measured value in the through holes 3a, 3b falls within a predetermined range of the humidity of the outside air or the humidity measured value in the through holes 3a, 3b is the same as the humidity of the outside air, the control part 36 switches the gas supply part 31 from the high-pressure supply mode to the normal control mode and executes the gas supply part 31 in the normal control mode to supply the first gas into the through holes 3a, 3b.

According to the cell system in the modified example, it becomes possible to obtain the above-described various effects exhibited in this embodiment as well as being able to reduce the number of parts configuring the cell system.

Third Embodiment

Next, a third embodiment will be explained. This embodiment discloses a cell system including a stacked-type cell module. This cell system is applied, for example, to a large-scale power storage facility, or the like, and the stacked-type cell module in this embodiment is larger than the stacked-type cell modules in the first and second embodiments, (which is, for example, a storage battery of approx. 1000 kWh).

Figure 4A:
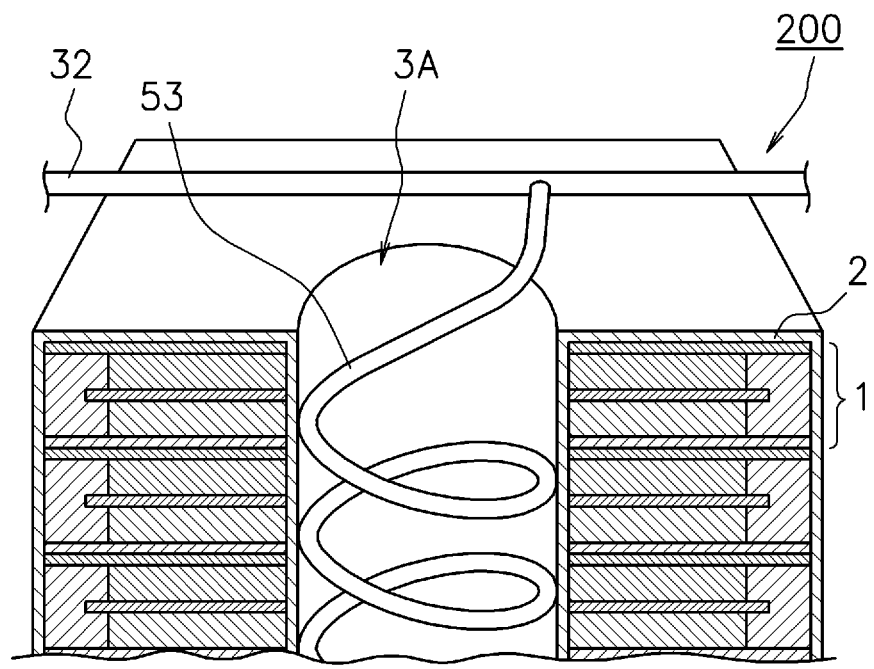
FIG. 4A is a schematic perspective view party illustrating a cross section of a stacked-type cell module and a cooling liquid supply part to be applied to a cell system according to a third embodiment, from which a portion of them is cut out.
Figure 4B:
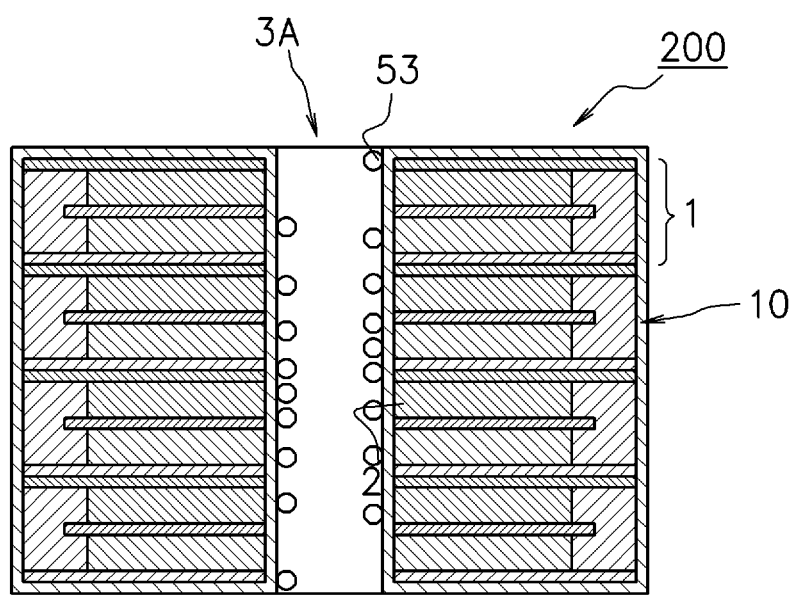
FIG. 4B is a schematic perspective view partly illustrating a cross section of the stacked-type cell module in FIG. 4A, from which a portion thereof is cut out.
Figure 5:
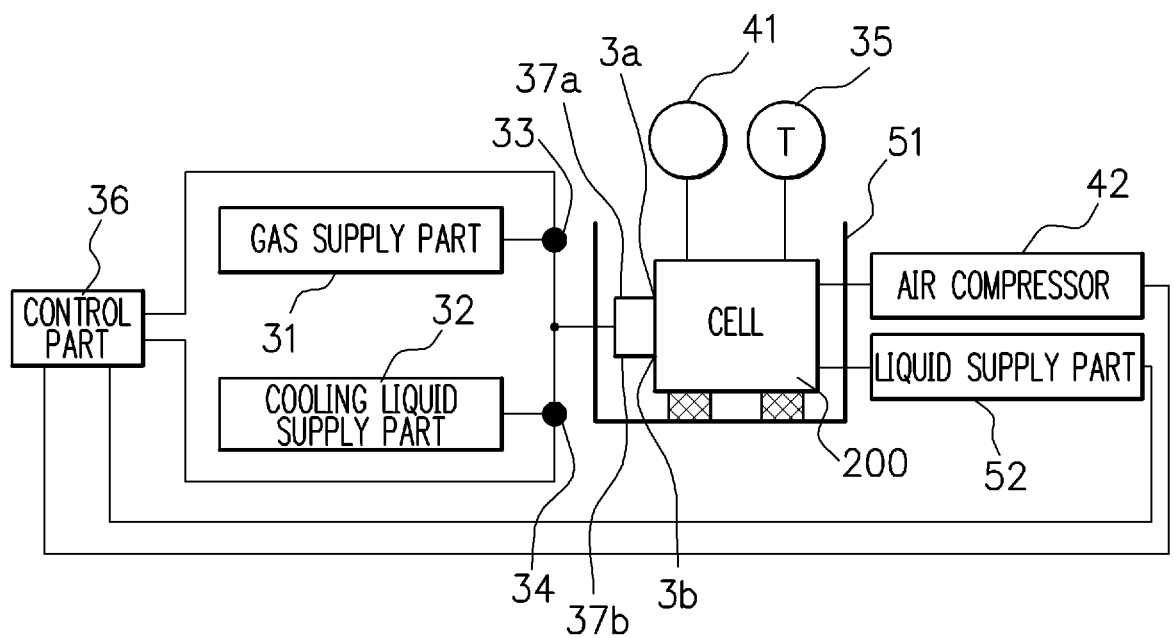
FIG. 5 is a schematic diagram illustrating a schematic configuration of the cell system according to the third embodiment.

FIG. 4A and FIG. 4B are schematic views illustrating a portion of the stacked-type cell module and the cooling liquid supply part to be applied to the cell system according to this embodiment, FIG. 4A is a schematic perspective view partly illustrating a cross section, from which a portion of them is cut out, and FIG. 4B is a schematic cross-sectional view of FIG. 4A viewed from the side. FIG. 5 is a schematic diagram illustrating a schematic configuration of the cell system according to this embodiment. In FIG. 4A, FIG. 4B, and FIG. 5, the same components as those of the cell systems in the first and second embodiments are denoted by the same reference numerals and symbols, and their detailed explanation is omitted.

A stacked-type cell module 200 to be applied to the cell system according to this embodiment includes the battery pack 10 in which a plurality of the lithium ion unit cells 1 are stacked and connected in series, similarly to the stacked-type cell module 100 in the first embodiment. Incidentally, for convenience of illustration, FIG. 4B illustrates, as an example, a state where four layers of the lithium ion unit cells 1 are stacked, but tens to hundreds of layers of the lithium ion unit cells 1 are stacked in some cases.

The lithium ion unit cell 1 is formed in a manner that the positive electrode 11 and the negative electrode 13 are stacked with the separator 12 arranged therebetween, the sealing portion 14 surrounding and sealing an outer peripheral portion of the positive electrode 11, the separator 12, and the negative electrode 13 is provided, and an electrolytic solution is enclosed. The positive electrode 11 is made of the positive electrode resin current collector 21 and the positive electrode active material layer 22 being stacked. The negative electrode 13 is made of the negative electrode resin current collector 23 and the negative electrode active material layer 24 being stacked.

In this embodiment, a through hole is formed in the battery pack 10 parallel to the stacking direction of the lithium-ion secondary unit cells 1. FIG. 4A and FIG. 4B illustrate one through hole as an example, but two or more through holes are formed in some cases. The waterproof insulating film 2 is formed over the entire surface of the battery pack 10 so as to cover an inner peripheral surface of the through hole. The through hole and the insulating film 2 form a through hole 3A. To the through hole 3A, the gas such as air (the first gas) or the cooling liquid such as water is supplied when cooling the battery pack 10. The through hole 3A is used as a common through hole for the first gas and the cooling liquid, which also serves to supply the first gas or the cooling liquid. Even when two or more through holes are provided, they are similarly used as common through holes for the first gas and the cooling liquid.

Incidentally, in this embodiment as well, as in the first embodiment, a reinforcing member covering the insulating film 2 and both edge portions inside the through hole 3A may be formed.

As illustrated in FIG. 5, this cell system includes the stacked-type cell module 200, the gas supply part 31, the cooling liquid supply part 32, the valves 33, 34, the temperature sensor 35, the humidity sensor 41, the air compressor 42, a housing part 51, a liquid supply part 52, and the control part 36.

The housing part 51 is a liquid tank that houses the stacked-type cell module 200 and simply houses the stacked-type cell module 200 during normal use of the stacked-type cell module 200. The liquid supply part 52 supplies a liquid, such as water, into the housing part 51 in which the stacked-type cell module 200 is housed, by the control of the control part 36.

In this embodiment, the stacked-type cell module 200 is large and the through hole 3A in the stacked-type cell module 200 is also formed with a large diameter. Therefore, the stacked-type cell module 200 is sometimes not suitable for the aspect in which the cooling liquid is directly supplied to the through holes 3a, 3b as in the stacked-type cell module 100 in the first embodiment.

In this embodiment, as illustrated in FIG. 4A, the cooling liquid supply part 32 includes a liquid cooling tube 53, which is spirally arranged inside the through hole 3A so as to come into contact with the inner peripheral surface of the through hole 3A in the stacked-type cell module 200. The cooling liquid is supplied from the cooling liquid supply part 32 through the liquid cooling tube 53, and thereby the battery pack 10 is cooled from the inner peripheral surface of the through hole 3A with which the liquid cooling tube 53 comes into contact. In the case where the liquid cooling tube 53 is arranged inside the through hole 3A, there can be applied, as the gas supply part 31, a configuration in which an air cooling fan is provided so as to align with the entrance of the through hole 3A, for example, or the like.

In the stacked-type cell module 200, the center portion of the battery pack 10 becomes the highest in temperature when used. In this embodiment, as illustrated in FIG. 4B, the liquid cooling tube 53 is arranged inside the through hole 3A so as to have the highest density of arrangement at the center portion inside the through hole 3A. With this configuration, the center portion of the battery pack 10 has the highest cooling effect, and the entire battery pack 10 can be cooled efficiently.

In the stacked-type cell module, if a malfunction occurs during charging and discharging, a high voltage is applied to the lithium ion cell or a large current is passed therethrough, resulting in charging and discharging in great excess of the capacity of the cell in some cases. Further, if there is a defect in the separator or the like of the cell, an internal short-circuit occurs, causing a large current to flow in some cases. In such a case, the temperature of the cell increases abnormally, causing a risk of smoking or ignition. In this embodiment, the cell system operates as follows in order to safely deal with such an unforeseen situation.

Figure 6:
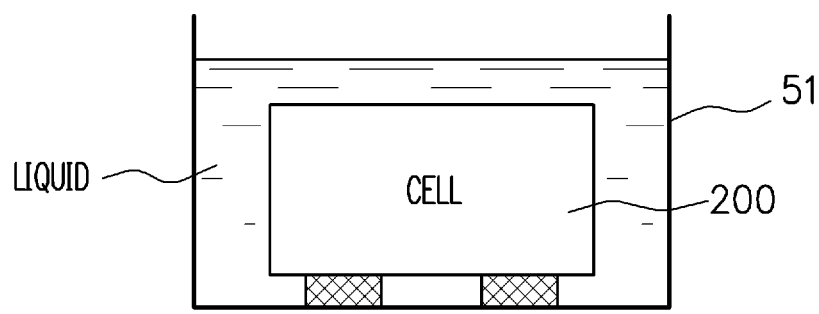
FIG. 6 is a schematic view illustrating a state where the stacked-type cell module is submerged.

In this embodiment, when determining that the temperature of the stacked-type cell module 200 has reached a predetermined value, for example, 100° C., based on a detection signal output from the temperature sensor 35, the control part 36 controls switching to an abnormal control mode to control the operation. In the abnormal control mode, the control part 36 drives the liquid supply part 52 to supply a liquid such as water into the housing part 51 in which the stacked-type cell module 200 is housed. Thereby, as illustrated in FIG. 6, the stacked-type cell module 200 is submerged in the housing part 51, thereby preventing the occurrence of smoking or ignition.

According to the cell system in this embodiment, in addition to the above-described various effects exhibited in the first and second embodiments, even if an abnormal increase in temperature occurs in the stacked-type cell module 200, the smoking, ignition, or the like of the stacked-type cell module 200 can be securely prevented in advance.

Incidentally, in the first and second embodiments, there has been disclosed the aspect in which the cooling liquid is directly supplied to the through holes 3a, 3b of the stacked-type cell module 100, but an aspect in which the liquid cooling tube is provided inside the through holes 3a, 3b may be applied also to the stacked-type cell module 100 as in this embodiment.

In the cell systems according to the first to third embodiments, a computer including, for example, a CPU, a RAM, a ROM, a storage medium such as an HDD, a display part, and an operation part is applied as the control part 36. As a matter of course, the control part 36 is not limited to this form, but may also be an information terminal such as a PDA, a tablet PC, a cellular phone, or the like. As the display part of the control part 36, various display devices such as a liquid crystal display, for example, are applied. As the operation part of the control part 36, various input devices such as a keyboard and a touch panel are applied. A computer program for controlling the cell system is stored in the ROM or the storage medium. This computer program is a program to achieve drivings of the gas supply part 31, the cooling liquid supply part 32, the valves 33, 34, the temperature sensor 35, the humidity sensor 41, the air compressor 42, and the liquid supply part 52. Then, the CPU of the control part 36 reads the computer program from the ROM or the storage medium, and executes it using the RAM as a working area. As a result, the control part 36 controls the respective parts of the cell system.

[Various Aspects of a Cell Structure, a Removal System of the Cell Structure, and a Removing Method of the Cell Structure]

Hereinafter, there will be explained various aspects of a cell structure, a removal system of the cell structure, and a removing method of the cell structure.

A general thin cell, such as a lithium ion cell, for example, includes a metal current collector and an electrode composition layer formed on a surface thereof, and the electrode composition layer is firmly cured by a binder resin such as a polyvinylidene fluoride resin (PVDF). In the case where such a thin cell is removed from an electronic device in a state of being bonded and fixed in the electronic device by the method in Patent Literature 2 or the like, as described above, the thin cell will not be bent when the electrode composition layer is firmly cured, so that a force to pull up a pinch portion and peel off an adhesive portion at a time is required, resulting in that peeling off is sometimes difficult.

These various aspects have been made in consideration of the above-described problem, and an object thereof is to provide a cell structure capable of being peeled off easily when removing a lithium ion cell from an electronic device, a removal system of the cell structure, and a removing method of the cell structure.

As a result of conducting repeated earnest examinations based on the above findings, we have devised the following various aspects.

[1] A cell structure that includes a lithium ion cell to be mounted in an electronic device, the cell structure includes:

an exterior film that covers at least a part of the lithium ion cell and includes a pinch portion for peeling off the lithium ion cell; and an adhesive layer provided on the exterior film or on the electronic device, in which the lithium ion cell includes:

a stack structure that is more flexible than a structure including a metal current collector and an electrode composition layer made of a binder resin, and the stack structure includes: a resin current collector containing a conductive resin composition; and an electrode composition layer formed on a surface of the resin current collector and containing a coated active material having at least a part of a surface thereof coated with a coating material containing a polymer compound.

[2] The cell structure according to [1], in which the cell structure is flexible enough to be bent when a pull force is applied thereto with the pinch portion serving as a point of effort in a state of being bonded by the adhesive layer.

[3] The cell structure according to [1] or [2], in which the lithium ion cell is divided into a plurality of parts with a cut formed in a thickness direction to a predetermined depth.

[4] The cell structure according to [3], in which the cut is formed in the electrode composition layer.

[5] The cell structure according to any one of [1] to [4], in which the pinch portion is provided with a mark readable by image recognition.

[6] The cell structure according to [5], in which the mark is a mark capable of being image-recognized by being irradiated with ultraviolet rays.

[7] A removal system that removes the cell structure according to [5] or [6] from the electronic device, the removal system includes:

a mark reading part that reads the mark;

a robot arm that grasps the pinch portion and peels off the cell structure based on a reading result by the mark reading part; and a control part that controls the mark reading part and the robot arm.

[8] The removal system of the cell structure according to [7], in which the control part estimates a position where the cell structure exists based on an arrangement of the mark image-recognized by the mark reading part, and determines a direction in which the robot arm pulls the cell structure based on the estimated position where the cell structure exists.

[9] The removal system of the cell structure according to [7] or [8], further includes:

a pull strength calculation part that calculates a pull strength required to peel off the cell structure based on an adhesive area of the adhesive layer and an adhesive force per unit area; and a pull force setting part that sets the pull force in a predetermined direction by the robot arm based on the pull strength calculated by the pull strength calculation part, in which the control part controls the pull strength calculation part and the pull force setting part to stop movement of the robot arm in the predetermined direction when an amount of movement of the robot arm to move while maintaining the pull force reaches a predetermined value when peeling off the cell structure.

[10] A removing method of the cell structure according to [5] or [6], the removing method includes:

a step of reading the mark;

a step of grasping the pinch portion by a robot arm based on a reading result of the mark; and a step of automatically peeling off the cell structure by control of the robot arm.

[11] The removing method of the cell structure according to [10], in which the step of reading the mark estimates a position where the cell structure exists based on an arrangement of the image-recognized mark, and determines a direction in which the robot arm pulls the cell structure based on the estimated position where the cell structure exists.

[12] The removing method of the cell structure according to [10] or [11], in which the step of automatically peeling off the cell structure includes:

a step of calculating a pull strength required to peel off the cell structure based on an adhesive area of the adhesive layer and an adhesive force per unit area;

a step of setting the pull force in a predetermined direction by the robot arm based on the calculated pull strength; and a step of stopping movement of the robot arm when an amount of movement of the robot arm to move while maintaining the pull force reaches a predetermined value.

According to these various aspects, easy peeling off is enabled when removing the lithium ion cell from the electronic device.

Hereinafter, these various aspects will be explained in detail with reference to the drawings.

[First Aspect]

Figure 7A:
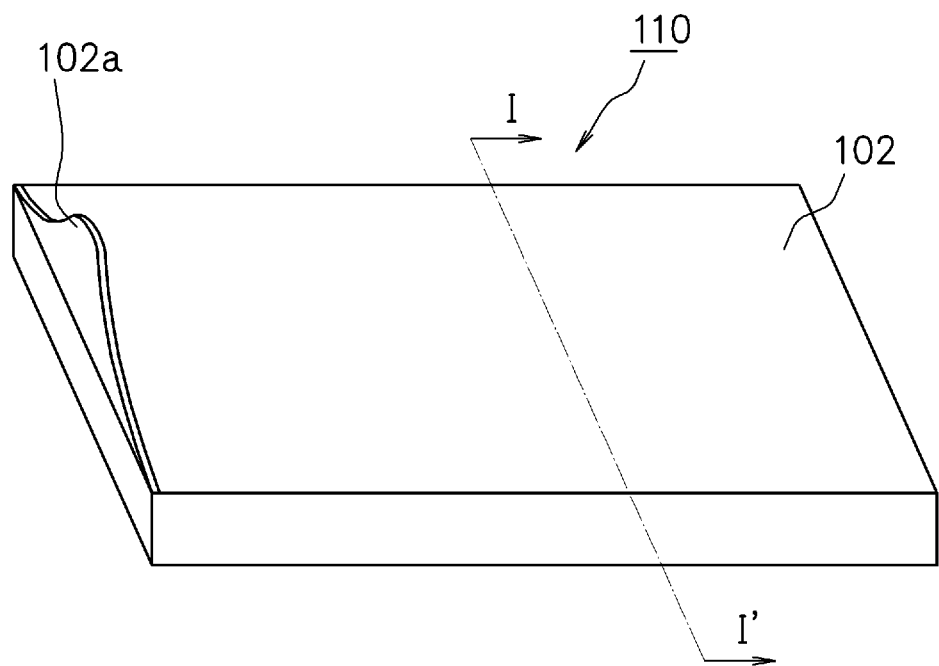
FIG. 7A is a schematic perspective view illustrating a cell structure according to a first aspect.
Figure 7B:
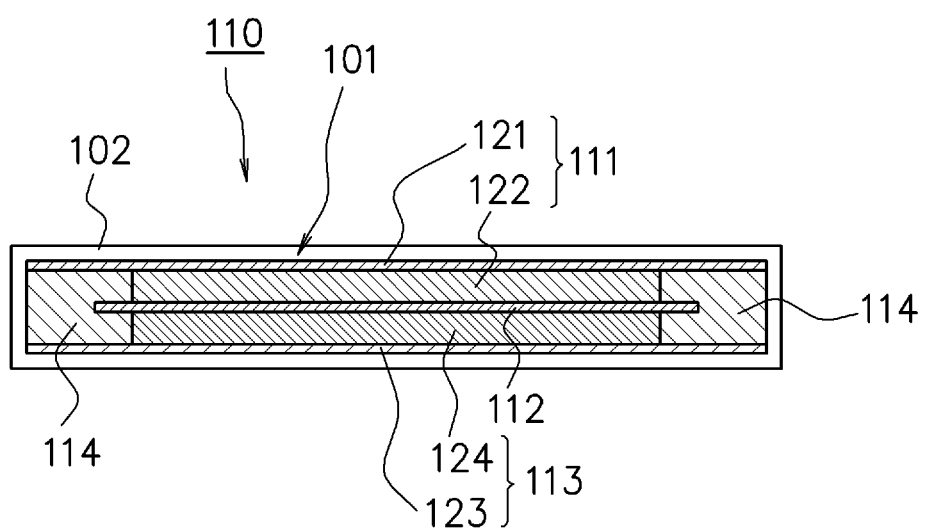
FIG. 7B is a schematic cross-sectional view taken along I-I' of the cell structure in FIG. 7A.

First, as a first aspect, there is explained the cell structure including a lithium ion cell to be mounted in an electronic device. FIG. 7A and FIG. 7B are schematic views illustrating the cell structure according to this aspect, FIG. 7A is a schematic perspective view, and FIG. 7B is a schematic cross-sectional view taken along I-I' in FIG. 7A.

The cell structure in this aspect can be mounted in various electronic devices. Examples of the electronic device include electronic devices with relatively large screens such as a television apparatus, a desktop or notebook personal computer, and a monitor for a computer or the like, and a tablet computer (a tablet terminal), home gaming devices (including a portable gaming machine), a cellular phone handset (what is called a feature phone), a smart phone (a multifunctional cellular phone handset), a personal digital assistant (PDA), a portable music player, an electronic book reader, other computer devices, and so on.

In a cell structure 110, a lithium-ion secondary cell 101 is a plate-shaped unit cell as illustrated in FIG. 7B.

The lithium-ion secondary cell 101 is formed in a manner that a positive electrode 111 and a negative electrode 113 are stacked with a separator 112 arranged therebetween, a sealing portion 114 surrounding and sealing an outer peripheral portion of the positive electrode 111, the separator 112, and the negative electrode 113 is provided, and an electrolytic solution is enclosed within the sealed inside. The positive electrode 111 is made of a positive electrode resin current collector 121 and a positive electrode active material layer 122 being stacked. The negative electrode 113 is made of a negative electrode resin current collector 123 and a negative electrode active material layer 124 being stacked. The lithium-ion secondary cell 101 has flexibility because the current collector is a resin current collector.

The cell structure 110 in this aspect includes, as illustrated in FIG. 7A and FIG. 7B, an exterior film 102 provided to cover at least a part of the lithium-ion secondary cell 101, here the entire surface of the lithium-ion secondary cell 101. One end portion of the exterior film 102 is provided with a pinch portion 102a to be used when peeling off the cell structure 110. The exterior film 102 is made of a flexible insulating material, and a well-known material used in cells can be used, which is a laminate film preferably. As the laminate film, a three-layer laminate film having a nylon film on the outer side, an aluminum foil in the middle, and an adhesive layer of modified polypropylene, or the like on the inner side can be preferably used. The cell structure 110 is also flexible as a whole because the lithium-ion secondary cell 101 and the exterior film 102 covering it are both flexible.

Incidentally, in this aspect, the case where the pinch portion 102a is provided on the exterior film 102 has been explained as an example, but a predetermined surplus portion or the like of the exterior film 102 may be used as the pinch portion without providing the pinch portion 102a in particular.

Figure 8:
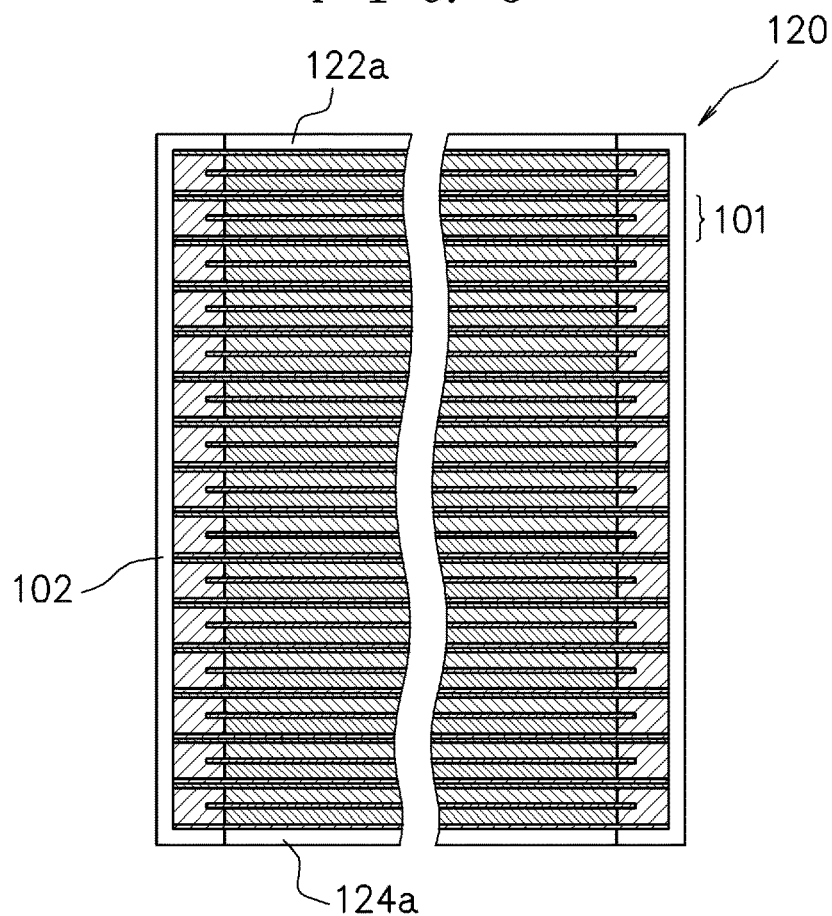
FIG. 8 is a schematic cross-sectional view illustrating a cell structure in the case of a battery pack of lithium-ion secondary cells.

Further, in this aspect, the lithium-ion secondary cell having a unit cell constitution has been explained as an example, but as illustrated in FIG. 8, for example, a plurality of the lithium-ion secondary cells 101 illustrated in FIG. 7B may be connected in series as a unit cell to form a lithium-ion secondary battery having a battery pack constitution. In this case, of the lithium-ion secondary battery, for example, on the positive electrode active material layer 122 of the top surface and on the negative electrode active material layer 124 of the bottom surface, current lead-out portions 122a, 124a are provided respectively, and the entire surface is covered by the exterior film 102 to be formed a cell structure 120.

Figure 9:
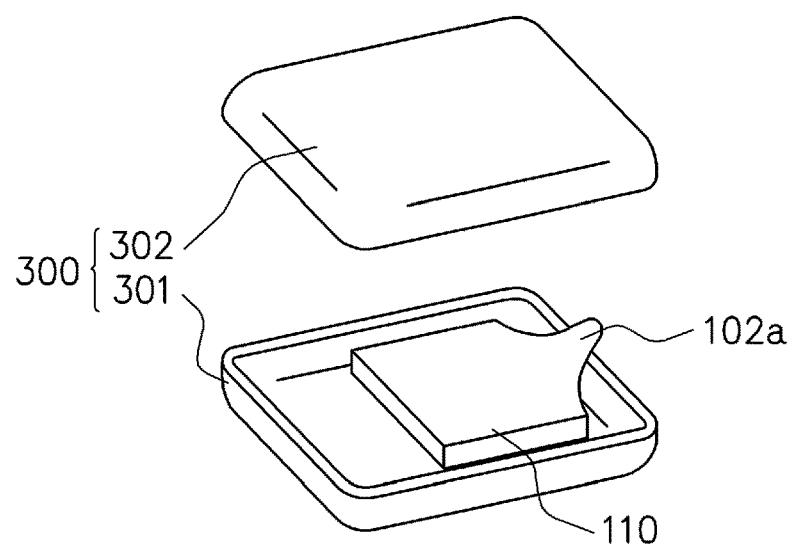
FIG. 9 is a schematic perspective view illustrating an electronic device provided with the cell structure.
Figure 10A:
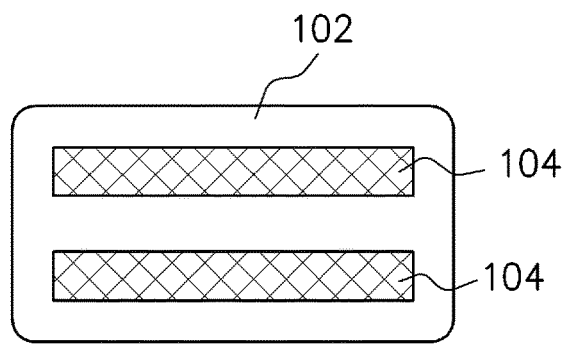
FIG. 10A is a schematic plan view illustrating one example of an adhesive sheet for fixing the cell structure to the inside of the electronic device.
Figure 10B:
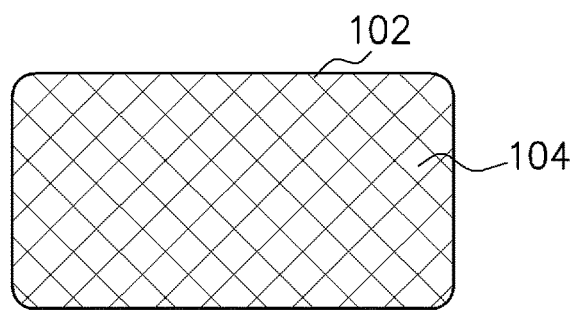
FIG. 10B is a schematic plan view illustrating another example of the adhesive sheet for fixing the cell structure to the inside of the electronic device.

The cell structure 110 in this aspect is mounted in an electronic device 300 with a lower case 301 and an upper case 302 that includes not-illustrated electronic components appropriately as illustrated in FIG. 9. The cell structure 110 is adhesively fixed to a bottom surface of the lower case 301, for example, by an adhesive sheet (adhesive layer) 104, as illustrated in FIG. 10A or FIG. 10B. The adhesive sheet 104 is provided on a part (FIG. 10A) or the entire surface (FIG. 10B) of a lower surface of the exterior film 102 of the cell structure 110. In place of being provided on the exterior film 102, the adhesive sheet 104 may be provided on a part or the entire surface of a portion where the cell structure 110 is mounted on the bottom surface of the lower case 301 of the electronic device 300.

Figure 11:
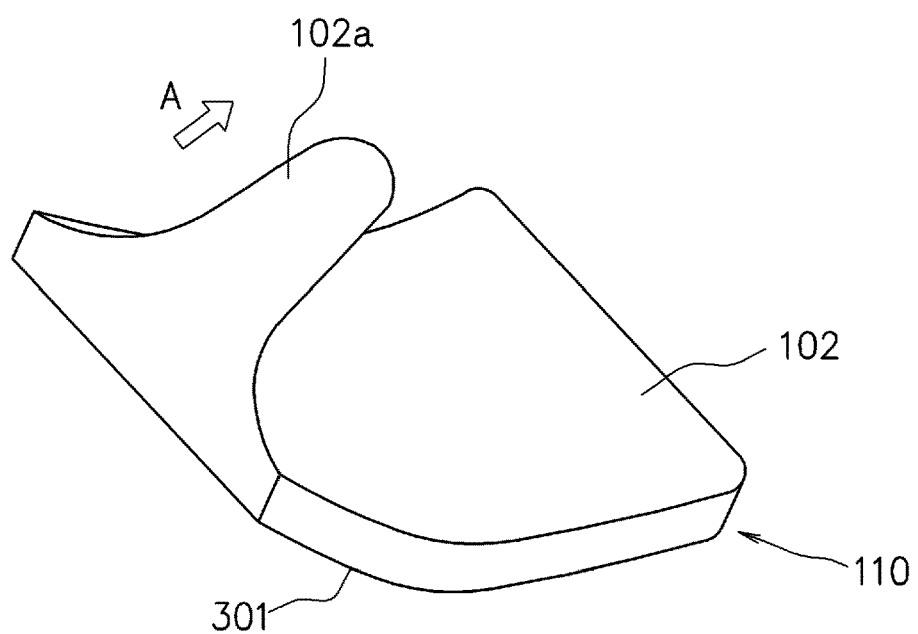
FIG. 11 is a schematic perspective view illustrating a state where the cell structure is peeled off from the electronic device.

When repairing or disposing of the electronic device, the cell structure is peeled off and removed from the electronic device. In this aspect, as illustrated in FIG. 11, the cell structure 110 adhering to the inside of the lower case 301 of the electronic device 300 is peeled off from the lower case 301 by grasping the pinch portion 102a and pulling it in the direction of an arrow A, for example. At this time, since the cell structure 110 is flexible, bending occurs when it is peeled off. In other words, the cell structure 110 is flexible enough to be bent when a pull force is applied thereto with the pinch portion 102a serving as a point of effort in a state of being bonded to the lower case 301 by the adhesive sheet 104, when peeled off from the lower case 301.

Here, the pull force required when peeling off the cell structure 110 in this aspect will be examined based on a comparison with a comparative example.

A cell structure in the comparative example includes a lithium ion cell that includes a metal current collector of aluminum, copper, or the like in place of including the resin current collector and includes an active material layer firmly cured by a binder resin such as a polyvinylidene fluoride resin, for example, and the entire surface of the lithium ion cell is covered with the same exterior film (with a pinch portion) as that in this aspect. The cell structure in the comparative example is not flexible but is harder than the cell structure 110 in this aspect (in other words, the cell structure 110 in this aspect is more flexible than the cell structure in the comparative example). Therefore, the cell structure in the comparative example is not bent as much as this aspect even when peeled off from the case of the electronic device.

Figure 12A:
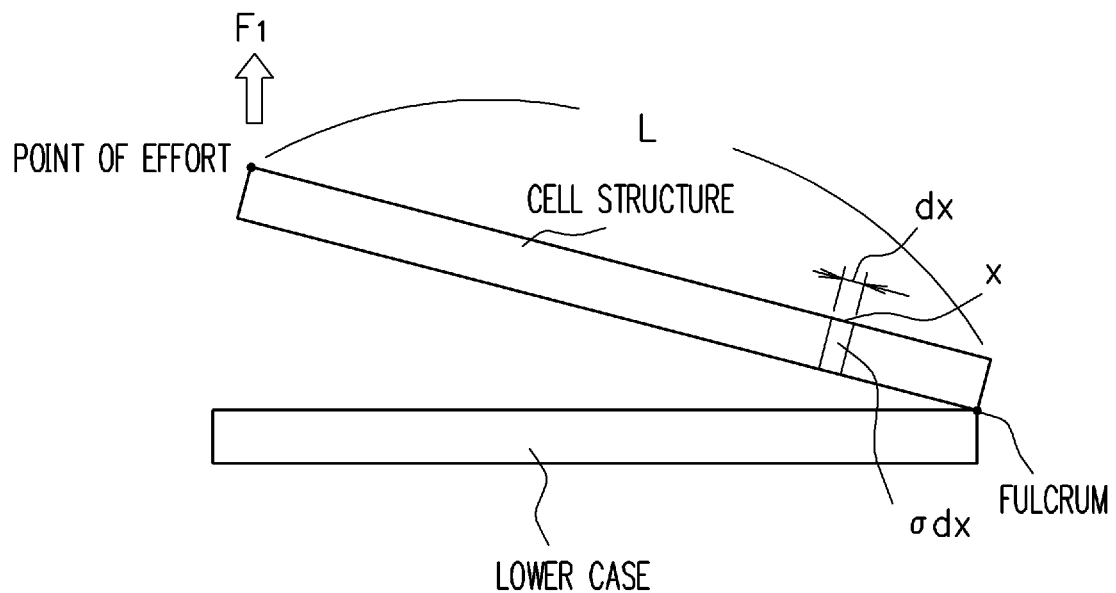
FIG. 12A is a schematic side view for explaining a pull force required to peel off a cell structure in a comparative example of the first aspect from a case of the electronic device.

FIG. 12A illustrates how the cell structure in the comparative example is peeled off from the case of the electronic device.

Since the cell structure in the comparative example is not bent when peeled off, when the pull force applied to the point of effort is set to $F_1$, the distance from the fulcrum of the cell structure to the point of effort is set to L, the adhesive force per unit area is set to $\sigma$, and the arbitrary distance from the fulcrum along the cell structure is set to x, the following relations are established.

[Mathematical Equation 1]

$$F \times L = \int_0^L (\sigma \cdot dx) \cdot x \quad \text{[Mathematical equation 1]}$$

$$= \sigma \int_0^L x \, dx$$

$$= \sigma \cdot \frac{L^2}{2}$$

$$\therefore F_1 = \frac{\sigma}{2} L$$

Figure 12B:
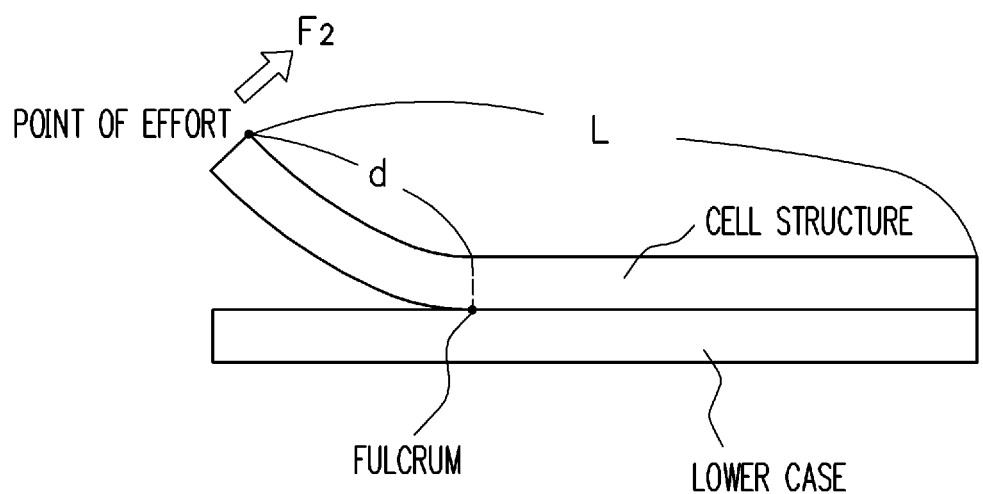
FIG. 12B is a schematic side view for explaining a pull force required to peel off the cell structure in the first aspect from the case of the electronic device.

FIG. 12B illustrates how the cell structure in this aspect is peeled off from the case of the electronic device.

Since the cell structure in this aspect is bent when peeled off, when the pull force applied to the point of effort is set to $F_2$, the distance from the fulcrum of the cell structure to the point of effort is set to d, and the adhesive force per unit area is set to $\sigma$, the following relations are established. Here, d illustrated in FIG. 12b is smaller than L because the cell structure in this aspect is bent. In the following Mathematical equation 2, d=⅕ L is set as an example, but d is not limited to this value and is a value to be determined beforehand in the range smaller than L by experiments, or the like.

[Mathematical Equation 2]

$$d = \frac{1}{5}L \text{ is set}$$
$$F_2 = \frac{1}{5} \cdot \frac{\sigma}{2} L$$
$$= \frac{1}{5}F_1$$

[Mathematical equation 2]

When the cell structure is bent, d is set to a value smaller than L, and thus with this value, $F_2 < F_1$ is established, resulting in that the cell structure in this aspect can be peeled off with a pull force smaller than that of the cell structure in the comparative example.

The cell structure 110 in this aspect includes a stack structure that is more flexible than a structure including a metal current collector and an electrode composition layer formed on a surface of the metal current collector and made of a binder resin, and the stack structure includes: a resin current collector containing a conductive resin composition; and an electrode composition layer formed on a surface of the resin current collector and containing a coated active material having at least a part of a surface thereof coated with a coating material containing a polymer compound. Therefore, since the cell structure in this aspect is bent when peeled off, the cell structure 110 can be peeled off with a smaller pull force than the hard cell structure that is not bent when removed from the electronic device, and the cell structure 110 can be easily peeled off without damaging the lithium ion cell.

Modified Example

Figure 13A:
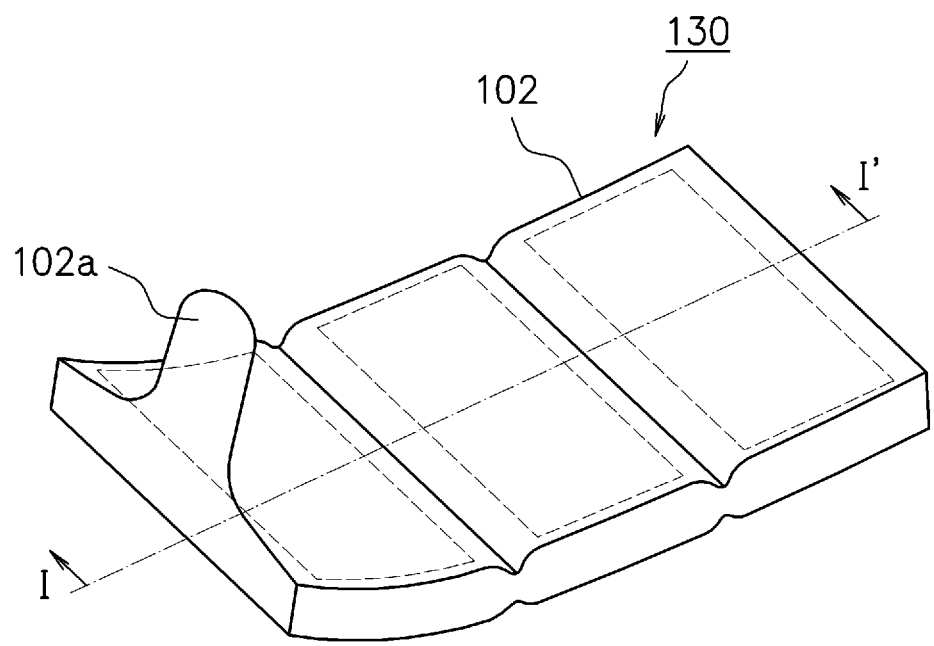
FIG. 13A is a schematic perspective view illustrating a cell structure according to a modified example of the first aspect.
Figure 13B:
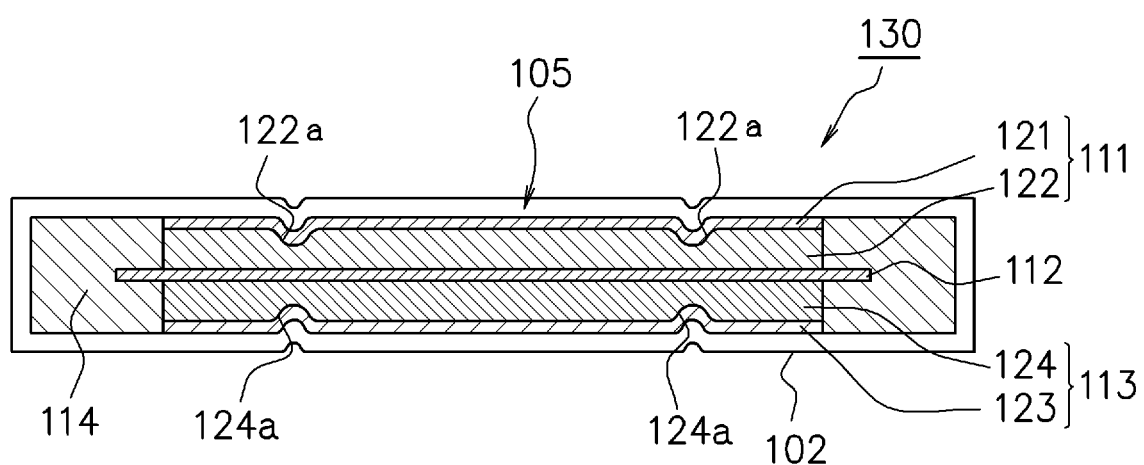
FIG. 13B is a schematic cross-sectional view taken along I-I' of the cell structure in FIG. 13A.

Hereinafter, a modified example of the first aspect will be explained. FIG. 13A and FIG. 13B are schematic views illustrating a cell structure according to the modified example of this aspect, FIG. 13A is a schematic perspective view, and FIG. 13B is a schematic cross-sectional view taken along I-I' in FIG. 13A.

In a cell structure 130 in this modified example, a lithium-ion secondary cell 105 is formed in a manner that the positive electrode 111 and the negative electrode 113 are stacked with the separator 112 arranged therebetween and the sealing portion 114 surrounding an outer peripheral portion of the positive electrode 111, the separator 112, and the negative electrode 113 is provided, similarly to the lithium-ion secondary cell in the first aspect. In the lithium-ion secondary cell 105, the lithium-ion secondary cell 105 is divided into a plurality of parts (three in the example in FIG. 13A and FIG. 13B) with cuts 122a, 124a formed to a predetermined depth in the thickness direction at the same positions of the positive electrode active material layer 122 and the negative electrode active material layer 124. Here, the cuts 122a, 124a are non-penetrating grooves, and the divided parts of the positive electrode active material layer 122 and the negative electrode active material layer 124 are electrically connected.

In this modified example, since the lithium-ion secondary cell 105 of the cell structure 130 is divided into a plurality of parts, bending occurs at the places of the cuts 122a, 124a when the cell structure 130 is peeled off. When peeling off the cell structure 130 from the electronic device, the peeling off is enabled with a much smaller pull force than when peeling off the cell structure 110 according to the first aspect.

[Second Aspect]

Figure 14:
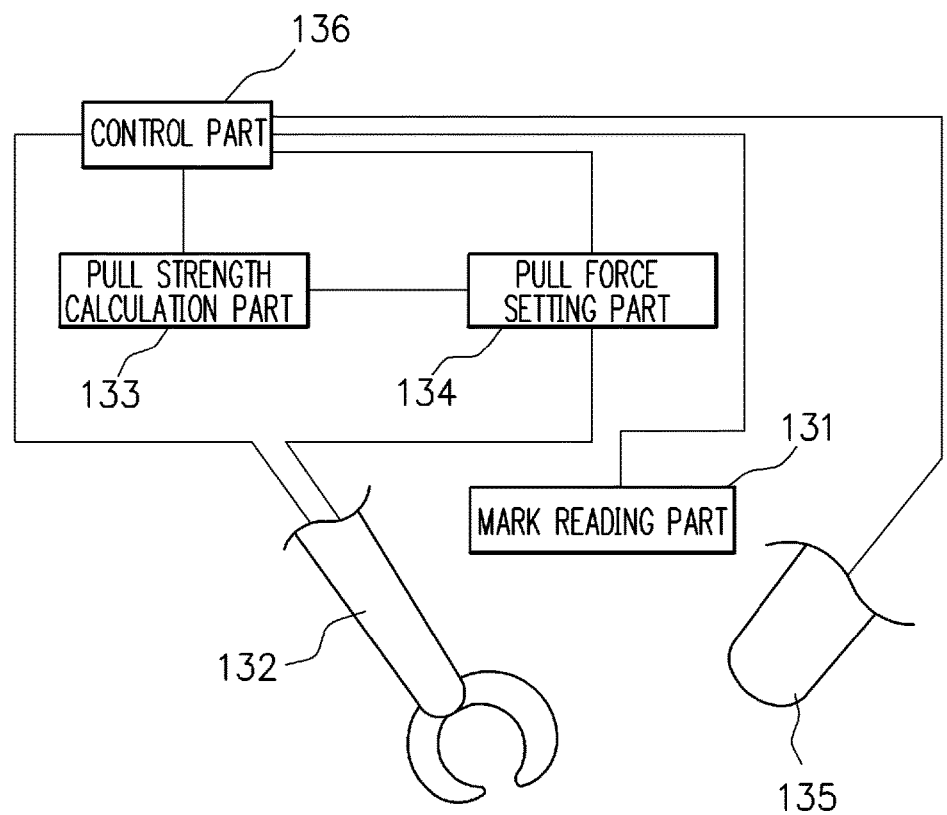
FIG. 14 is a schematic diagram illustrating a schematic configuration of a removal system of a cell structure according to a second aspect.

Next, as a second aspect, the removal system of the cell structure according to the first aspect (and the modified example) will be explained. FIG. 14 illustrates a schematic diagram illustrating a schematic configuration of the removal system of the cell structure according to this aspect.

This removal system includes a mark reading part 131, a robot arm 132, a pull strength calculation part 133, a pull force setting part 134, an ultraviolet irradiation part 135, and a control part 136 that controls these operations.

Figure 15A:
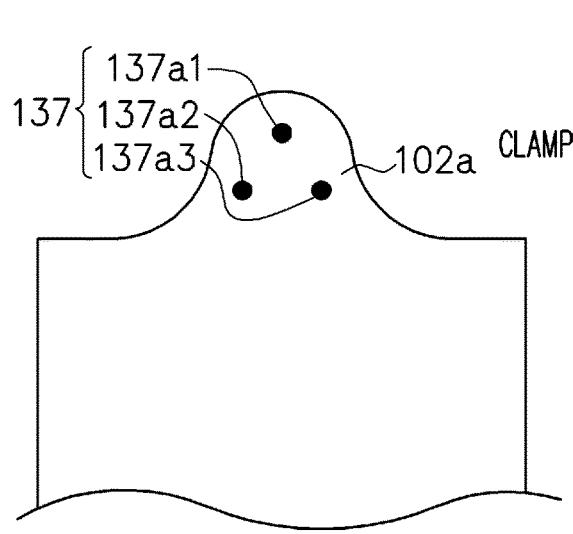
FIG. 15A is a schematic plan view illustrating a mark provided on a pinch portion 102a of an exterior film 102 of the cell structure.

In application to this removal system, as illustrated in FIG. 15A, in the cell structure 110 (including the case of the cell structure 120 or 130, which is omitted below) according to the first aspect (and the modified example), a mark 137 that can be read by image recognition is provided on the pinch portion 102a of the exterior film 102. The mark 137 includes, for example, three dots 137a1, 137a2, and 137a3, and the substance that forms these dots 137a1, 137a2, and 137a3 is not particularly limited, but the dots 137a1, 137a2, and 137a3 may be formed of, for example, a substance that emits light by ultraviolet irradiation. This formation enables the mark reading part 131 to easily read the position of the mark 137 by the ultraviolet irradiation part 135 irradiating the mark 137 with ultraviolet rays even when it is too dark to recognize the mark 137 by visible light.

The mark reading part 131 reads the mark 137 on the pinch portion 102a. Concretely, the mark reading part 131 reads each position of the three dots 137a1, 137a2, and 137a3 of the mark 137 by image recognition.

Figure 15B:
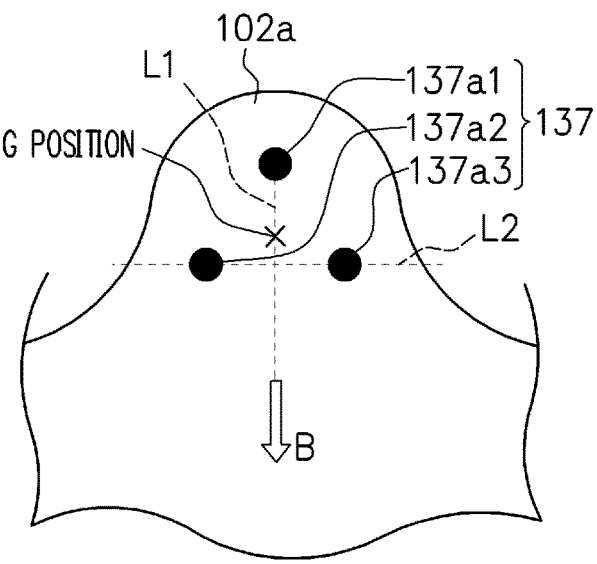
FIG. 15B is a schematic plan view illustrating a portion of the pinch portion 102a in FIG. 15A in an enlarged manner.

As illustrated in FIG. 15B, the control part 136 determines a clamping position to be grasped by the robot arm 132 based on the arrangement of the three dots 137a1, 137a2, and 137a3 read by image recognition by the mark reading part 131, estimates (calculates) the position where the cell structure 110 exists, and determines the direction in which the robot arm 132 pulls the cell structure 110. For example, when the two dots 137a2, 137a3 out of the three dots 137a1, 137a2, and 137a3 are arranged along the width direction (right and left direction in FIG. 15B) of the cell structure 110 and a line that vertically intersects an extension line L2 passing through these two dots 137a2, 137a3 and passes through the middle between these two dots 137a2, 137a3 is defined as L1, the single dot 137a1 is arranged on the line L1 and on the outer edge side of the cell structure 110 (in the upper direction in FIG. 15B) relative to the extension line L2. In the case where such an arrangement of the dots 137a1, 137a2, and 137a3 is read by the mark reading part 131, the control part 136 determines, as the clamping position, the point located on the dot 137a1 side relative to the extension line L2 passing through the two dots 137a2, 137a3 (namely, on the outer edge side of the cell structure 110 relative to the extension line L2) and based on the point where the dot 137a1 is located, further estimates that the cell structure 110 exists in a region opposite to the region where the dot 137a1 is located with respect to the extension line L2 (in a region below the extension line L2 in FIG. 15B). Based on the position where the cell structure 110 exists, which is estimated as above, the control part 136 determines the direction in which the robot arm 132 pulls the cell structure 110 (for example, the direction of an arrow B).

The robot arm 132 grasps, for example, the clamping position of the mark 137 of the pinch portion 102a based on the reading result of the mark 137 by the mark reading part 131, to peel off the cell structure 110.

The pull strength calculation part 133 calculates the pull strength required to peel off the cell structure 110 based on the adhesive area of the adhesive sheet 102 of the cell structure 110 and the adhesive force per unit area.

The pull force setting part 134 sets the pull force of the robot arm 132 in the determined pulling direction based on the pull strength calculated by the pull strength calculation part 133.

Figure 16:
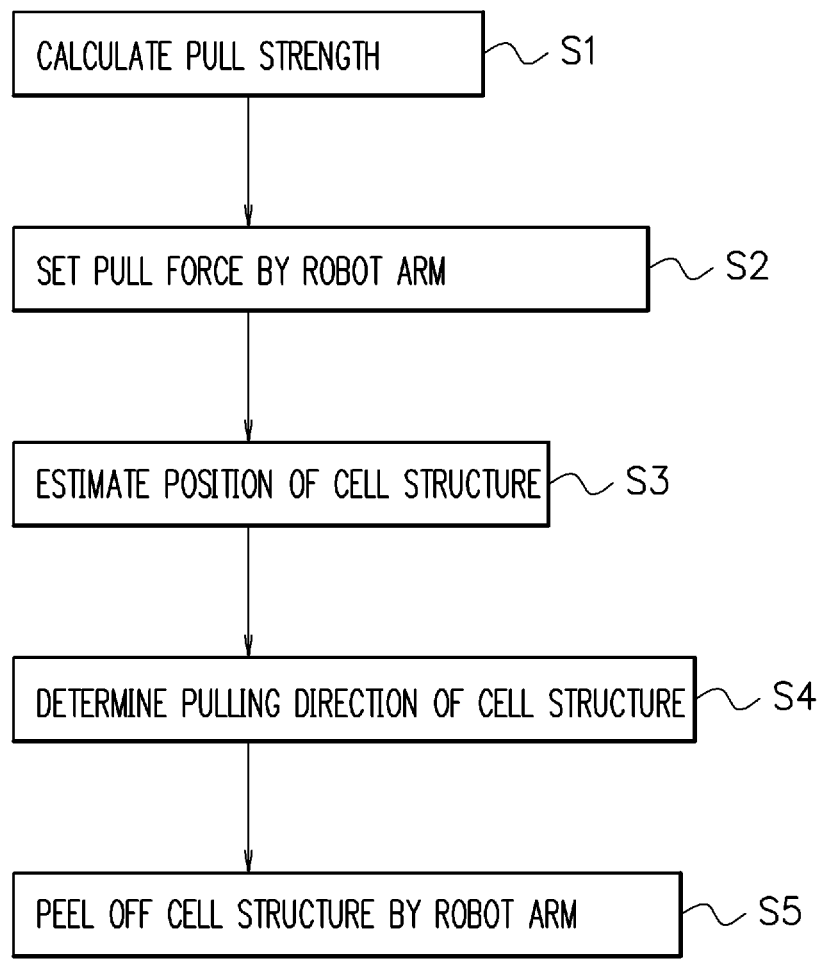
FIG. 16 is a flowchart illustrating a removing method of the cell structure according to the second aspect.

Hereinafter, there will be explained a method of peeling off and removing the cell structure 110 using the above-described removal system. FIG. 16 is a flowchart illustrating the removing method of the cell structure according to this aspect.

First, based on the control of the control part 136, the pull strength calculation part 133 calculates the pull strength required to peel off the cell structure 110 based on the adhesive area of the adhesive sheet 102 of the cell structure 110, which is an object to be peeled off, and the adhesive force per unit area (Step S1).

Then, based on the control of the control part 136, the pull force setting part 134 sets the pull force of the robot arm 132 in the determined pulling direction based on the pull strength calculated at Step S1 (Step S2).

Then, based on the control of the control part 136, the mark reading part 131 reads the mark 137 provided on the pinch portion 102a of the cell structure 110, which emits light with ultraviolet rays emitted from the ultraviolet irradiation part 135. The control part 136 determines the clamping position to be grasped by the robot arm 132 based on the arrangement of the three dots 137a1, 137a2, and 137a3 read by image recognition by the mark reading part 131, estimates the position where the cell structure 110 exists (Step S3), and determine the direction in which the robot arm 132 pulls the cell structure 110 (Step S4).

Then, the control part 136 controls the robot arm 132 to peel off the cell structure 110 (Step S5).

Figure 17:
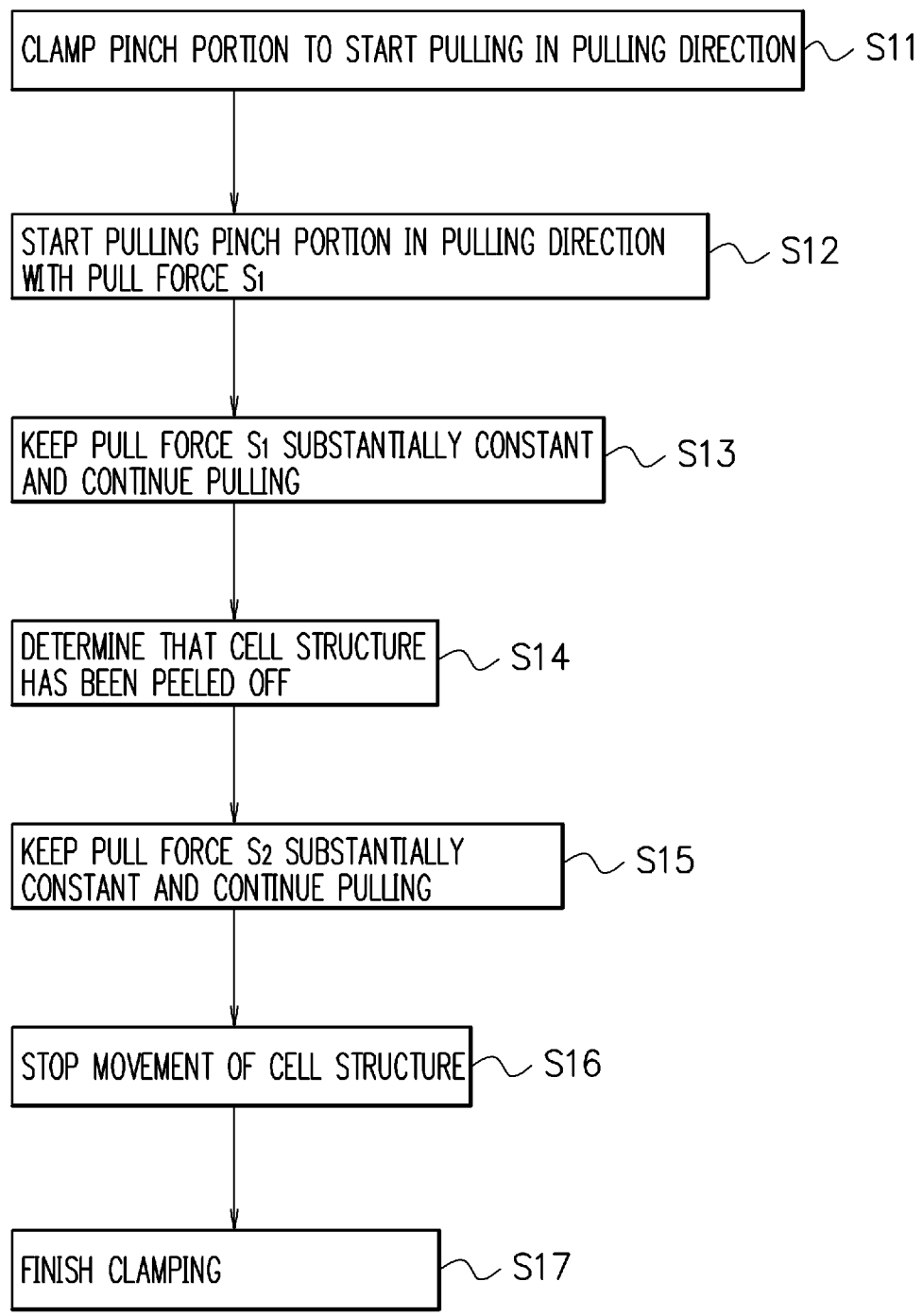
FIG. 17 is a flowchart explaining Step S5 in FIG. 16 in detail.
Figure 18:
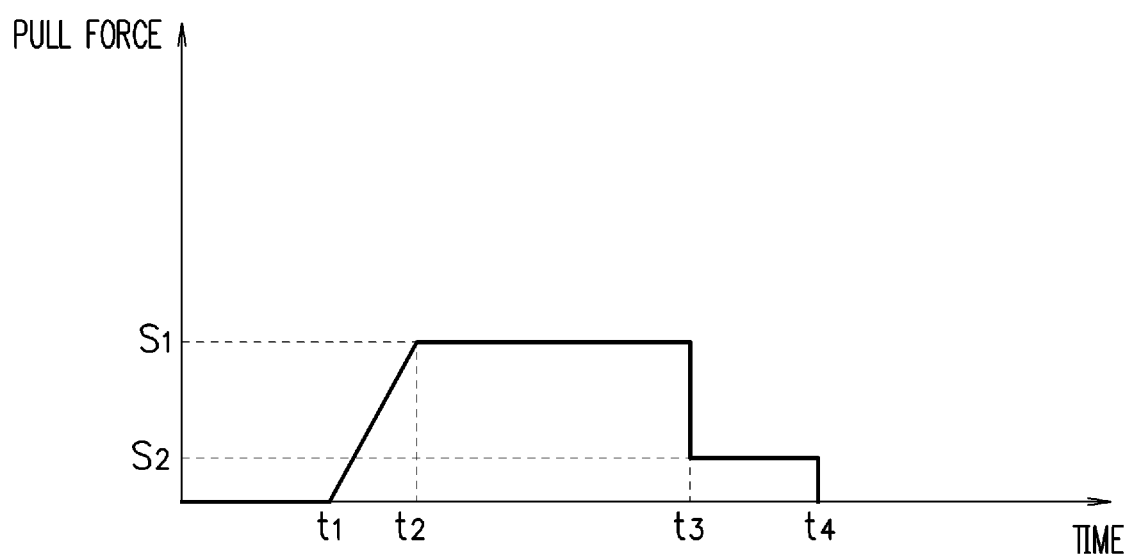
FIG. 18 is a characteristic diagram illustrating the relationship between an amount of movement of a robot arm 32 in a pulling direction and a pull force in a peeling process at Step S5.

FIG. 17 is a flowchart explaining Step S5 in detail. FIG. 18 is a characteristic diagram illustrating the relationship between an amount of movement of the robot arm 132 in the pulling direction and the pull force in the peeling step at Step S5. Incidentally, in the peeling step at Step S5, the steps of Step S15 ($t_3$ to $t_4$ in FIG. 18 corresponding to Step S15) and Step S16 ($t_4$ in FIG. 18 corresponding to Step S16) in FIG. 17 may be omitted, and the clamping may be finished after the cell structure 110 is peeled off by the robot arm 132.

First, based on the control of the control part 136, the robot arm 132 grasps (clamps), for example, the clamping position of the mark 137 of the pinch portion 102a based on the position where the cell structure 110 exists, which is estimated at Step S3, and starts pulling in the determined pulling direction (Step S11: $t_1$ in FIG. 18).

The robot arm 132 pulls the pinch portion 102a in the pulling direction with a set pull force $S_1$ and starts peeling off the adhesive sheet 104 (Step S12: $t_2$ in FIG. 18). The pull force $S_1$ is kept substantially constant and the pulling is continued (Step S13: $t_2$ to $t_3$ in FIG. 18). At the time $t_3$, the pull force of the robot arm 132 against the pinch portion 102a suddenly decreases to $S_2$, causing the control part 136 to determine that the cell structure 110 has been peeled off (Step S14: $t_3$ in FIG. 18). The pull force $S_2$ is the force (force corresponding to the weight of the cell structure 110) with which the robot arm 132 pulls the cell structure 110.

The robot arm 132 continues the substantially constant pull force S2 (Step S15: $t_3$ to $t_4$ in FIG. 18). The control part 136 determines that the cell structure 110 has moved to a predetermined mounting place at the time $t_4$, and stops movement of the cell structure 110 (Step S16: $t_4$ in FIG. 18).

Then, based on the control of the control part 136, the robot arm 132 releases the pinch portion 102a (Step S17).

Incidentally, in the above-described removing method of the cell structure, the start of peeling off and the finish of peeling off of the cell structure 110 are determined based on the time from the start of pulling, but in place of the time, the start of peeling off and the finish of peeling off may be determined based on the amount of movement of the robot arm 132. In this case, the start of peeling off and the finish of peeling off can be determined by determining the pull force applied to the robot arm 132.

When the cell structure is peeled off manually, there is a risk of electric shock during the process. In this aspect, the removal system of the cell structure is used to peel off the cell structure 110 not manually but automatically. According to the removal system in this aspect, the cell structure 110 can be safely and securely peeled off without damaging the lithium ion cell, in combination with the cell structure 110 having excellent flexibility.

In the removal system of the cell structure according to this aspect, as the control part 136, a computer including, for example, a CPU, a RAM, a ROM, a storage medium such as an HDD, a display part, and an operation part is applied. As a matter of course, the control part 136 is not limited to this form, but can also be an information terminal such as a PDA, a tablet PC, or a cellular phone, or the like. As the display part of the control part 136, for example, various display devices such as a liquid crystal display device are applied. As the operation part of the control part 136, various input devices such as a keyboard and a touch panel are applied. A computer program for controlling the removal system of the cell structure is stored in the ROM or the storage medium. This computer program is, for example, a program for achieving various functions of the mark reading part 131, the pull strength calculation part 133, the pull force setting part 134, and so on, namely, a program corresponding to the flowcharts illustrated in FIG. 16 (Steps S1 to S5) and FIG. 17 (Steps S11 to S17) in the second aspect, for example. Then, the CPU of the control part 136 reads the computer program from the ROM or the storage medium, and executes it using the RAM as a working area. As a result, the control part 136 controls the respective parts of the removal system of the cell structure.

[Various Aspects of the Battery Pack]

Hereinafter, there will be explained various aspects of the battery pack.

In recent years, deep-sea equipment, submersible research vessels, diving robots, and so on, have been increasingly required to have deeper diving depths and longer diving times, and batteries as their main power sources or power sources of instruments, communication devices, and so on mounted in them have also been increasingly required to have larger capacities.

Further, batteries used in the deep sea have been required to have a constitution for use in a high-pressure environment, and Patent Literature 3 (Japanese Laid-open Patent Publication No. 2007-18573) has disclosed a battery including a pressure equalizer having an extensible bellows as the battery used in the deep sea.

Further, Patent Literature 4 (Japanese Laid-open Patent Publication No. 2018-125213) has disclosed a unit cell made of a lithium ion cell, and has described that a plurality of the cells are stacked in series to be used as a stacked-type cell module.

The present inventors examined whether such a lithium ion cell as described in Patent Literature 4 (Japanese Laid-open Patent Publication No. 2018-125213) was able to be used in a high-pressure environment. The lithium ion cell described in Patent Literature 4 Japanese Laid-open Patent Publication No. 2018-125213) includes a unit cell having a positive electrode current collector, a positive electrode active material layer, a separator, a negative electrode active material layer, and a negative electrode current collector stacked in order and containing an electrolytic solution, and includes a fixing portion that is arranged between the positive electrode current collector and the negative electrode current collector, fixes a peripheral edge portion of the separator between the positive electrode current collector and the negative electrode current collector, and seals the positive electrode active material layer, the separator, and the negative electrode active material layer.

When a lithium ion battery in which the unit cells described in Patent Literature 4 (Japanese Laid-open Patent Publication No. 2018-125213) are stacked, was used in a high-pressure environment, a large dent was sometimes made in a gap between the positive electrode active material layer and the negative electrode active material layer and the surrounding fixing portion. There was a concern that such a dent would cause a stress concentration in this dent, to cause cracks in the positive electrode current collector and/or the negative electrode current collector.

From the above examinations, it appeared that some improvement was necessary to make such a lithium ion cell as described in Patent Literature 4 (Japanese Laid-open Patent Publication No. 2018-125213) usable in a high-pressure environment. The battery described in Patent Literature 3 (Japanese Laid-open Patent Publication No. 2007-18573) was designed to be used in a high-pressure environment, but due to a different battery basic constitution in this battery, it was difficult to improve the cell described in Patent Literature 4 (Japanese Laid-open Patent Publication No. 2018-125213) by referring to the configuration described in Patent Literature 3 (Japanese Laid-open Patent Publication No. 2007-18573).

These various aspects have been made in consideration of the above-described problem, and an object thereof is to provide a battery pack suitable for use in a high-pressure environment.

These various aspects relate to a battery pack that is a battery pack including two or more unit cells each including: a set of a stack unit having a positive electrode current collector, a positive electrode active material layer, a separator, a negative electrode active material layer, and a negative electrode current collector stacked in order; and an annular frame member arranged around the above-described positive electrode active material layer, the above-described separator, and the above-described negative electrode active material layer between the above-described positive electrode current collector and the above-described negative electrode current collector, in which in each of the unit cells composing the battery pack, the difference in thickness between a portion where the above-described frame member exists and a portion where the above-described stack unit exists is 0.3 mm or less, and in each of the unit cells composing the battery pack, the gap between the above-described frame member and the above-described stack unit is 0.5 mm or less, and relate to a battery pack that is a battery pack including two or more unit cells each including: a set of a stack unit having a positive electrode current collector, a positive electrode active material layer, a separator, a negative electrode active material layer, and a negative electrode current collector stacked in order; and an annular frame member arranged around the above-described positive electrode active material layer, the above-described separator, and the above-described negative electrode active material layer between the above-described positive electrode current collector and the above-described negative electrode current collector, in which a step filler is provided on the positive electrode current collector and/or on the negative electrode current collector on the above-described frame member and in a gap between the above-described frame member and the above-described stack unit, and the above-described step filler is provided so as to obtain 0.3 mm or less of a difference between a thickness at a portion where the above-described frame member exists, a thickness at a portion between the portion where the above-described frame member exists and a portion where the above-described stack unit exists, and a thickness at the portion where the above-described stack unit exists.

According to this aspect, it is possible to provide a battery pack suitable for use in a high-pressure environment.

Hereinafter, when referring to the lithium ion cell, the concept includes a lithium-ion secondary cell.

(First Aspect)

A battery pack in a first aspect is a battery pack including two or more unit cells each including: a set of a stack unit having a positive electrode current collector, a positive electrode active material layer, a separator, a negative electrode active material layer, and a negative electrode current collector stacked in order; and an annular frame member arranged around the above-described positive electrode active material layer, the above-described separator, and the above-described negative electrode active material layer between the above-described positive electrode current collector and the above-described negative electrode current collector, in which in each of the unit cells composing the battery pack, the difference in thickness between a portion where the above-described frame member exists and a portion where the above-described stack unit exists is 0.3 mm or less, and in each of the unit cells composing the battery pack, the gap between the above-described frame member and the above-described stack unit is 0.5 mm or less.

Figure 19:
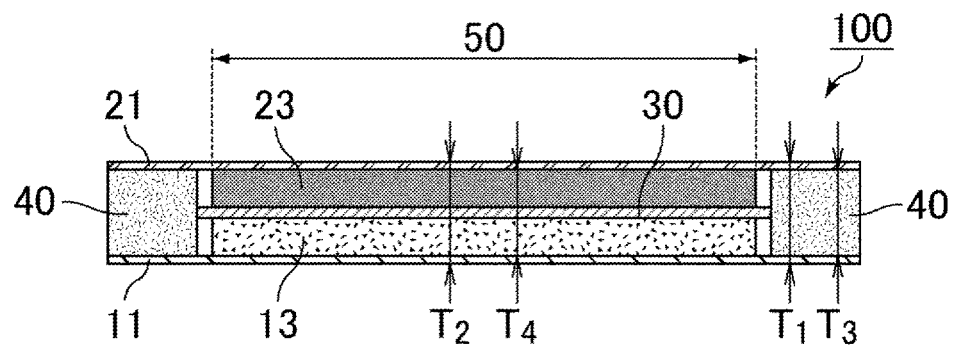
FIG. 19 is a cross-sectional view schematically illustrating one example of a unit cell composing a battery pack.

First, there will be explained the case where the unit cell composing the battery pack is the unit cell in the first aspect. FIG. 19 is a cross-sectional view schematically illustrating one example of the unit cell composing the battery pack. A unit cell 100 illustrated in FIG. 19 includes a positive electrode current collector 11, a positive electrode active material layer 13, a separator 30, a negative electrode active material layer 23, and a negative electrode current collector 21 stacked in this order, with the positive electrode current collector 11 and the negative electrode current collector 21 being the outermost layers. A stack unit 50 includes the positive electrode current collector 11, the positive electrode active material layer 13, the separator 30, the negative electrode active material layer 23, and the negative electrode current collector 21.

The stack unit 50 is a position where all the elements of the positive electrode current collector 11, the positive electrode active material layer 13, the separator 30, the negative electrode active material layer 23, and the negative electrode current collector 21 exist in the vertical direction in such a cross section as illustrated in FIG. 19, and is a region indicated by a double-headed arrow (reference numeral 50) in FIG. 19. The region of the positive electrode current collector 11 that is not in contact with the positive electrode active material layer 13 and the region of the negative electrode current collector 21 that is not in contact with the negative electrode active material layer 23 are not contained in the stack unit.

The annular frame member 40 is arranged around the positive electrode active material layer 13, the separator 30, and the negative electrode active material layer 23 between the positive electrode current collector 11 and the negative electrode current collector 21. The unit cell is sealed with the frame member 40, the positive electrode current collector 11 and the negative electrode current collector 21, in which an electrolytic solution is enclosed.

Incidentally, the annular frame member means a structure that is annular when the unit cell is viewed from the top, and is a structure that allows the stack unit to be arranged within the ring of the frame member. Further, the frame member may be a single annular frame member made by a frame member arranged around the positive electrode active material and a frame member arranged around the negative electrode active material being bonded together. FIG. 19 illustrates the single annular frame member 40 without distinguishing between the single annular frame member made by frame members being bonded together and the frame member that is originally a single annular frame member.

In the unit cell, the difference in thickness between a portion where the frame member exists and a portion where the stack unit exists is 0.3 mm or less. The thicknesses of the portion where the frame member exists and the portion where the stack unit exists each include the thicknesses of the positive electrode current collector and the negative electrode current collector. The thickness of the portion where the frame member exists is the thickness indicated by both arrows T1 in FIG. 19, and the thickness of the portion where the stack unit exists is the thickness indicated by both arrows T2 in FIG. 19.

The difference in thickness between the portion where the frame member exists and the portion where the stack unit exists is determined as follows. The thicknesses at five or more points of the portion where the frame member exists are measured, and the average thickness of the measured thicknesses is set as the thickness of the portion where the frame member exists (a frame member thickness). Similarly, the thicknesses at five or more points of the portion where the stack unit exists are measured, and the average thickness of the measured thicknesses is set as the thickness of the portion where the stack unit exists (a stack unit thickness). The absolute value of the difference between the above-described frame member thickness and the above-described stack unit thickness is determined as the difference in thickness between the portion where the frame member exists and the portion where the stack unit exists.

Further, the difference between the total thickness of the thickness of the positive electrode active material layer, the thickness of the separator, and the thickness of the negative electrode active material layer and the thickness of the frame member is preferably 0.3 mm or less. The total thickness of the thickness of the positive electrode active material layer, the thickness of the separator, and the thickness of the negative electrode active material layer is the thickness indicated by both arrows T4 in FIG. 19, and the thickness of the frame member is the thickness indicated by both arrows T3 in FIG. 19. The unit cell illustrated in FIG. 19 is a form in which the difference in thickness between the portion where the frame member exists and the portion where the stack unit exists is reduced by matching the thickness of the frame member with the total thickness of the thickness of the positive electrode active material layer, the thickness of the separator, and the thickness of the negative electrode active material layer.

The difference in thickness between the portion where the frame member exists and the portion where the stack unit exists is reduced, to thereby make the level difference between the portion where the frame member exists and the portion where the stack unit exists small when the unit cells are stacked. This prevents occurrence of a stress concentration between the frame member and the stack unit when pressure is applied to the battery pack.

Figure 20:
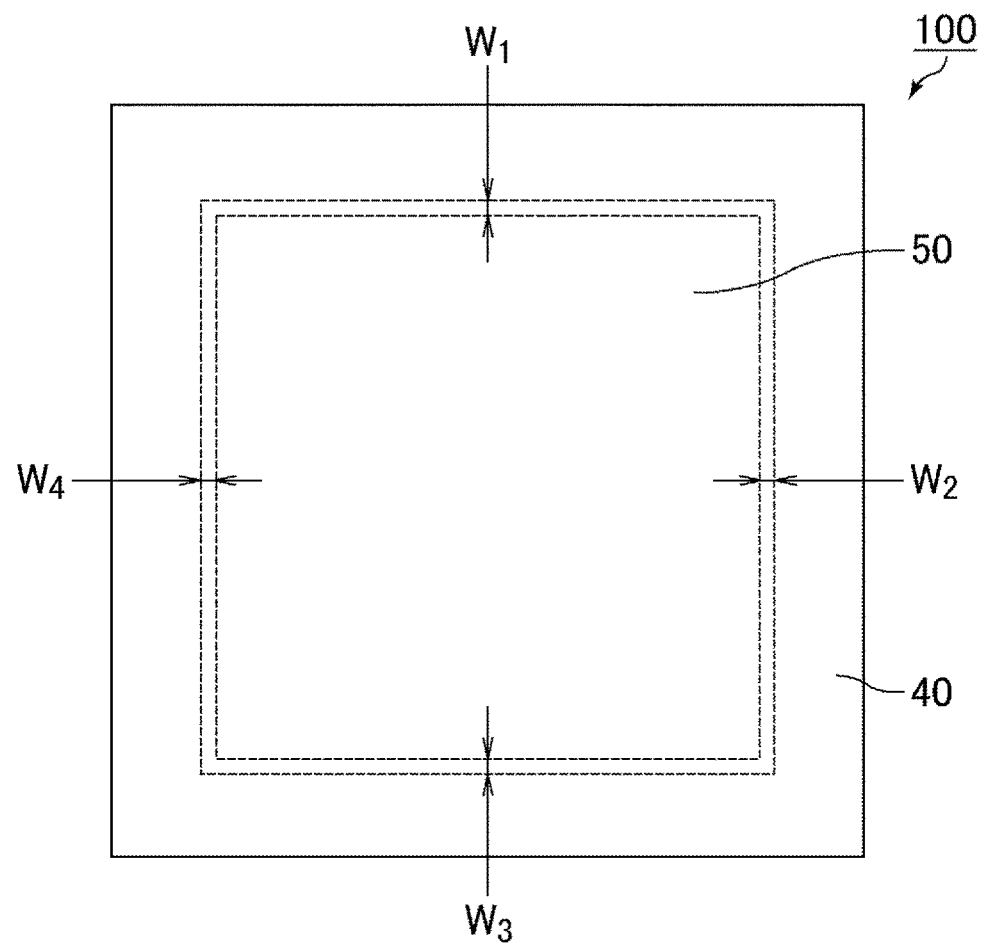
FIG. 20 is a top view for explaining how to determine a gap between a frame member and a stack unit.

Further, the gap between the frame member and the stack unit is 0.5 mm or less in each of the unit cells composing the battery pack. There is explained how to determine the gap between the frame member and the stack unit in the unit cell with reference to the drawing. FIG. 20 is a top view for explaining how to determine the gap between the frame member and the stack unit. The unit cell is viewed from the top, the gap (distance) between the frame member and the stack unit is measured at four or more measurement points, and the average value of the measured values is set as the gap between the frame member and the stack unit. When the top view shape of the stack unit is polygonal, the middle of each of the sides forming the polygon is set to the measurement point. FIG. 20 illustrates that the gaps between the frame member 40 and the stack unit 50 are indicated by both arrows $W_1$, $W_2$, $W_3$, and $W_4$ in the middle of each of the sides of the quadrangle. The average value of $W_1$, $W_2$, $W_3$, and $W_4$ is set to the gap between the frame member and the stack unit.

When the gap between the frame member and the stack unit, which is determined in this manner, is small, there is less room for a dent to occur in the gap between the frame member and the stack unit when pressure is applied to the battery pack in which the unit cells are stacked, to thereby make it difficult to cause a problem that the stress concentration occurs in the dent. Further, the gap between the frame member and the stack unit is preferably 0.3 mm or less, and more preferably 0.1 mm or less. Further, the lower limit value of the gap between the frame member and the stack unit is preferably 0 mm and is also preferably 0.05 mm.

Figure 21:
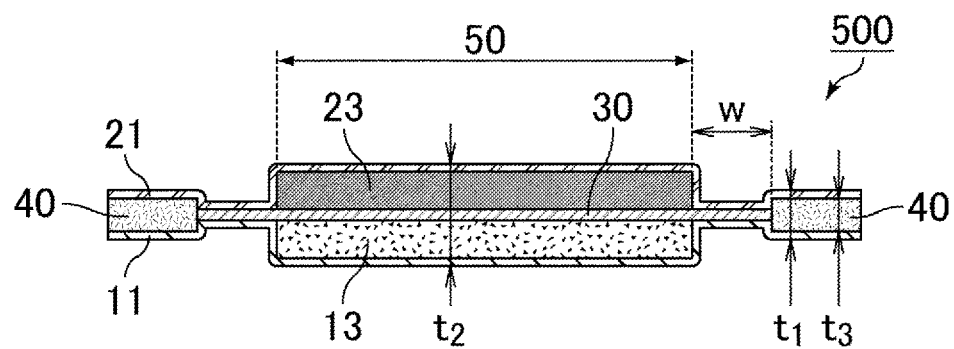
FIG. 21 is a cross-sectional view schematically illustrating one example of a unit cell that has a large difference in thickness between a portion where the frame member exists and a portion where the stack unit exists and has a large gap between the frame member and the stack unit.

For the comparison with the battery pack in these various aspects, there are explained problems to occur when the difference in thickness between the portion where the frame member exists and the portion where the stack unit exists is large and the gap between the frame member and the stack unit is large. FIG. 21 is a cross-sectional view schematically illustrating one example of a unit cell that has a large difference in thickness between the portion where the frame member exists and the portion where the stack unit exists and a large gap between the frame member and the stack unit.

A unit cell 500 illustrated in FIG. 21 includes the positive electrode current collector 11, the positive electrode active material layer 13, the separator 30, the negative electrode active material layer 23, and the negative electrode current collector 21 stacked in this order, with the positive electrode current collector 11 and the negative electrode current collector 21 being the outermost layers. The stack unit 50 includes the positive electrode current collector 11, the positive electrode active material layer 13, the separator 30, the negative electrode active material layer 23, and the negative electrode current collector 21. The annular frame member 40 is arranged around the positive electrode active material layer 13, the separator 30, and the negative electrode active material layer 23 between the positive electrode current collector 11 and the negative electrode current collector 21.

In this unit cell 500, the thickness of the frame member (thickness indicated by both arrows $t_3$) is thin, and thus a thickness $t_1$ of the portion where the frame member exists is thinner than a thickness $t_2$ of the portion where the stack unit exists. Further, the gap (width indicated by a double-headed arrow w) between the frame member and the stack unit is large.

Figure 22:
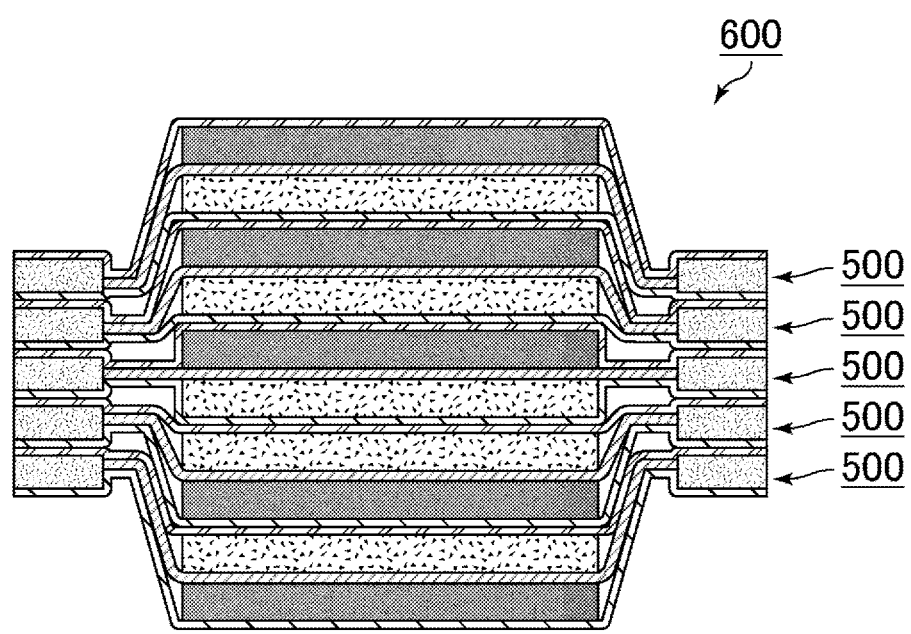
FIG. 22 is a cross-sectional view schematically illustrating one example of a battery pack in which the unit cells illustrated in FIG. 21 are stacked.

FIG. 22 is a cross-sectional view schematically illustrating one example of a battery pack in which the unit cells illustrated in FIG. 21 are stacked. A battery pack 600 illustrated in FIG. 22 is formed of the five unit cells 500 illustrated in FIG. 21 being stacked. FIG. 22 schematically illustrates a state where pressure has been applied to the battery pack 600 in a high-pressure environment. It can be seen that when pressure is applied to the battery pack 600, a large dent is made in the gap between the frame member and the stack unit. Then, there is a concern that such a dent will cause a stress concentration in this dent, to cause cracks in the positive electrode current collector and/or the negative electrode current collector.

On the other hand, a battery pack having two or more of such unit cells as illustrated in FIG. 19 is one example of the battery pack. FIG. 23 is a cross-sectional view schematically illustrating one example of the battery pack in which the unit cells illustrated in FIG. 19 are stacked. A battery pack 300 illustrated in FIG. 23 is formed of the five unit cells 100 illustrated in FIG. 19 being stacked. FIG. 23 illustrates a state where pressure has been applied to the battery pack 300 in a high-pressure environment. Since the unit cell 100 composing the battery pack 300 has a small difference in thickness between the portion where the frame member exists and the portion where the stack unit exists, the level difference between the portion where the frame member exists and the portion where the stack unit exists is small when the unit cells are stacked. Therefore, the stress concentration is prevented from occurring between the frame member and the stack unit when pressure is applied to the battery pack. Further, since the unit cell 100 composing the battery pack 300 has a small gap between the frame member and the stack unit, there is less room for a dent to occur in the gap between the frame member and the stack unit when pressure is applied to the battery pack in which the unit cells are stacked, to thereby make it difficult to cause a problem that the stress concentration occurs in the dent.

Hereinafter, there will be explained preferred forms of components composing the unit cell. The positive electrode active material layer contains the positive electrode active material. Examples of the positive electrode active material include composite oxides of lithium and transition metals {composite oxides with one transition metal (such as $LiCoO_2$, $LiNiO_2$, $LiAlMnO_4$, $LiMnO_2$, and $LiMn_2O_4$), composite oxides with two transition metal elements (such as, for example, $LiFeMnO_4$, $LiNi_{1-x}Co_xO_2$, $LiMn_{1-y}Co_yO_2$, $LiNi_{1/3}Co_{1/3}Al_{1/3}O_2$, and $LiNi_{0.8}Co_{0.15}Al_{0.05}O_2$), composite oxides with three or more metal elements [such as, for example, $LiM_aM'_bM''_cO_2$ (where M, M', and M'' are different transition metal elements and a+b+c=1 is satisfied, for example, $LiNi_{1/3}Mn_{1/3}Co_{1/3}O_2$)] and so on}, lithium-containing transition metal phosphates (for example, $LiFePO_4$, $LiCoPO_4$, $LiMnPO_4$, and $LiNiPO_4$), transition metal oxides (for example, $MnO_2$ and $V_2O_5$), transition metal sulfides (for example, $MoS_2$ and $TiS_2$), conductive polymers (for example, polyaniline, polypyrrole, polythiophene, polyacetylene and poly-p-phenylene and polyvinylcarbazole), and so on, and two or more of them may be used in combination. Incidentally, the lithium-containing transition metal phosphate may be one in which a part of the transition metal site is replaced with another transition metal.

The positive electrode active material is preferably a coated positive electrode active material coated with a conductive aid and a coating resin. When the periphery of the positive electrode active material is coated with the coating resin, the change in volume of the electrode is mitigated, thereby making it possible to suppress the expansion of the electrode.

Examples of the conductive aid include metallic conductive aids [such as aluminum, stainless steel (SUS), silver, gold, copper, and titanium], carbon-based conductive aids [such as graphite and carbon black (such as acetylene black, ketjen black, furnace black, channel black, and thermal lamp black)], mixtures thereof, and so on. These conductive aids may be used alone, or two or more of them may be used in combination. Further, these alloys may also be used as metal oxides. Among them, from the viewpoint of electrical stability, aluminum, stainless steel, silver, gold, copper, titanium, the carbon-based conductive aids, and mixtures thereof are more preferred, silver, gold, aluminum, stainless steel, and the carbon-based conductive aids are further preferred, and the carbon-based conductive aids are particularly preferred. Further, these conductive aids may also be one obtained by applying a conductive material [preferably a metal one among the above-described conductive aids] around a particle-based ceramic material or a resin material by plating or the like.

The shape (form) of the conductive aid is not limited to the particle form, but may be a form other than the particle form, and may be a form that has been put to practical use as what is called a filler-based conductive aid such as carbon nanofibers or carbon nanotubes.

The ratio of the coating resin to the conductive aid is not particularly limited, but from the viewpoint of internal resistance of the cell, or the like, the ratio of the coating resin (resin solid weight):the conductive aid is preferably 1:0.01 to 1:50, and more preferably 1:0.2 to 1:3.0 by weight ratio.

As the coating resin, the one described in Japanese Laid-open Patent Publication No. 2017-054703 as a resin for coating nonaqueous secondary cell active materials can be suitably used.

Further, the positive electrode active material layer may contain a conductive aid in addition to the conductive aid contained in the coated positive electrode active material.

As the conductive aid, the same one as the conductive aid contained in the above-described coated positive electrode active material can be suitably used.

The positive electrode active material layer is preferably a non-bound body that contains the positive electrode active material and does not contain a binding agent that binds the positive electrode active materials together. Here, the non-bound body means that the position of the positive electrode active material is not fixed by a binding agent (to be also referred to as a binder) and that the positive electrode active materials are not irreversibly fixed to each other and the positive electrode active material is not irreversibly fixed to the current collector.

The positive electrode active material layer 22 may contain an adhesive resin. As the adhesive resin, for example, there can be suitably used one prepared by mixing a small amount of an organic solvent with the resin for coating nonaqueous secondary cell active materials, described in Japanese Laid-open Patent Publication No. 2017-054703 and adjusting the glass transition temperature of the mixture to room temperature or less, one described as an adhesive in Japanese Laid-open Patent Publication No. 10-255805, and so on.

Incidentally, the adhesive resin means a resin that has adhesiveness (properties that allow adhesion by applying slight pressure without the use of water, solvent, heat, or the like) without becoming solid even when a solvent component is volatilized and dried. On the other hand, a solution-drying binder for electrodes used as the binding agent means a binder that dries and solidifies by volatilizing a solvent component, thereby firmly bonding and fixing active materials to each other.

Therefore, the solution-drying binder for electrodes (binding agent) and the adhesive resin are different materials.

The thickness of the positive electrode active material layer is not particularly limited, but from the viewpoint of cell performance, it is preferably 150 to 600 µm, and more preferably 200 to 450 µm.

The negative electrode active material layer contains the negative electrode active material.

As the negative electrode active material, well-known negative electrode active materials for lithium ion cells can be used, and examples thereof include carbon-based materials [graphite, non-graphitizable carbon, amorphous carbon, and resin burned bodies (such as, for example, burned and carbonized phenol resin, furan resin, and so on), cokes (such as, for example, pitch coke, needle coke, and petroleum coke), carbon fiber, and so on], silicon-based materials [silicon, silicon oxide (SiOx), silicon-carbon composites (such as carbon particles coated with silicon and/or silicon carbide, silicon particles or silicon oxide particles coated with carbon and/or silicon carbide, and silicon carbide), silicon alloys (such as a silicon-aluminum alloy, a silicon-lithium alloy, a silicon-nickel alloy, a silicon-iron alloy, a silicon-titanium alloy, a silicon-manganese alloy, a silicon-copper alloy, and a silicon-tin alloy), and so on], conductive polymers (such as, for example, polyacetylene and polypyrrole), metals (such as tin, aluminum, zirconium, and titanium), metal oxides (such as titanium oxide and lithium.titanium oxide), metal alloys (such as, for example, a lithium-tin alloy, a lithium-aluminum alloy, and a lithium-aluminum-manganese alloy), and so on, mixtures of these with carbon-based materials, and so on.

Further, the negative electrode active material may be a coated negative electrode active material coated with a conductive aid and a coating resin similar to the above-described coated positive electrode active material. As the conductive aid and the coating resin, the same conductive aid and coating resin as those of the above-described coated positive electrode active material can be suitably used.

Further, the negative electrode active material layer may also contain a conductive aid other than the conductive aid contained in the coated negative electrode active material. As the conductive aid, the same conductive aid as that contained in the above-described coated positive electrode active material can be suitably used.

The negative electrode active material layer is, similarly to the positive electrode active material layer, preferably a non-bound body that does not contain a binding agent that binds the negative electrode active materials together. Further, similarly to the positive electrode active material layer, an adhesive resin may be contained.

The thickness of the negative electrode active material layer is not particularly limited, but from the viewpoint of cell performance, it is preferably 150 to 600 µm, and more preferably 200 to 450 µm.

As the materials constituting the positive electrode current collector and the negative electrode current collector (to be also simply referred to as a current collector collectively below), there can be cited metal materials such as copper, aluminum, titanium, stainless steel, nickel, and their alloys, and baked carbon, a conductive polymer material, conductive glass, and so on. Among these materials, from the viewpoints of light weight, corrosion resistance, and high electrical conductivity, aluminum is preferred as the positive electrode current collector and copper is preferred as the negative electrode current collector.

Further, the current collector is preferably a resin current collector made of a conductive polymer material. The shape of the current collector is not particularly limited, but may be a sheet-shaped current collector made of the above-described material and a deposition layer made of fine particles made of the above-described material. The thickness of the current collector is not particularly limited, but is preferably 50 to 500 µm.

For example, a conductive polymer or a resin to which a conductive agent has been added as necessary can be used as the conductive polymer material that constitute the resin current collector. As the conductive agent constituting the conductive polymer material, the same conductive aid as that contained in the above-described coated positive electrode active material can be suitably used.

Examples of the resin constituting the conductive polymer material include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethyl acrylate (PMA), polymethyl methacrylate (PMMA), polyvinylidene fluoride (PVdF), epoxy resin, silicone resin, mixtures thereof, and so on. From the viewpoint of electrical stability, polyethylene (PE), polypropylene (PP), polymethylpentene (PMP), and polycycloolefin (PCO) are preferred, and polyethylene (PE), polypropylene (PP), and polymethylpentene (PMP) are further preferred.

Further, as the current collector, a current collector with a metal layer provided on one or both surfaces of the resin current collector may be used. As the metal, there can be cited copper, aluminum, titanium, stainless steel, nickel, their alloys, and so on, which are cited as the metals constituting the current collector itself as an example. The method of providing the metal layer includes methods such as metal deposition and sputtering.

Examples of the separator include well-known separators for lithium ion cells such as a porous film made of polyethylene or polypropylene, a laminated film of a porous polyethylene film and porous polypropylene, a nonwoven fabric made of synthetic fibers (such as polyester fibers and aramid fibers), glass fibers, or the like, and those made by attaching ceramic fine particles such as silica, alumina, or titania to surfaces of these.

The positive electrode active material layer and the negative electrode active material layer contain an electrolytic solution. As the electrolytic solution, a well-known electrolytic solution containing an electrolyte and a nonaqueous solvent, which is used for the manufacture of well-known lithium ion cells, can be used.

As the electrolyte, ones used for well-known electrolytic solutions, and so on can be used, and examples of the electrolyte include inorganic acid lithium salts such as $LiN(FSO_2)_2$, $LiPF_6$, $LiBF_4$, $LiSbF_6$, $LiAsF_6$, and $LiClO_4$, organic acid lithium salts such as $LiN(CF_3SO_2)_2$, $LiN(C_2F_5SO_2)_2$, and $LiC(CF_3SO_2)_3$, and so on. Among these, imide-based electrolytes [such as $LiN(FSO_2)_2$, $LiN(CF_3SO_2)_2$, and $LiN(C_2F_5SO_2)_2$], and $LiPF_6$ are preferred from the viewpoint of cell power output and charge-discharge cycle characteristics.

As the nonaqueous solvent, ones used for well-known electrolytic solutions, and so on can be used, and for example, a lactone compound, a cyclic or chain carbonic acid ester, a chain carboxylic acid ester, a cyclic or chain ether, a phosphoric acid ester, a nitrile compound, an amide compound, a sulfone, a sulfolane, and so on and mixtures thereof can be used.

The electrolyte concentration of the electrolytic solution is preferably 1 to 5 mol/L, more preferably 1.5 to 4 mol/L, and further preferably 2 to 3 mol/L. If the electrolyte concentration of the electrolytic solution is less than 1 mol/L, it is sometimes impossible to obtain sufficient input/output characteristics of the cell, and if it exceeds 5 mol/L, the electrolyte precipitates in some cases. Incidentally, the electrolyte concentration of the electrolytic solution can be confirmed by extracting the electrolytic solution that is a component of an electrode for a lithium ion cell or a lithium ion cell without using a solvent, or the like, and measuring the concentration.

The frame member is not particularly limited as long as it is a material durable against the electrolytic solution, and polymer materials are preferred and thermosetting polymer materials are more preferred. Concrete examples of the material include an epoxy-based resin, a polyolefin-based resin, a polyurethane-based resin, a polyvinylidene fluoride resin, and so on, and the epoxy-based resin is preferred due to its high durability and easy handling.

(Second Aspect)

A battery pack in a second aspect is a battery pack including two or more unit cells each including: a set of a stack unit having a positive electrode current collector, a positive electrode active material layer, a separator, a negative electrode active material layer, and a negative electrode current collector stacked in order; and an annular frame member arranged around the above-described positive electrode active material layer, the above-described separator, and the above-described negative electrode active material layer between the above-described positive electrode current collector and the above-described negative electrode current collector, in which a step filler is provided on the positive electrode current collector and/or on the negative electrode current collector on the above-described frame member and in a gap between the above-described frame member and the above-described stack unit, and the above-described step filler is provided so as to obtain 0.3 mm or less of a difference between a thickness at a portion where the above-described frame member exists, a thickness at a portion between the portion where the above-described frame member exists and a portion where the above-described stack unit exists, and a thickness at the portion where the above-described stack unit exists.

Hereinafter, there will be explained the case where the unit cell composing the battery pack is the unit cell in the second aspect. In the unit cell in the second aspect, the step filler is provided on the positive electrode current collector and/or on the negative electrode current collector on the frame member and in the gap between the frame member and the stack unit. The step filler is provided so as to obtain 0.3 mm or less of the difference between the thickness at the portion where the frame member exists, the thickness at the portion between the portion where the frame member exists and the portion where the stack unit exists, and the thickness at the portion where the stack unit exists.

FIG. 24 is a cross-sectional view schematically illustrating another example of the unit cell composing the battery pack. A unit cell 200 illustrated in FIG. 24 includes the positive electrode current collector 11, the positive electrode active material layer 13, the separator 30, the negative electrode active material layer 23, and the negative electrode current collector 21 stacked in this order, with the positive electrode current collector 11 and the negative electrode current collector 21 being the outermost layers. The stack unit 50 includes the positive electrode current collector 11, the positive electrode active material layer 13, the separator 30, the negative electrode active material layer 23, and the negative electrode current collector 21. The annular frame member 40 is arranged around the positive electrode active material layer 13, the separator 30, and the negative electrode active material layer 23 between the positive electrode current collector 11 and the negative electrode current collector 21.

Further, a step filler 60 is provided on the positive electrode current collector 11 on the frame member 40, on the positive electrode current collector 11 in the gap between the frame member 40 and the stack unit 50, on the negative electrode current collector 21 on the frame member 40, and on the negative electrode current collector 21 in the gap between the frame member 40 and the stack unit 50. The step filler 60 is not provided on the positive electrode current collector 11 in contact with the positive electrode active material layer 13, nor on the negative electrode current collector 21 in contact with the negative electrode active material layer 23.

The step filler is provided to fill the steps at the portion where the frame member exists, the portion between the portion where the frame member exists and the portion where the stack unit exists, and the portion where the stack unit exists. Without considering the step filler, the thickness $t_1$ of the portion where the frame member exists is much thinner than the thickness $t_2$ of the portion where the stack unit exists. When the step filler is provided on the current collector on the frame member, a thickness $T_1$ of the portion where the frame member exists becomes thick and the difference between the thickness $T_1$ of the portion where the frame member exists and the thickness $t_2$ of the portion where the stack unit exists becomes small. In addition, the step filler is provided on the current collector in the gap between the frame member and the stack unit, and thereby a thickness $T_5$ of the portion between the portion where the frame member exists and the portion where the stack unit exists becomes thick and the difference between the thickness $T_5$, the thickness $T_1$ of the portion where the frame member exists, and the thickness $t_2$ of the portion where the stack unit exists becomes small. Concretely, the step filler is provided so as to obtain 0.3 mm or less of the difference between the thickness $T_1$ of the portion where the frame member exists, the thickness $T_5$ of the portion between the portion where the frame member exists and the portion where the stack unit exists, and the thickness $t_2$ of the portion where the stack unit exists.

The difference between the thickness of the portion where the frame member exists, the thickness of the portion between the portion where the frame member exists and the portion where the stack unit exists, and the thickness of the portion where the stack unit exists, when the step filler is provided, is obtained by measuring thicknesses at five or more points of each of the portions to obtain average values and obtaining the difference between the maximum value and the minimum value of the average values.

Incidentally, in FIG. 24, on the positive electrode side, the step filler 60 is provided on the lower side of the positive electrode current collector 11 on the outer side of the frame member 40, but when the step filler is provided on the outer side of the current collector regardless of the top and bottom in the drawing, it is assumed that "the step filler is provided on the current collector."

In the unit cell in the second aspect as well, the gap between the frame member and the stack unit is preferably 0.5 mm or less. Further, using the unit cell in the second aspect makes it possible to obtain the same effects as those in the case of using the unit cell in the first aspect. That is, the stress concentration is prevented from occurring between the frame member and the stack unit when pressure is applied to the battery pack. Further, since the gap in the unit cell is small, there is less room for a dent to occur in the unit cell when pressure is applied to the battery pack in which the unit cells are stacked, to thereby make it difficult to cause a problem that the stress concentration occurs in the dent.

The respective components composing the unit cell in the second aspect can be the same as those that form the unit cell in the first aspect, so that their detailed explanation is omitted. In the unit cell in the second aspect, the material of the step filler is not particularly limited, but it is preferably a resin material. Any material that can be applied and cured on the current collector may be used, and examples of the material include an epoxy-based resin, a polyolefin-based resin, a polyurethane-based resin, a polyvinylidene-based fluoride resin, and so on.

Then, manufacturing methods of the unit cell and the battery pack are explained. The unit cell 100 can be manufactured as follows. The positive electrode current collector 11 is bonded to one frame surface of the annular frame member to seal one end of the frame member. Then, the positive electrode active material to be the positive electrode active material layer 13 is filled into the inside of the frame member. At this time, it is preferable to fill the frame member with as much positive electrode active material as possible so as not to create a gap between the frame member and the positive electrode active material layer. Then, the separator is arranged on the other frame surface of the frame member. Similarly, the negative electrode current collector 21 is bonded to one frame surface of the annular frame member to seal one end of the frame member. Then, the negative electrode active material to be the negative electrode active material layer 23 is filled into the inside of the frame member. At this time, it is preferable to fill the frame member with as much negative electrode active material as possible so as not to create a gap between the frame member and the negative electrode active material layer. Then, the separator is arranged on the other frame surface of the frame member. Then, the frame members are bonded to each other to be sealed, and thereby the unit cell 100 can be obtained. The two bonded frame members are combined to be the frame member 40. Incidentally, in the above-described example, the separator is arranged on both the frame member filled with the positive electrode active material and the frame member filled with the negative electrode active material, and the two separators are overlapped, to thereby be the separator 30, but the separator may be arranged on only one frame member. The thickness of the frame member is preferably adjusted so as to obtain 0.3 mm or less of the difference between the total thickness of the thickness of the positive electrode active material layer, the thickness of the separator, and the thickness of the negative electrode active material layer and the thickness of the frame member. The unit cell manufactured in this manner is the unit cell in the first aspect.

Further, after the unit cell is prepared without adjusting the thickness of the frame member, the step filler is provided so as to fill the steps at the portion where the frame member exists, the portion between the portion where the frame member exists and the portion where the stack unit exists, and the portion where the stack unit exists, and thereby, the unit cell in the second aspect can be manufactured. The step filler can be provided on the current collector by applying and curing the resin material constituting the step filler.

A plurality of the unit cells manufactured in this manner are stacked, thereby making it possible to manufacture the battery pack.

When stacking the unit cells, they are stacked in the same direction so that the positive electrode current collector of the unit cell and the negative electrode current collector of the adjacent unit cell come into contact with each other, and thereby the battery pack in which a plurality of the unit cells are connected in series can be obtained.

Further, even when the battery pack with the step filler provided on the outer side thereof is prepared, the battery pack suitable for use in a high-pressure environment can be provided.

Figure 25:
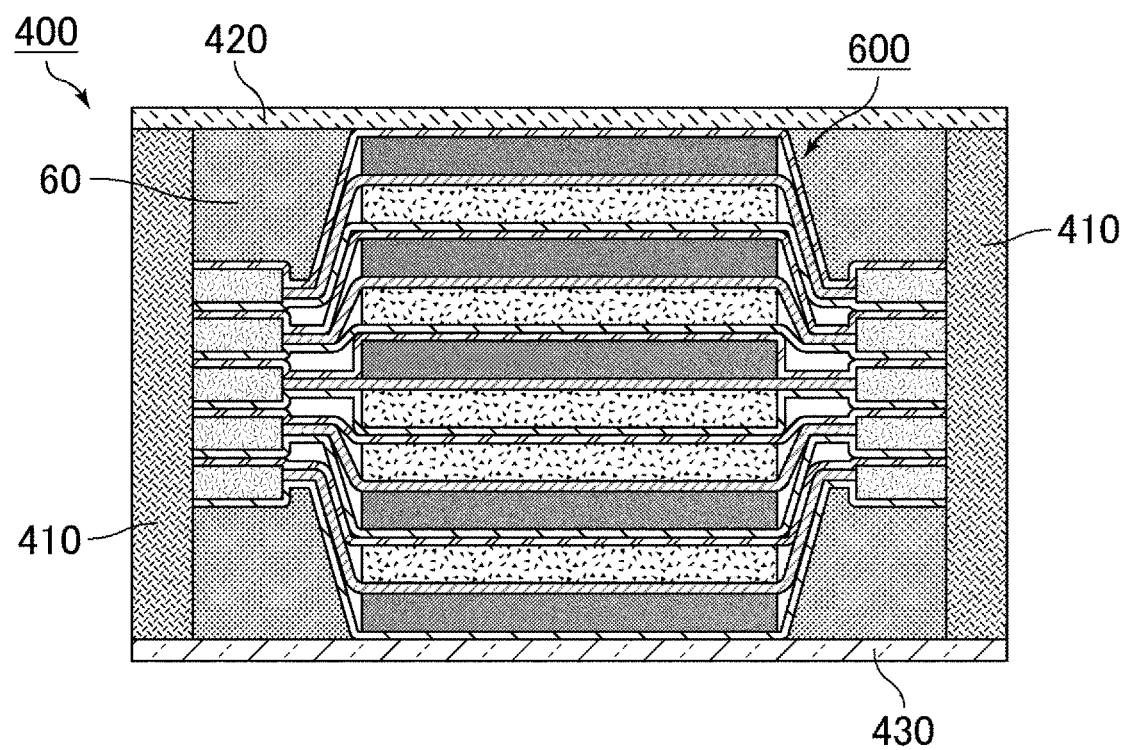
FIG. 25 is a cross-sectional view schematically illustrating one example of a battery pack with a step filler provided on an outer side of the battery pack.

FIG. 25 is a cross-sectional view schematically illustrating one example of the battery pack with the step filler provided on the outer side thereof. A battery pack 400 illustrated in FIG. 25 is based on such a battery pack as the battery pack 600 illustrated in FIG. 22, including the unit cells each having a large difference in thickness between the portion where the frame member exists and the portion where the stack unit exists, being stacked. In the battery pack 400, the battery pack 600 illustrated in FIG. 22 is surrounded by an outer frame member 410, an upper frame member 420, and a lower frame member 430. Then, the step filler 60 is provided in gaps between the battery pack 600 and the respective frame members. As the step filler 60, the step filler that is a component of the unit cell in the second aspect can be used. When the entire battery pack 400 illustrated in FIG. 25 is viewed, the level difference between the outer frame member 410 and the battery pack 600 is small, which prevents a stress concentration from occurring between the outer frame member 410 and the battery pack 600 when pressure is applied to the battery pack 400. Therefore, the battery pack can be made suitable for use in a high-pressure environment.

Example

Next, the present invention will be explained concretely with reference to examples, but the present invention is not limited to these examples unless they deviate from the scope of the present invention. Incidentally, unless otherwise noted, part(s) means part(s) by weight, and % means % by weight.

<Preparation of a Resin Solution for Coating>

Eighty-three parts of ethyl acetate and 17 parts of methanol were put in a four-neck flask equipped with a stirrer, a thermometer, a reflux cooling tube, a dropping funnel, and a nitrogen gas introduction tube, and the temperature was raised to 68° ° C. Then, a monomer blending solution blending 242.8 parts of methacrylic acid, 97.1 parts of methyl methacrylate, 242.8 parts of 2-ethylhexyl methacrylate, 52.1 parts of ethyl acetate, and 10.7 parts of methanol, and an initiator solution made by dissolving 0.263 parts of 2,2'-azobis(2,4-dimethylvaleronitrile) in 34.2 parts of ethyl acetate were continuously dripped into the four-neck flask over 4 hours with nitrogen blowing into the flask by the dropping funnel under stirring, and radical polymerization was performed. After the dripping was finished, an initiator solution made by dissolving 0.583 parts of 2,2'-azobis(2,4-dimethylvaleronitrile) in 26 parts of ethyl acetate was continuously added over 2 hours by using the dropping funnel. Further, the polymerization was continued for 4 hours at the boiling point. After the solvent was removed and 582 parts of resin were obtained, 1,360 parts of isopropanol were added to obtain a resin solution for coating made of a vinyl resin with a resin concentration of 30% by weight.

<Preparation of a Positive Electrode Composition>

Ninety-four parts of $LiNi_{0.8}Co_{0.15}Al_{0.05}O_2$ powder were put in a universal mixer, and with stirring at 150 rpm at room temperature (25° C.), the above-described resin solution for coating (with a resin solid concentration of 30% by weight) was dripped and mixed over 60 minutes so as to be 3 parts as a resin solid content, and the mixture was further stirred for 30 minutes.

Then, 3 parts of acetylene black [DENKA BLACK (registered trademark) manufactured by Denka Company Limited] (average particle diameter (primary particle diameter): 0.036 μm) were mixed in three portions with stirring, the temperature was raised to 70° C. with stirring for 30 minutes, and the pressure was reduced to 100 mmHg and held for 30 minutes to obtain coated positive electrode active material particles. A positive electrode material mixture was obtained by dry-blending 100 parts of the coated positive electrode active material particles and 6 parts of carbon fiber (DONACARBO Milled S-243 manufactured by Osaka Gas Chemicals Co., Ltd.: average fiber length 500 μm, average fiber diameter 13 μm: electrical conductivity 200 mS/cm). Thereafter, 11 parts of an electrolytic solution were added to the positive electrode material mixture and the mixture was mixed in a mixer to obtain a positive electrode composition.

<Preparation of a Negative Electrode Composition>

Eighty-eight parts of non-graphitizable carbon [Carbotron (registered trademark) PS (F) manufactured by Kureha Battery Materials Japan Co., Ltd.] were put in a universal mixer, and with stirring at 150 rpm at room temperature (25° C.), the resin solution for coating (with a resin solid concentration of 30% by weight) was dripped and mixed over 60 minutes so as to be 6 parts as a resin solid content, and the mixture was further stirred for 30 minutes. Then, 6 parts of acetylene black [DENKA BLACK (registered trademark) manufactured by Denka Company Limited] (average particle diameter (primary particle diameter): 0.036 μm) were mixed in three portions with stirring, the temperature was raised to 70° C. with stirring for 30 minutes, and the pressure was reduced to 0.01 MPa and held for 30 minutes to obtain coated negative electrode active material particles. A negative electrode material mixture was obtained by dry-blending 100 parts of the coated negative electrode active material particles and 1 part of carbon fiber (DONACARBO Milled S-243 manufactured by Osaka Gas Chemicals Co., Ltd.: average fiber length 500 μm, average fiber diameter 13 μm: electrical conductivity 200 mS/cm). Thereafter, 0.11 parts of an electrolytic solution were added to the negative electrode material mixture and the mixture was mixed in a mixer to obtain a negative electrode composition.

<Preparation of the Electrolytic Solution>

The electrolytic solution was obtained by dissolving $LiPF_6$ in a mixed solvent of ethylene carbonate (EC) and propylene carbonate (PC) (volume ratio 1:1) at a ratio of 1 mol/L.

<Production of a Positive Electrode Current Collector>

A positive electrode resin current collector material was obtained by melt-kneading, in a twin-screw extruder, 69.7 parts of polypropylene (PP) [product name "SunAllomer PC630S," manufactured by SunAllomer Ltd.], 25.0 parts of acetylene black [DENKA BLACK (registered trademark) manufactured by Denka Company Limited], and 5.0 parts of a dispersing agent [product name "Yumex 1001 (acid modified polypropylene)," manufactured by Sanyo Chemical Industries, Ltd.] under the conditions of 180° C., 100 rpm, and a residence time of 5 minutes. The obtained positive electrode resin current collector material was passed through a T-die extrusion film forming machine and then rolled a plurality of times by a heat pressing machine to obtain a positive electrode current collector having a film thickness of 42 μm.

<Production of a Negative Electrode Current Collector>

A negative electrode resin current collector material was obtained by melt-kneading, in a twin-screw extruder, 70 parts of polypropylene [product name "SunAllomer PL500A," manufactured by SunAllomer Ltd.], 25 parts of nickel particles [manufactured by Vale], and 5.0 parts of a dispersing agent [product name "Yumex 1001," manufactured by Sanyo Chemical Industries, Ltd.] under the conditions of 200° C. and 200 rpm. The obtained negative electrode resin current collector material was passed through a T-die extrusion film forming machine and then rolled a plurality of times by a heat pressing machine to obtain a negative electrode current collector base material having a film thickness of 45 μm. A copper metal layer was formed on one surface of this negative electrode resin current collector base material by a vacuum deposition method so as to have a thickness of 5 nm, and a negative electrode current collector with a metal layer provided on one surface was obtained.

Example 1

An annular frame member made of an epoxy resin with a rectangular top view was prepared. One end of the positive electrode current collector was bonded to one frame surface of the frame member. The positive electrode composition was filled into the inside of the frame member, and a separator was arranged on the other frame surface of the frame member. A frame member different from the frame member filled with the positive electrode composition was prepared, and one end of the negative electrode current collector was bonded to one frame surface of the frame member in the same manner as the above-described procedure, in a direction in which the metal layer would come into contact with the negative electrode composition. The negative electrode composition was filled into the inside of the frame member, and a separator was arranged on the other frame surface of the frame member. The frame member filled with the positive electrode composition and the frame member filled with the negative electrode composition were bonded together with the separators facing each other, and sealed to obtain a unit cell. The dimensions of this unit cell were adjusted so as to obtain 0 mm of the difference between the total thickness of the thickness of the positive electrode active material layer, the thickness of the separator, and the thickness of the negative electrode active material layer and the thickness of the frame member. Further, the electrode composition was filled so as to obtain 0 mm of the gap between the frame member and the stack unit. In this unit cell, the difference in thickness between the portion where the frame member exists and the portion where the stack unit exists is 0 mm.

Examples 2 to 4, Comparative Examples 1 to 3

Unit cells were prepared by changing the thickness of the frame member or changing the gap between the frame member and the stack unit. The difference in thickness between the portion where the frame member exists and the portion where the stack unit exists in each of the unit cells, and so on are illustrated in Table 1.

(Preparation of a Battery Pack and Pressure Test)

Eight unit cells obtained in each of the examples and comparative examples were stacked to obtain a battery pack. Then, the entire battery pack was covered with an aluminum laminate film to be subjected to vacuuming (vacuum packed), and thereby pressurization simulating the case where the battery pack is placed in a high-pressure environment was performed on the battery pack.

(Observation of an Appearance)

Each of aluminum laminate cells that had been subjected to the pressure test was observed for the presence or absence of a dent in the gap between the frame member and the stack unit. The observation results are illustrated in Table 1.

(Observation of the Current Collector)

The aluminum laminate cell that had been subjected to the pressure test was opened and the state of the current collector of the unit cell was observed. The presence or absence of cracks in the current collector was observed and the observation results are illustrated in Table 1.

TABLE 1

| | DIFFERENCE IN THICKNESS BETWEEN FRAME MEMBER AND STACK UNIT [mm] | GAP BETWEEN FRAME MEMBER AND STACK UNIT [mm] | DENT IN GAP | CRACK IN CURRENT COLLECTOR |
|---|---|---|---|---|
| EXAMPLE 1 | 0 | 0 | NONE | NONE |
| EXAMPLE 2 | 0 | 0.5 | NONE | NONE |
| EXAMPLE 3 | 0.3 | 0 | NONE | NONE |
| EXAMPLE 4 | 0.3 | 0.5 | NONE | NONE |
| COMPARATIVE EXAMPLE 1 | 0.6 | 0.5 | DEEP DENT PRESENT | PRESENT |
| COMPARATIVE EXAMPLE 2 | 0.3 | 3.0 | DEEP DENT PRESENT | PRESENT |
| COMPARATIVE EXAMPLE 3 | 0.6 | 3.0 | DEEP DENT PRESENT | PRESENT |

Figure 26:
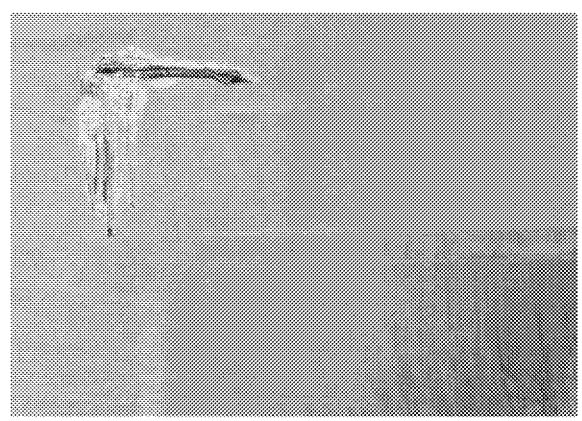
FIG. 26 is a photograph illustrating a part of a top surface of a laminate cell in Example 1 in an enlarged manner.
Figure 27:
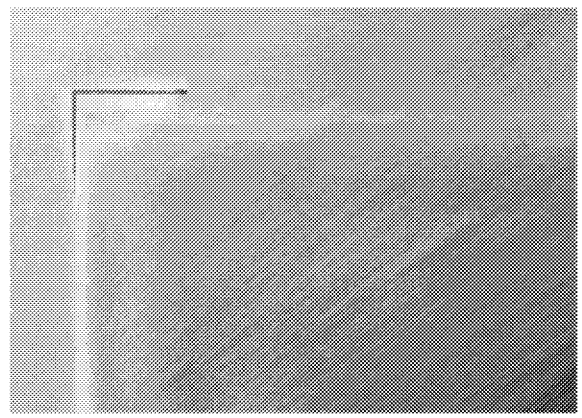
FIG. 27 is a photograph illustrating a part of a top surface of a laminate cell in Example 2 in an enlarged manner.
Figure 28:
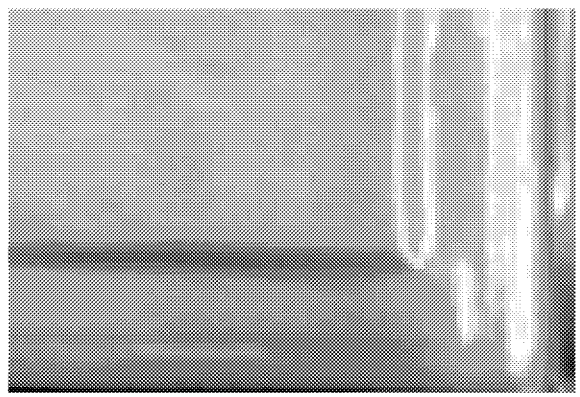
FIG. 28 is a photograph illustrating a part of a top surface of a laminate cell in Comparative example 1 in an enlarged manner.
Figure 29:
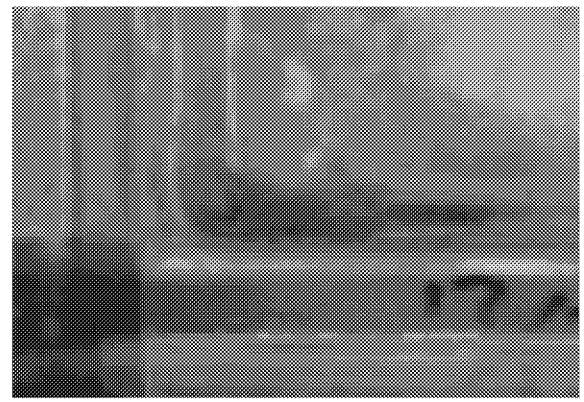
FIG. 29 is a photograph illustrating a part of a top surface of a laminate cell in Comparative example 2 in an enlarged manner.
Figure 30:
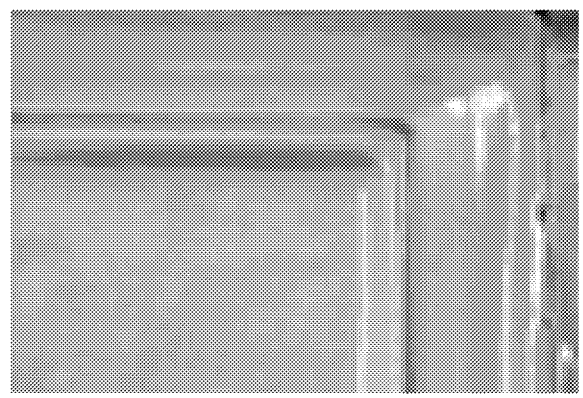
FIG. 30 is a photograph illustrating a part of a top surface of a laminate cell in Comparative example 3 in an enlarged manner.

Photographs illustrating the presence or absence of a dent in Examples 1 and 2 and Comparative examples 1, 2, and 3 are illustrated in the drawings, respectively. Each of the drawings illustrates an enlarged photograph of the vicinity of a vertex of the rectangular-shaped stack unit viewed from the top. FIG. 26 is a photograph illustrating a part of the top surface of the laminate cell in Example 1 in an enlarged manner, and FIG. 27 is a photograph illustrating a part of the top surface of the laminate cell in Example 2 in an enlarged manner. The black lines in FIG. 26 and FIG. 27 each are an eyemark used for microscopic observation (indicating the position of the vertex of the rectangular-shaped stack unit). FIG. 28 is a photograph illustrating a part of the top surface of the laminate cell in Comparative example 1 in an enlarged manner, FIG. 29 is a photograph illustrating a part of the top surface of the laminate cell in Comparative example 2 in an enlarged manner, and FIG. 30 is a photograph illustrating a part of the top surface of the laminate cell in Comparative example 3 in an enlarged manner.

As illustrated in FIG. 26 and FIG. 27, in Example 1 and Example 2, no dent is seen in the gap between the frame member and the stack unit. On the other hand, as illustrated in FIG. 28, FIG. 29, and FIG. 30, it can be seen that in each of Comparative examples 1 to 3, a dent is seen in the gap between the frame member and the stack member.

These results reveal that in the battery packs in Examples 1 to 4, a stress concentration was prevented from occurring between the frame member and the stack unit when pressure was applied, and occurrence of cracks in the current collector was prevented.

Example 5

Figure 31:
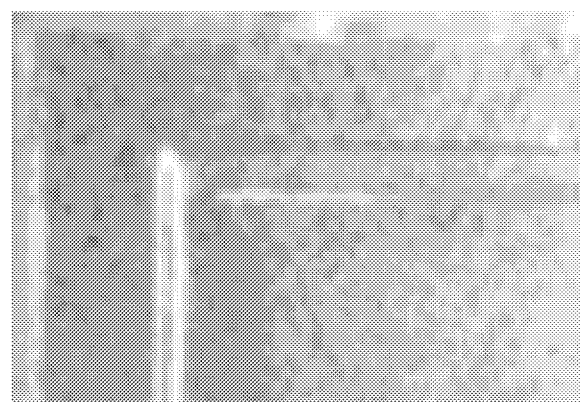
FIG. 31 is a photograph illustrating a part of a top surface of a laminate cell in Example 5 in an enlarged manner.

The unit cell in Comparative example 3 was prepared, and then had an epoxy resin as the step filler applied to be cured so as to fill the steps at the portion where the frame member exists, the portion between the portion where the frame member exists and the portion where the stack unit exists, and the portion where the stack unit exists. In this unit cell, the difference between the thickness at the portion where the frame member exists, the thickness at the portion between the portion where the frame member exists and the portion where the stack unit exists, and the thickness at the portion where the stack unit exists is 0 mm. When a battery pack was prepared in the same manner as in Example 1, to be subjected to a pressure test, there was no dent in the gap between the frame member and the stack unit, and no cracks in the current collector were observed. FIG. 31 is a photograph illustrating a part of the top surface of the laminate cell in Example 5 in an enlarged manner. As illustrated in FIG. 31, no dent in the gap between the frame member and the stack member is seen in Example 5 as well.

The above battery pack is particularly useful as a battery for use in a high-pressure environment.

As explained above, a battery pack in one aspect is a battery pack including two or more unit cells each including: a set of a stack unit having a positive electrode current collector, a positive electrode active material layer, a separator, a negative electrode active material layer, and a negative electrode current collector stacked in order; and an annular frame member arranged around the positive electrode active material layer, the separator, and the negative electrode active material layer between the positive electrode current collector and the negative electrode current collector, in which in each of the unit cells composing the battery pack, the difference in thickness between a portion where the frame member exists and a portion where the stack unit exists is 0.3 mm or less, and in each of the unit cells composing the battery pack, the gap between the frame member and the stack unit is 0.5 mm or less.

The cell system explained above may include the constitution of the battery pack according to this aspect.

Concretely, the above-explained stacked-type cell module includes a battery pack including two or more unit cells each including an annular frame member arranged around the positive electrode active material layer, the separator, and the negative electrode active material layer between the positive electrode current collector and the negative electrode current collector, when a set of a stack unit including the positive electrode current collector, the positive electrode active material layer, the separator, the negative electrode active material layer, and the negative electrode current collector stacked in order is defined, in each of the unit cells composing the battery pack, the difference in thickness between a portion where the frame member exists and a portion where the stack unit exists is 0.3 mm or less, and in each of the unit cells composing the battery pack, the gap between the frame member and the stack unit is 0.5 mm or less.

In the above-described battery pack in one aspect, the difference between the total thickness of the thickness of the positive electrode active material layer, the thickness of the separator, and the thickness of the negative electrode active material layer and the thickness of the frame member may be 0.3 mm or less.

As explained above, a battery pack in one aspect is a battery pack including two or more unit cells each including: a set of a stack unit having a positive electrode current collector, a positive electrode active material layer, a separator, a negative electrode active material layer, and a negative electrode current collector stacked in order; and an annular frame member arranged around the positive electrode active material layer, the separator, and the negative electrode active material layer between the positive electrode current collector and the negative electrode current collector, in which a step filler is provided on the positive electrode current collector and/or on the negative electrode current collector on the frame member and in a gap between the frame member and the stack unit, and the step filler is provided so as to obtain 0.3 mm or less of a difference between a thickness at a portion where the frame member exists, a thickness at a portion between the portion where the frame member exists and a portion where the stack unit exists, and a thickness at the portion where the stack unit exists.

[Various Aspects of an Electrode for a Lithium Ion Cell and a Lithium Ion Cell]

Hereinafter, there will be explained various aspects of an electrode for a lithium ion cell and a lithium ion cell.

In recent years, in order to protect the environment, there has been an urgent need to reduce carbon dioxide emissions. In the automobile industry, there have been high expectations for the reduction in carbon dioxide emissions through the introduction of electric vehicles (EVs) and hybrid electric vehicles (HEVs), and the development of secondary cells for motor drive, which serves as a key to practical use of these vehicles, has been being conducted intensively. As the secondary cells, attention has been paid to lithium ion cells (also referred to as lithium-ion secondary cells), which are capable of achieving high energy density and high power density.

Among the materials constituting the lithium ion cells, as the separator that is a member for preventing a short circuit between a positive electrode and a negative electrode, a separator using a porous polyolefin film as a base material is often used from the viewpoint of safety. The porous polyolefin film has a function of increasing the internal resistance of the cell by melting and blocking pores when the cell generates heat suddenly due to a short circuit or overcharging, thereby improving the safety of the cell (shutdown function).

On the other hand, the porous polyolefin film, which is the base material of the separator, forms a porous structure by stretching, so that it has a property of causing shrinking and deforming (to be also referred to as thermal deformation below) when heated above a certain temperature (a shrinking temperature). Therefore, the heat generated by the use of the cell or the heat applied during the manufacture of the cell could cause the temperature of the separator base material to exceed the above-described shrinking temperature to cause the thermal deformation, which could result in occurrence of an internal short circuit.

As a separator capable of preventing the internal short circuit due to thermal deformation, a separator made of a separator body and a frame member arranged annularly along the outer periphery of the separator body has been disclosed (see Patent Literature 5 (Japanese Laid-open Patent Publication No. 2019-053877)).

Patent Literature 5 (Japanese Laid-open Patent Publication No. 2019-053877) has disclosed, as a method of manufacturing the separator, a process including: a process of molding a material to be a frame member into a film form; a process of cutting the frame member into a predetermined shape; and a process of bonding the frame member to the separator body. However, there was room for improvement in terms of manufacturing cost due to the problems of scrap materials being produced in the process of cutting the film-shaped material to be the frame member into a predetermined shape (frame shape) and the bonding process itself being complicated. In addition, there was also a problem that it was not easy to recycle the scrap materials because of the frame member made by bonding the film-shaped materials together being a composite material of a heat-resistant annular support member and a seal layer.

These various aspects have been made in consideration of the above-described problems, and an object thereof is to provide an electrode for a lithium ion cell and a lithium ion cell that enable the suppression of manufacturing costs.

These various aspects relate to an electrode for a lithium ion cell including a current collector, an electrode composition containing electrode active material particles arranged on the above-described current collector, and a frame member arranged on the above-described current collector and annularly arranged to surround the periphery of the above-described electrode composition, in which the above-described frame member is made of polyolefin having a melting point of 75 to 90° C., and a lithium ion cell including the electrode for a lithium ion cell in the present invention.

The electrode for a lithium ion cell and the lithium ion cell in these various aspects enable the suppression of manufacturing costs.

Hereinafter, when referring to the lithium ion cell, the concept includes a lithium-ion secondary cell.

[Electrode for a Lithium Ion Cell]

The following electrode for a lithium ion cell in one aspect includes a current collector, an electrode composition containing electrode active material particles arranged on the above-described current collector, and a frame member arranged on the above-described current collector and annularly arranged to surround the periphery of the above-described electrode composition, in which the above-described frame member is made of polyolefin having a melting point of 75 to 90° C.

Since the frame member is made of polyolefin having a melting point of 75 to 90° C., the following electrode for a lithium ion cell in one aspect can be operated at low temperature when the electrode is bonded to the separator and the current collector to prepare the lithium ion cell. Further, since the frame member is made of a single material of polyolefin having a melting point of 75 to 90° C., the material bonding process is no longer required when preparing the frame member. In addition, since the frame member is made of a single material, even when scrap materials are produced, recycling the scrap materials is easy. Further, the frame member can also be prepared by integral molding such as injection molding, which does not produce scrap materials. For these reasons, the electrode for a lithium ion cell is excellent in manufacturing cost.

When the melting point of the polyolefin constituting the frame member is less than 75° C., the mechanical strength of the frame member may decrease within a range of a normal operating temperature of the lithium ion cell. On the other hand, when the melting point of the polyolefin constituting the frame member exceeds 90° C., high temperature conditions will be required for adhesion when manufacturing the lithium ion cell using the electrode for a lithium ion cell. Incidentally, the melting point of polyolefin is measured by differential scanning calorimetry in accordance with JIS K7121-1987.

Incidentally, the single material means that it can be treated as one material in the manufacturing process. In other words, the polyolefin having a melting point of 75 to 90° C. may be a polymer of two or more monomers. Further, the polyolefin having a melting point of 75 to 90° C. may also be a mixture of two or more polyolefins with different compositions.

Figure 32:
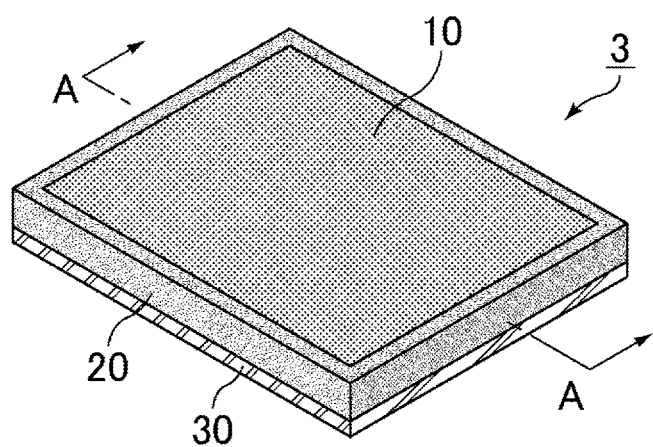
FIG. 32 is a perspective view schematically illustrating one example of an electrode for a lithium ion cell.
Figure 33:
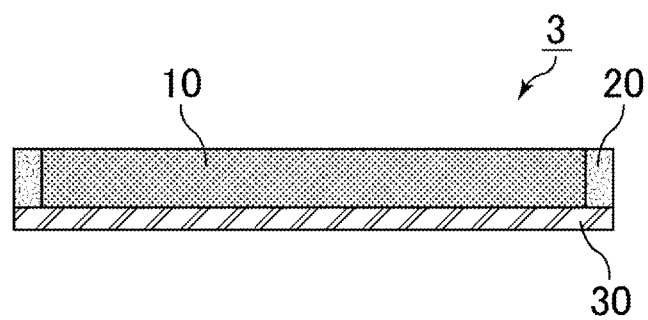
FIG. 33 is a cross-sectional view taken along an A-A line in FIG. 32.

FIG. 32 is a perspective view schematically illustrating one example of the electrode for a lithium ion cell of the present invention, and FIG. 33 is a cross-sectional view taken along an A-A line in FIG. 32. As illustrated in FIG. 32, an electrode 3 for a lithium ion cell includes a current collector 30, an electrode composition 10 containing electrode active material particles arranged on the current collector 30, and a frame member 20 arranged on the current collector 30 and is annularly arranged to surround the periphery of the electrode composition 10. The frame member 20 has a square outer shape and a square inner shape. The electrode composition 10 is arranged inside the inner shape of the frame member 20.

The distance between the outer shape and the inner shape of the frame member when viewed from the top is also referred to as the width of the frame member. The width of the frame member is not particularly limited, but it is preferably 5 to 20 mm. When the width of the frame member is less than 5 mm, due to insufficient mechanical strength of the frame member, the electrode composition leaks out of the frame member in some cases. On the other hand, when the width of the frame member exceeds 20 mm, the proportion of the electrode composition decreases and the energy density decreases in some cases. Depending on the shape of the frame member, the frame member may have a wide portion and a narrow portion.

The polyolefin having a melting point of 75 to 90° C. may be one having polar groups in the molecule or one having no polar groups. Examples of the polar group include a hydroxy group (—OH), a carboxyl group (—COOH), a formyl group (—CHO), a carbonyl group (═CO), an amino group (—NH$_2$), a thiol group (—SH), a 1,3-dioxo-3-oxypropylene group, and so on. Whether the polyolefin has polar groups can be confirmed by analyzing the polyolefin by Fourier transform infrared spectroscopy (FT-IR) or nuclear magnetic resonance spectroscopy (NMR).

As the polyolefin having a melting point of 75 to 90° C., there can be cited MELTHENE (registered trademark) G (melting point: 77° C.) manufactured by Tosoh Corporation, ADMER XE070 (melting point: 84° C.) manufactured by Mitsui Chemicals, Inc., and so on. MELTHENE (registered trademark) G manufactured by Tosoh Corporation is an example of a resin having polar groups, and ADMER XE070 manufactured by Mitsui Chemicals, Inc. is an example of a resin having no polar groups.

In addition to the polyolefin having a melting point of 75 to 90° C., the frame member may contain a nonconductive filler. As the nonconductive filler, there can be cited inorganic fibers such as glass fibers and inorganic particles such as silica particles.

The thickness of the frame member is not particularly limited, but it is preferably 0.1 to 10 mm.

The electrode composition contains the electrode active material particles and may contain, as necessary, a conductive aid, an electrolytic solution, a well-known solution-drying binder for electrodes (also referred to as a binding agent), an adhesive resin, and so on. However, it is preferable that the electrode composition should not contain the well-known binder for electrodes, and preferably contains the adhesive resin.

As the electrode active material particles, positive electrode active material particles or negative electrode active material particles are cited. The electrode composition in the case where the positive electrode active material particles are used as the electrode active material particles is also referred to as a positive electrode composition, and the electrode for a lithium ion cell is also referred to as a positive electrode for a lithium ion cell. Further, the electrode composition in the case where the negative electrode active material particles are used as the electrode active material particles is also referred to as a negative electrode composition, and the electrode for a lithium ion cell is also referred to as a negative electrode for a lithium ion cell. In addition, the frame member that annularly surrounds the periphery of the positive electrode composition is also referred to as a positive electrode frame member, and the frame member that annularly surrounds the periphery of the negative electrode composition is also referred to as a negative electrode frame member.

Examples of the positive electrode active material particles include particles of composite oxides of lithium and transition metals {composite oxides with one transition metal (such as $LiCoO_2$, $LiNiO_2$, $LiAlMnO_4$, $LiMnO_2$, and $LiMn_2O_4$), composite oxides with two transition metal elements (such as, for example, $LiFeMnO_4$, $LiNi_{1-x}Co_xO_2$, $LiMn_{1-y}Co_yO_2$, $LiNi_{1/3}Co_{1/3}Al_{1/3}O_2$, and $LiNi_{0.8}Co_{0.15}Al_{0.05}O_2$), composite oxides with three or more metal elements [such as, for example, $LiM_aM'_bM''_cO_2$ (where M, M', and M" are different transition metal elements and a+b+c=1 is satisfied, for example, $LiNi_{1/3}Mn_{1/3}Co_{1/3}O_2$)] and so on}, lithium-containing transition metal phosphates (for example, $LiFePO_4$, $LiCoPO_4$, $LiMnPO_4$, and $LiNiPO_4$), transition metal oxides (for example, $MnO_2$ and $V_2O_5$), transition metal sulfides (for example, $MoS_2$ and $TiS_2$), conductive polymers (for example, polyaniline, polypyrrole, polythiophene, polyacetylene and poly-p-phenylene and polyvinylcarbazole), and so on, and two or more of them may be used in combination. Incidentally, the lithium-containing transition metal phosphate may be one in which a part of the transition metal site is replaced with another transition metal.

The volume average particle diameter of the positive electrode active material particles is preferably 0.01 to 100 μm, more preferably 0.1 to 35 μm, and further preferably 2 to 30 μm, from the viewpoint of electric properties of the cell.

Examples of the negative electrode active material particles include particles of carbon-based materials [graphite, non-graphitizable carbon, amorphous carbon, and resin burned bodies (such as, for example, burned and carbonized phenol resin, furan resin, and so on), cokes (such as, for example, pitch coke, needle coke, and petroleum coke), carbon fiber, and so on], silicon-based materials [silicon, silicon oxide (SiOx), silicon-carbon composites (such as carbon particles coated with silicon and/or silicon carbide, silicon particles or silicon oxide particles coated with carbon and/or silicon carbide, and silicon carbide), silicon alloys (such as a silicon-aluminum alloy, a silicon-lithium alloy, a silicon-nickel alloy, a silicon-iron alloy, a silicon-titanium alloy, a silicon-manganese alloy, a silicon-copper alloy, and a silicon-tin alloy), and so on], conductive polymers (such as, for example, polyacetylene and polypyrrole), metals (such as tin, aluminum, zirconium, and titanium), metal oxides (such as titanium oxide and lithium titanium oxide), metal alloys (such as, for example, a lithium-tin alloy, a lithium-aluminum alloy, and a lithium-aluminum-manganese alloy), and so on, mixtures of these with carbon-based materials, and so on. Among the above-described negative electrode active material particles, those that do not contain lithium or lithium ions thereinside may be subjected to a pre-doping process in which some or all of the negative electrode active material particles are pre-doped with lithium or lithium ions in advance.

Among these, from the viewpoint of cell capacity, or the like, the carbon-based materials, the silicon-based materials, and the mixtures thereof are preferred, as the carbon-based material, graphite, non-graphitizable carbon, and amorphous carbon are further preferred, and as the silicon-based material, silicon oxide and silicon-carbon composites are further preferred.

The volume average particle diameter of the negative electrode active material particles is preferably 0.01 to 100 μm, more preferably 0.1 to 20 μm, and further preferably 2 to 10 μm from the viewpoint of electric properties of the cell.

In this description, the volume average particle diameter of the electrode active material particles means the particle diameter at an integrated value of 50% (Dv50) in a particle size distribution determined by the microtrack method (laser diffraction.scattering method). The microtrack method is a method for determining the particle size distribution while using the scattered light obtained by irradiating particles with laser light. Incidentally, for the measurement of the volume average particle diameter, a laser diffraction/scattering particle size distribution analyzer [such as Microtrack manufactured by MicrotracBEL Corp.] can be used.

The conductive aid is selected from materials having electrical conductivity.

Concrete examples of the material include metals [such as nickel, aluminum, stainless steel (SUS), silver, copper, and titanium], carbon [graphite and carbon black (such as acetylene black, ketjen black, furnace black, channel black, and thermal lamp black), and so on], mixtures thereof, and so on, but they are not limited to these. One of these conductive aids may be used alone, or two or more of them may be used in combination. Further, alloys or metal oxides of these may also be used. From the viewpoint of electrical stability, they are preferably aluminum, stainless steel, carbon, silver, copper, titanium, and mixtures thereof, more preferably silver, aluminum, stainless steel, and carbon, and further preferably carbon. Further, these conductive aids may also be one obtained by applying a conductive material (a metal material among the above-described conductive aid materials) around a particle-based ceramic material or a resin material by plating or the like.

The average particle diameter of the conductive aid is not particularly limited, but from the viewpoint of electric properties of the cell, it is preferably 0.01 to 10 μm, more preferably 0.02 to 5 μm, and further preferably 0.03 to 1 μm. Incidentally, in this description, the term "particle diameter" means the largest distance L between any two points on a contour line of the conductive aid. As the value of "average particle diameter," there is employed a value calculated as the average value of particle diameters of particles observed in several to several dozen visual fields using an observation means such as a scanning electron microscope (SEM) or a transmission electron microscope (TEM).

The shape (form) of the conductive aid is not limited to the particle form, but may be a form other than the particle form, and may be a form that has been put to practical use as what is called a filler-based conductive material, such as carbon nanotubes.

The conductive aid may be a conductive fiber having a fibrous shape.

Examples of the conductive fiber include carbon fibers such as PAN carbon fibers and pitch carbon fibers, a conductive fiber made by uniformly dispersing a highly conductive metal or graphite in a synthetic fiber, a metal fiber made by fiberizing a metal such as stainless steel, a conductive fiber made by coating a surface of an organic fiber with a metal, a conductive fiber made by coating a surface of an organic material with a resin containing a conductive substance, and so on. Among these conductive fibers, the carbon fiber is preferred. Further, a polypropylene resin kneaded with graphene is also preferred. In the case of the conductive aid being the conductive fiber, its average fiber diameter is preferably 0.1 to 20 μm.

The positive electrode active material particles and the negative electrode active material particles may be coated electrode active material particles having at least a part of their surfaces coated with a coating layer containing a polymer compound. When the periphery of the electrode active material particles is coated with the coating layer, the change in volume of the electrode composition is mitigated, thereby making it possible to suppress the expansion of the electrode. Furthermore, the wettability of the coated electrode active material particles to nonaqueous solvents can be improved, and the time required for the process of allowing the electrode composition to absorb the electrolytic solution can be shortened. Incidentally, the coated electrode active material particles in the case where the positive electrode active material particles are used as the electrode active material particles are also referred to as coated positive electrode active material particles. Further, the coated electrode active material particles in the case where the negative electrode active material particles are used as the electrode active material particles are also referred to as coated negative electrode active material particles.

As the polymer compound that is a material of the coating layer, the one described in Japanese Laid-open Patent Publication No. 2017-054703 as a resin for coating nonaqueous secondary cell active materials can be suitably used.

There is explained a method of producing the above-described coated electrode active material particles. The coated electrode active material particles may be produced, for example, by mixing a polymer compound, electrode active material particles, and a conductive agent to be used as necessary, in the case of using a conductive agent for the coating layer, the coated electrode active material particles may be produced by mixing a polymer compound and the conductive agent to prepare a coating material and then mixing the coating material and electrode active material particles, or the coated electrode active material particles may be produced by mixing a polymer compound, a conductive agent, and electrode active material particles. Incidentally, when mixing the electrode active material particles, the polymer compound, and the conductive agent, the mixing order is not particularly limited, but it is preferable that after mixing the electrode active material particles and polymer compound, the conductive agent should be added to the mixture and the resultant mixture should be further mixed. By the above-described method, at least a part of the surfaces of the electrode active material particles is coated with the coating layer containing the polymer compound and the conductive agent to be used as necessary.

As the conductive agent, which is an arbitrary component of the coating material, the same one as the conductive aid constituting the electrode composition can be suitably used.

As the electrolytic solution, a well-known electrolytic solution containing an electrolyte and a nonaqueous solvent, which is used in the manufacture of lithium ion cells, can be used.

As the electrolyte, those used in well-known electrolytic solutions, and so on can be used, and preferred examples thereof include inorganic acid lithium salt-based electrolytes such as $LiPF_6$, $LiBF_4$, $LiSbF_6$, $LiAsF_6$, and $LiClO_4$, sulfonylimide-based electrolytes having a fluorine atom such as $LiN(FSO_2)_2$, $LiN(CF_3SO_2)_2$, and $LiN(C_2F_5SO_2)_2$, sulfonylmethide-based electrolytes having a fluorine atom such as $LiC(CF_3SO_2)_3$, and so on. Among these, from the viewpoints of cell power output and charge-discharge cycle characteristics, $LiPF_6$ or $LiN(FSO_2)_2$ is preferred.

As the nonaqueous solvent, nonaqueous solvents used in well-known electrolytic solutions, and so on can be used, and for example, a lactone compound, a cyclic or chain carbonic acid ester, a chain carboxylic acid ester, a cyclic or chain ether, a phosphoric acid ester, a nitrile compound, an amide compound, a sulfone, a sulfolane, and so on and mixtures thereof can be used.

Examples of the lactone compound include five-membered rings (such as γ-butyrolactone and γ-valerolactone), six-membered ring lactone compounds (such as δ-valerolactone), and so on.

Examples of the cyclic carbonic acid ester include propylene carbonate, ethylene carbonate, butylene carbonate, and so on. As the chain carbonic acid ester, there can be cited dimethyl carbonate, methyl ethyl carbonate, diethyl carbonate, methyl-n-propyl carbonate, ethyl-n-propyl carbonate, di-n-propyl carbonate, and so on.

Examples of the chain carboxylic acid ester include methyl acetate, ethyl acetate, propyl acetate, methyl propionate, and so on. As the cyclic ether, there can be cited tetrahydrofuran, tetrahydropyran, 1,3-dioxolane, 1,4-dioxane, and so on. As the chain ether, there can be cited dimethoxymethane, 1,2-dimethoxyethane, and so on.

Examples of the phosphoric acid ester include trimethyl phosphate, triethyl phosphate, ethyl dimethyl phosphate, diethyl methyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphosphoran-2-one, 2-trifluoroethoxy-1,3,2-dioxaphosphoran-2-one, 2-methoxyethoxy-1,3,2-dioxaphosphoran-2-one, and so on. Examples of the nitrile compound include acetonitrile, and so on. Examples of the amide compound include DMF, and so on. Examples of the sulfone include dimethyl sulfone, diethyl sulfone, and so on. One of the nonaqueous solvents may be used alone, or two or more of them may be used in combination.

Among the nonaqueous solvents, from the viewpoints of cell power output and charge-discharge cycle characteristics, the lactone compound, the cyclic carbonic acid ester, the chain carbonic acid ester, and the phosphoric acid ester are preferred, and the lactone compound, the cyclic carbonic acid ester, and the chain carbonic acid ester are further preferred, and a mixed solution of the cyclic carbonic acid ester and the chain carbonic acid ester is particularly preferred. A mixed solution of the ethylene carbonate (EC) and the dimethyl carbonate (DMC), or a mixed solution of the ethylene carbonate (EC) and the diethyl carbonate (DEC) is most preferred.

As the well-known solution-drying binder for electrodes, there can be cited starch, polyvinylidene fluoride (PVdF), polyvinyl alcohol (PVA), carboxymethyl cellulose (CMC), polyvinyl pyrolidone (PVP), polytetrafluoroethylene (PTFE), styrene-butadiene rubber (SBR), polyethylene (PE), polypropylene (PP), and so on. However, the content of the well-known binder for electrodes is preferably 2% by weight or less and more preferably 0 to 0.5% by weight, based on the weight of the entire electrode composition.

It is preferable that the electrode composition should contain an adhesive resin in place of the well-known binder for electrodes. In the case where the electrode composition contains the above-described well-known solution-drying binder for electrodes, the electrode composition needs to be integrated by performing a drying process after a compression molded body is formed, but when the electrode composition contains the adhesive resin, the electrode composition can be integrated by slight pressure at room temperature without performing a drying process. This is preferable because no shrinkage or cracking of the compression molded body due to heating occurs when no drying process is performed.

Incidentally, the solution-drying binder for electrodes means a binder that dries and solidifies by volatilizing a solvent component, thereby firmly fixing electrode active material particles to each other. On the other hand, the adhesive resin means a resin that has adhesiveness (properties that allow adhesion by applying slight pressure without the use of water, solvent, heat, or the like). The solution-drying binder for electrodes and the adhesive resin are different materials.

As the adhesive resin, there can be suitably used one prepared by mixing a small amount of an organic solvent with the polymer compound constituting the coating layer (the resin for coating nonaqueous secondary cell active materials, described in Japanese Laid-open Patent Publication No. 2017-054703, or the like) and adjusting the glass transition temperature of the mixture to room temperature or less and one described as an adhesive in Japanese Laid-open Patent Publication No. 10-255805, or the like.

The weight ratio of the adhesive resin contained in the electrode composition is preferably 0 to 2% by weight based on the weight of the electrode composition.

As the material constituting the current collector, there can be cited copper, aluminum, titanium, stainless steel, nickel, and their alloys, and baked carbon, a conductive polymer material, conductive glass, and so on. Further, a resin current collector made of a conductive agent and a resin may be used. From the viewpoint of increasing the bonding strength with the frame member, it is preferably the resin current collector.

The current collector in the case where the electrode composition to be arranged on the current collector is a positive electrode composition containing positive electrode active material particles is also referred to as a positive electrode current collector. Further, the current collector in the case where the electrode composition to be arranged on the current collector is a negative electrode composition containing negative electrode active material particles is also referred to as a negative electrode current collector.

For both the positive electrode current collector and the negative electrode current collector, the same one as the conductive aid contained in the electrode composition can be suitably used as the conductive agent constituting the resin current collector. Examples of the resin constituting the resin current collector include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethyl acrylate (PMA), polymethyl methacrylate (PMMA), polyvinylidene fluoride (PVdF), epoxy resin, silicone resin, mixtures thereof, and so on. From the viewpoint of electrical stability, polyethylene (PE), polypropylene (PP), polymethylpentene (PMP), and polycycloolefin (PCO) are preferred, and polyethylene (PE), polypropylene (PP), and polymethylpentene (PMP) are further preferred.

The resin constituting the resin current collector preferably corresponds in polarity to the resin constituting the frame member. That is, in the case where the resin constituting the frame member has a polar group, the resin constituting the resin current collector also has a polar group preferably. Conversely, in the case where the resin constituting the frame member does not have a polar group, the resin constituting the resin current collector does not also have a polar group preferably.

[Manufacturing Method of the Electrode for a Lithium Ion Cell]

As a method of manufacturing the electrode for a lithium ion cell, for example, there can be cited a method including the following steps: molding polyolefin having a melting point of 75 to 90° C. into an annular shape to obtain a frame member; arranging the above-described frame member on a current collector; and filling an electrode composition containing electrode active material particles into the inside of the above-described frame member.

In the above-described method, a single material of polyolefin having a melting point of 75 to 90° C. is used for the material constituting the frame member, and thus, the material bonding process is no longer required when preparing the frame member. In addition, since the frame member is made of a single material, recycling scrap materials is easy, and the frame member can be prepared by integral molding such as injection molding, which does not produce scrap materials.

Examples of the method of molding polyolefin into an annular shape include a method of punching the polyolefin once molded into a film into an annular shape, and a method such as injection molding. In the case where the polyolefin molded into a film is punched into an annular shape, due to scrap materials being made of a single material, recycling is easy and recyclability is excellent. The injection molding produces a small amount of scrap material such as runners, but due to the scrap material being made of a single material, recycling is easy and recyclability is excellent.

The method of molding polyolefin having a melting point of 75 to 90° C. into a film form is not particularly limited, but examples thereof include extrusion molding, an inflation method, a T-die method, a solution casting method, a colander method, and so on. The film obtained by these methods may be stretched or the like as necessary. The stretching may be uniaxial stretching or biaxial stretching. Further, a commercially available film may be cut into predetermined shapes and used.

The method of filling the electrode composition containing the electrode active material particles into the inside of the frame member is not particularly limited, but examples thereof include a method of arranging the frame member so as to provide a bottom surface in a space formed by the frame member and filling the electrode composition containing the electrode active material particles into the space.

[Lithium Ion Cell]

Then, there is explained the lithium ion cell in these various aspects. The lithium ion cell includes the electrode for a lithium ion cell.

As described above, there are two types of the electrode for a lithium ion cell: a positive electrode for a lithium ion cell and a negative electrode for a lithium ion cell, depending on the type of the electrode active material particles. Therefore, the lithium ion cell only needs to include at least one of the positive electrode for a lithium ion cell and the negative electrode for a lithium ion cell, which are the electrodes for a lithium ion cell.

The following is an explanation of, as the first aspect, the case of having both the positive electrode for a lithium ion cell and the negative electrode for a lithium ion cell, as the second aspect, the case of having only the positive electrode for a lithium ion cell, and as the third aspect, the case of having only the negative electrode for a lithium ion cell.

The first aspect of the lithium ion cell is a lithium ion cell including: a positive electrode for a lithium ion cell having a positive electrode current collector, a positive electrode composition containing positive electrode active material particles arranged on the above-described positive electrode current collector, and a positive electrode frame member arranged on the above-described positive electrode current collector and annularly arranged to surround the periphery of the above-described positive electrode composition; a negative electrode for a lithium ion cell having a negative electrode current collector, a negative electrode composition containing negative electrode active material particles arranged on the above-described negative electrode current collector, and a negative electrode frame member arranged on the above-described negative electrode current collector and annularly arranged to surround the periphery of the above-described negative electrode composition; and a separator arranged between the above-described positive electrode composition and the above-described negative electrode composition and bonded to the above-described positive electrode frame member and the above-described negative electrode frame member, in which the above-described positive electrode frame member bonds the above-described positive electrode current collector and the above-described separator, the above-described negative electrode frame member bonds the above-described negative electrode current collector and the above-described separator, and the above-described positive electrode frame member and the above-described negative electrode frame member are both made of polyolefin having a melting point of 75 to 90° C.

In the first aspect of the lithium ion cell, the positive electrode frame member that is annularly arranged to surround the periphery of the positive electrode composition and the negative electrode frame member that is annularly arranged to surround the periphery of the negative electrode composition are both made of polyolefin having a melting point of 75 to 90° C. Therefore, when the positive electrode for a lithium ion cell and the negative electrode for a lithium ion cell are bonded to the separator and the current collector to prepare the lithium ion cell, operation at low temperature is possible. Further, since the positive electrode frame member and the negative electrode frame member are both made of a single material of polyolefin having a melting point of 75 to 90° C., the material bonding process is no longer required when preparing the frame member. In addition, since the frame member is made of a single material, even if scrap materials are produced, recycling the scrap materials is easy. Furthermore, the frame member can be prepared by integral molding such as injection molding, which is less likely to produce scrap materials. For the above reasons, the first aspect of the lithium ion cell enables the suppression of the manufacturing cost.

Figure 34:
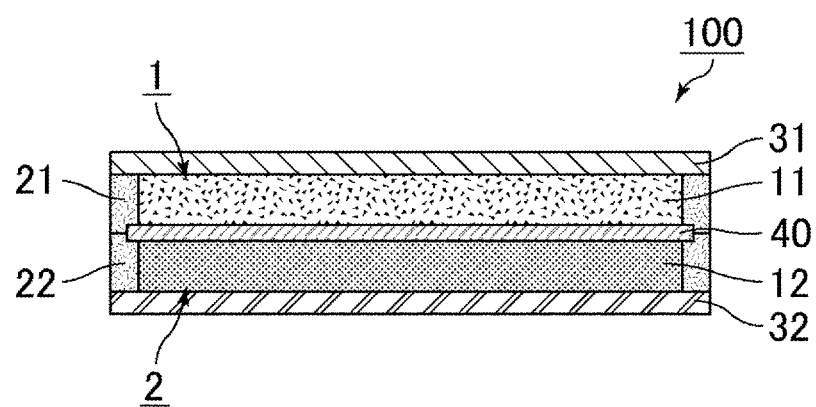
FIG. 34 is a cross-sectional view schematically illustrating one example of a lithium ion cell.

FIG. 34 is a cross-sectional view schematically illustrating one example of the first aspect of the lithium ion cell of the present invention. As illustrated in FIG. 34, in a lithium ion cell 100, a positive electrode composition 11 containing positive electrode active material particles and a negative electrode composition 12 containing negative electrode active material particles are arranged to face each other with a separator 40 arranged therebetween. A positive electrode frame member 21 is annularly arranged around the positive electrode composition 11 to surround the periphery of the positive electrode composition 11. A negative electrode frame member 22 is annularly arranged around the negative electrode composition 12 to surround the periphery of the negative electrode composition 12.

One principal surface of the positive electrode composition 11 is in contact with the separator 40, and the other principal surface is in contact with the positive electrode current collector 31. The positive electrode current collector 31 and the separator 40 are bonded by the positive electrode frame member 21. One principal surface of the negative electrode composition 12 is in contact with the separator 40, and the other principal surface is in contact with the negative electrode current collector 32. The negative electrode current collector 32 and the separator 40 are bonded by the negative electrode frame member 22.

The positive electrode for a lithium ion cell and the negative electrode for a lithium ion cell that form the first aspect of the lithium ion cell are one example of the electrode for a lithium ion cell.

Various materials that constitute the lithium ion cell are explained in the items of the electrode for a lithium ion cell and the manufacturing method of the lithium ion cell using the electrode for a lithium ion cell.

The second aspect of the lithium ion cell is a lithium ion cell including: a positive electrode for a lithium ion cell having a positive electrode current collector, a positive electrode composition containing positive electrode active material particles arranged on the above-described positive electrode current collector, and a positive electrode frame member arranged on the above-described positive electrode current collector and annularly arranged to surround the periphery of the above-described positive electrode composition; a negative electrode for a lithium ion cell having a negative electrode current collector and a negative electrode composition containing negative electrode active material particles arranged on the above-described negative electrode current collector; and a separator arranged between the above-described positive electrode composition and the above-described negative electrode composition and bonded to the above-described positive electrode frame member, in which a plan view shape of the above-described positive electrode frame member is larger than a plan view shape of the above-described separator, the above-described positive electrode frame member bonds the above-described positive electrode current collector and the above-described separator, the above-described positive electrode frame member protruding outward from the above-described separator bonds the above-described positive electrode current collector and the above-described negative electrode current collector, and the above-described positive electrode frame member is made of polyolefin having a melting point of 75 to 90° C.

In the second aspect of the lithium ion cell, the positive electrode frame member that is annularly arranged to surround the periphery of the positive electrode composition is made of polyolefin having a melting point of 75 to 90° C. Therefore, when the positive electrode for a lithium ion cell and the negative electrode for a lithium ion cell are bonded to the separator and the current collector to prepare the lithium ion cell, operation at low temperature is possible. Further, since the positive electrode frame member is made of a single material of polyolefin having a melting point of 75 to 90° C., the material bonding process is no longer required when preparing the frame member. In addition, since the frame member is made of a single material, even if scrap materials are produced, recycling the scrap materials is easy. Furthermore, the frame member can be prepared by integral molding such as injection molding, which is less likely to produce scrap materials. Furthermore, the process of preparing the negative electrode frame member is no longer required, enabling a reduction in manufacturing cost. For the above reasons, the second aspect of the lithium ion cell enables the suppression of the manufacturing cost.

Incidentally, not including the negative electrode frame member, the negative electrode for a lithium ion cell that forms the second aspect of the lithium ion cell is not the negative electrode for a lithium ion cell.

The second aspect of the lithium ion cell has the same composition as the first aspect of the lithium ion cell, except that in place of the negative electrode current collector and the separator being bonded by the negative electrode frame member, the negative electrode current collector is bonded to the positive electrode current collector by the positive electrode frame member protruding outward from the separator.

The third aspect of the lithium ion cell is a lithium ion cell including: a negative electrode for a lithium ion cell having a negative electrode current collector, a negative electrode composition containing negative electrode active material particles arranged on the above-described negative electrode current collector, and a negative electrode frame member arranged on the above-described negative electrode current collector and annularly arranged to surround the periphery of the above-described negative electrode composition; a positive electrode for a lithium ion cell having a positive electrode current collector and a positive electrode composition containing positive electrode active material particles arranged on the above-described positive electrode current collector; and a separator arranged between the above-described positive electrode composition and the above-described negative electrode composition and bonded to the above-described negative electrode frame member, in which a plan view shape of the above-described negative electrode frame member is larger than a plan view shape of the above-described separator, the above-described negative electrode frame member bonds the above-described negative electrode current collector and the above-described separator, the above-described negative electrode frame member protruding outward from the above-described separator bonds the above-described negative electrode current collector and the above-described positive electrode current collector, and the above-described negative electrode frame member is made of polyolefin having a melting point of 75 to 90° C.

In the third aspect of the lithium ion cell, the negative electrode frame member that is annularly arranged to surround the periphery of the negative electrode composition is made of polyolefin having a melting point of 75 to 90° C. Therefore, when the positive electrode for a lithium ion cell and the negative electrode for a lithium ion cell are bonded to the separator and the current collector to prepare the lithium ion cell, operation at low temperature is possible. Further, since the negative electrode frame member is made of a single material of polyolefin having a melting point of 75 to 90° C., the material bonding process is no longer required when preparing the frame member. In addition, since the frame member is made of a single material, even if scrap materials are produced, recycling the scrap materials is easy. Furthermore, the frame member can be prepared by integral molding such as injection molding, which is less likely to produce scrap materials. Furthermore, the process of preparing the positive electrode frame member is no longer required, enabling a reduction in manufacturing cost.

For the above reasons, the third aspect of the lithium ion cell enables the suppression of the manufacturing cost. Incidentally, not including the positive electrode frame member, the positive electrode for a lithium ion cell that forms the third aspect of the lithium ion cell is not the positive electrode for a lithium ion cell.

The third aspect of the lithium ion cell has the same composition as the first aspect of the lithium ion cell, except that in place of the positive electrode current collector and the separator being bonded by the positive electrode frame member, the negative electrode current collector is bonded to the positive electrode current collector by the negative electrode frame member protruding outward from the separator.

[Manufacturing Method of the Lithium Ion Cell]

As a method of manufacturing the lithium ion cell, there can be cited a method in which, for example, the positive electrode for a lithium ion cell of the present invention, the separator, and the negative electrode for a lithium ion cell of the present invention are stacked so as to make the positive electrode composition and the negative electrode composition face each other with the separator arranged therebetween, to then be thermally compression-bonded, and thereby the positive electrode current collector and the separator are bonded by the positive electrode frame member, the negative electrode current collector and the separator are bonded by the negative electrode frame member, and the resultant stack is housed in a cell outer housing as necessary.

FIG. 35 is a cross-sectional view schematically illustrating one example of a method of preparing the first aspect of the lithium ion cell using the electrode for a lithium ion cell. In FIG. 35, the positive electrode 1 for a lithium ion cell including the positive electrode current collector 31, the positive electrode composition 11, and the positive electrode frame member 21 and the negative electrode 2 for a lithium ion cell including the negative electrode current collector 32, the negative electrode composition 12, and the negative electrode frame member 22 are stacked so as to make the positive electrode composition 11 and the negative electrode composition 12 face each other with the separator 40 arranged therebetween to be thermally compression-bonded, and thereby the lithium ion cell 100 is obtained. The lithium ion cell 100 may be housed in a cell outer housing as necessary.

The stacking direction in which the positive electrode for a lithium ion cell, the separator, and the negative electrode for a lithium ion cell are stacked when manufacturing the lithium ion cell is not particularly limited, but it may be such a vertical direction as illustrated in FIG. 35, or may be a horizontal direction. When the positive electrode for a lithium ion cell, the negative electrode for a lithium ion cell, and the separator are stacked in the vertical direction, they are preferably arranged so that the negative electrode for a lithium ion cell is arranged on the upper side. This is because the weight of the negative electrode composition is generally lighter than that of the positive electrode composition and the shape of the negative electrode composition is less likely to be deformed than that of the positive electrode composition when the electrode for a lithium ion cell is turned over while containing a nonaqueous electrolytic solution.

A more concrete example of the manufacturing method of the lithium ion cell illustrated in FIG. 35 is described below. First, the negative electrode for a lithium ion cell is placed so that the negative electrode composition faces upward. Thereafter, the separator is placed in contact with the surface of the negative electrode composition. At this time, the nonaqueous electrolytic solution contained in the negative electrode composition permeates the separator, and at the same time, the separator bonds to the negative electrode composition. With the separator bonding to the negative electrode composition, the negative electrode for a lithium ion cell and the separator are turned over and placed on the positive electrode for a lithium ion cell with the positive electrode composition facing upward, to thereby obtain a stack. Before the separator is brought into contact with the negative electrode for a lithium ion cell and before the negative electrode for a lithium ion cell is placed on the positive electrode for a lithium ion cell, the nonaqueous electrolytic solution may be added to the electrode composition as necessary.

Incidentally, in the method illustrated in FIG. 35, the positive electrode current collector and the negative electrode current collector are bonded by the positive electrode frame member protruding outward from the separator without using the negative electrode frame member, and thereby, the second aspect of the lithium ion cell can be manufactured. Further, in the method illustrated in FIG. 35, the positive electrode current collector and the negative electrode current collector are bonded by the negative electrode frame member protruding outward from the separator without using the positive electrode frame member, and thereby, the third aspect of the lithium ion cell of the present invention can be manufactured.

The polyolefin constituting the positive electrode frame member 21 and the polyolefin constituting the negative electrode frame member 22 may be the same or different.

As another method of manufacturing the lithium ion cell using the electrode for a lithium ion cell, for example, the following method is cited, in which first, the separator is arranged on the positive electrode for a lithium ion cell arranged on the positive electrode current collector and the positive electrode current collector and the separator are thermally compression-bonded, and thereafter, the positive electrode current collector, the positive electrode for a lithium ion cell, and the separator that have been thermally compression-bonded are placed on the negative electrode for a lithium ion cell arranged on the negative electrode current collector with the separator in contact with the negative electrode for a lithium ion cell, and the negative electrode current collector and the separator are thermally compression-bonded. Such a method is particularly effective when the electrode composition has high fluidity and is easily deformed during thermocompression bonding of the electrode for a lithium ion cell and the separator.

Further, as another method, there are cited a method, and so on in which a plurality of cell constitutional units, each of which is obtained by stacking the positive electrode for a lithium ion cell, the separator, and the negative electrode for a lithium ion cell so as to make the positive electrode composition and the negative electrode composition face each other with the separator arranged therebetween, are connected in series or parallel to be housed in a cell outer housing as necessary.

As a method of bonding the current collector and the separator by the frame member, thermocompression-bonding is cited. Since the frame member is made of polyolefin having a melting point of 75 to 90° C., thermocompression-bonding is easy. Further, heating the frame member by a method of ultrasonic heating, laser heating, or the like also enables the current collector and the separator to be bonded by the frame member.

Examples of the separator include well-known separators for lithium ion cells such as a porous film made of polyethylene or polypropylene, a laminated film of a porous polyethylene film and porous polypropylene, a nonwoven fabric made of synthetic fibers (such as polyester fibers and aramid fibers), glass fibers, or the like, and those made by attaching ceramic fine particles such as silica, alumina, or titania to surfaces of these.

Among these, the separator is preferably the porous film made of polypropylene.

The thickness of the separator is not particularly limited, but it is preferably 10 to 1000 μm.

The plan view shape of the separator is preferably smaller than the outer shape of the frame member in plan view, and larger than the outer shape of the electrode composition filled into the inside of the frame member. When the plan view shape of the separator is the shape satisfying the above-described conditions, the separator does not protrude to the outside of the frame member while preventing a short circuit between the positive electrode composition and the negative electrode composition. Therefore, the energy density of the lithium ion cell can be improved.

Example

Next, the present invention will be explained concretely by means of examples, but the present invention is not limited to the examples unless they depart from the scope of the present invention. Incidentally, unless otherwise noted, part(s) means part(s) by weight, and % means % by weight.

Production Example 1: Preparation of a Polymer Compound for Coating and its Solution In a four-neck flask equipped with a stirrer, a thermometer, a reflux cooling tube, a dropping funnel, and a nitrogen gas introduction tube, 407.9 parts of DMF were put and the temperature was raised to 75° C. Then, a monomer blending solution blending 242.8 parts of methacrylic acid, 97.1 parts of methyl methacrylate, 242.8 parts of 2-ethylhexyl methacrylate, and 116.5 parts of DMF and an initiator solution made by dissolving 1.7 parts of 2,2'-azobis(2,4-dimethylvaleronitrile) and 4.7 parts of 2,2'-azobis(2-methylbutyronitrile) in 58.3 parts of DMF were continuously dripped into the four-neck flask over 2 hours with nitrogen blowing into the flask by the dropping funnel under stirring, and radical polymerization was performed. After the dripping was finished, the reaction was continued at 75° C. for 3 hours. Then, the temperature was raised to 80° C., and the reaction was continued for 3 hours to obtain a copolymer solution having a resin concentration of 50%. To the copolymer solution, 789.8 parts of DMF were added to obtain a polymer compound solution for coating having a resin solid concentration of 30% by weight.

Production Example 2: Preparation of an Electrolytic Solution

An electrolytic solution was prepared by dissolving LiN(FSO$_2$)$_2$ in a mixed solvent of ethylene carbonate (EC) and propylene carbonate (PC) (volume ratio 1:1) at a ratio of 1.0 mol/L.

Production Example 3: Preparation of Coated Positive Electrode Active Material Particles In a universal mixer, HIGH SPEED MIXER FS25 [manufactured by EARTHTECHNICA CO., LTD.], 93.7 parts of a positive electrode active material powder (LiNi$_{0.8}$Co$_{0.15}$Al$_{0.05}$O$_2$ powder, volume average particle diameter 4 μm) were put, and with stirring at 720 rpm at room temperature, 1 part of the polymer compound solution for coating obtained in Production example 1 was dripped over 2 minutes and the mixture was further stirred for 5 minutes. Then, with stirring, 1 part of acetylene black [DENKA BLACK (registered trademark) manufactured by Denka Company Limited], which is a conductive agent, was added in 2 minutes while dividing, and stirring was continued for 30 minutes. Thereafter, while stirring was maintained, the pressure was reduced to 0.01 MPa, and then, while stirring and the degree of pressure reduction were maintained, the temperature was raised to 140° C., and stirring, the degree of pressure reduction, and the temperature were maintained for 8 hours, and a volatile component was removed by distillation. A powder thus obtained was classified with a sieve having a mesh size of 212 μm to obtain coated positive electrode active material particles.

Production Example 4: Preparation of Coated Negative Electrode Active Material Particles As the negative electrode active material particles, 100 parts of non-graphitizable carbon [Carbotron (registered trademark) PS (F) manufactured by Kureha Battery Materials Japan Co., Ltd.] were put in a universal mixer, HIGH SPEED MIXER FS25 [manufactured by EARTHTECHNICA CO., LTD.], and with stirring at 720 rpm at room temperature, 6 parts of the polymer compound solution for coating obtained in Production example 1 were dripped over 2 minutes and the mixture was further stirred for 5 minutes. Then, with stirring, 5.1 parts of acetylene black [DENKA BLACK (registered trademark) manufactured by Denka Company Limited], which is a conductive agent, were added in 2 minutes while dividing, and stirring was continued for 30 minutes. Thereafter, while stirring was maintained, the pressure was reduced to 0.01 MPa, and then, while stirring and the degree of pressure reduction were maintained, the temperature was raised to 150° C., and stirring, the degree of pressure reduction, and the temperature were maintained for 8 hours, and a volatile component was removed by distillation. A powder thus obtained was classified with a sieve having a mesh size of 212 μm to obtain coated negative electrode active material particles.

Production Example 5: Preparation of a Resin Current Collector A

A resin current collector material was obtained by melt-kneading, in a twin-screw extruder, 65 parts of SunAllomer PL500A [manufactured by SunAllomer Ltd.], 30 parts of [DENKA BLACK Li-400 manufactured by Denka Company Limited], and 5 parts of a dispersing agent under the conditions of 190° C., 100 rpm, and a residence time of 5 minutes. The obtained resin current collector material was extruded from a T-die and rolled with a cooling roll adjusted to 50° C., to thereby obtain a resin current collector A having a film thickness of 100 μm.

Production Example 6: Preparation of a Resin Current Collector B

A resin current collector material was obtained by melt-kneading, in a twin-screw extruder, 65 parts of SunAllomer PM854X [manufactured by SunAllomer Ltd.], 30 parts of [DENKA BLACK Li-400 manufactured by Denka Company Limited], and 5 parts of a dispersing agent under the conditions of 190° C., 100 rpm, and a residence time of 5 minutes. The obtained resin current collector material was extruded from a T-die and rolled with a cooling roll adjusted to 50° C., to thereby obtain a resin current collector B having a film thickness of 100 μm.

Production Example 7: Preparation of a Positive Electrode Frame Member

By extrusion molding, a resin A: MELTHENE (registered trademark) G (melting point: 77° C.) manufactured by Tosoh Corporation was molded into a film form having a thickness of 150 μm or 400 μm, and then the film-formed resin A was punched into an annular shape with an inner shape of 11 mm×11 mm square and an outer shape of 15 mm×15 mm square to obtain a positive electrode frame member.

Production Example 8: Preparation of a Negative Electrode Frame Member

By extrusion molding, a resin B: ADMER XE070 (melting point: 84° C.) manufactured by Mitsui Chemicals, Inc. was molded into a film form having a thickness of 150 μm, and then the film-formed resin B was punched into an annular shape with an inner shape of 11 mm×11 mm square and an outer shape of 15 mm×15 mm square to obtain a negative electrode frame member.

Example 1

<Preparation of a Positive Electrode for a Lithium Ion Cell>

A positive electrode composition was prepared by mixing 95 parts of the coated positive electrode active material particles prepared in Production example 3, 5 parts of acetylene black being a conductive aid, and 30 parts of the electrolytic solution prepared in Production example 2. Then, the positive electrode frame member having a thickness of 150 μm prepared in Production example 7 was placed on the resin current collector A (15 mm×15 mm) prepared in Production example 5 and the positive electrode composition was filled into the inside of the positive electrode frame member, to prepare a positive electrode for a lithium ion cell.

<Preparation of a Negative Electrode for a Lithium Ion Cell>

A negative electrode composition was prepared by mixing 99 parts of the coated negative electrode active material particles prepared in Production example 4, 1 part of acetylene black being a conductive aid, and 30 parts of the electrolytic solution prepared in Production example 2. Then, the negative electrode frame member prepared in Production example 8 was placed on the resin current collector B (15 mm×15 mm) prepared in Production example 6 and the negative electrode composition was filled into the inside of the negative electrode frame member, to prepare a negative electrode for a lithium ion cell.

<Preparation of a Stack>

A flat plate-shaped Celgard 3501 (made of PP, thickness 25 μm, plan view dimensions 13 mm×13 mm), which serves as a separator, was placed on top of the negative electrode composition of the negative electrode for a lithium ion cell so as to cover the negative electrode composition. It was confirmed that the nonaqueous electrolytic solution in the negative electrode composition permeated the separator and the separator was bonded to the negative electrode composition. Then, the separator and the negative electrode for a lithium ion cell were turned over and placed on the positive electrode for a lithium ion cell so as to make the separator come in contact with the positive electrode composition. At this time, a stack was prepared so that the center of gravity based on the outer shape of the positive electrode frame member, the center of gravity based on the outer shape of the separator, and the center of gravity based on the outer shape of the negative electrode frame member overlapped each other in the stacking direction.

<Preparation of a Lithium Ion Cell>

Then, the stack was heated at 120° C. by using a heat seal tester to thermally compression-bond the positive electrode current collector and the separator by the positive electrode frame member and thermally compression-bond the negative electrode current collector and the separator by the negative electrode frame member, to thereby prepare a lithium ion cell according to Example 1.

<Evaluation of Manufacturing Process>

Low-temperature adhesiveness, a peel strength, process shortening of frame member preparation, and recyclability in the manufacturing process of the lithium ion cell according to Example 1 were evaluated based on the following criteria. The results are illustrated in Table 2

[Low-Temperature Adhesiveness]

○: Thermocompression bonding is possible on both the positive electrode side and the negative electrode side at less than 120° C.

Δ: Thermocompression bonding is possible on both the positive electrode side and the negative electrode side at 120° C. or more and 150° C. or less.

x: Thermocompression bonding is possible on both the positive electrode side and the negative electrode side at temperatures greater than 150° C.

[Peel Strength]

Using the current collectors, the frame members, and the separator used in Example 1, a measurement sample having a length of 60 mm and a width of 10 mm was prepared in which the entire surface of the current collectors and the separator was thermally compression-bonded by the frame members. The measurement sample was set in Autograph "AGS-X" manufactured by Shimadzu Corporation using a 90-degree peel test stand as a jig, and the 90-degree peel adhesion strength was measured at a tensile speed of 1.3 mm/min in accordance with JIS K 6854-1: 1999. From the peel strength between the positive electrode current collector and the separator (positive electrode peel strength) and the peel strength between the negative electrode current collector and the separator (negative electrode peel strength), determinations were made based on the following criteria.

⊚: Both the positive electrode peel strength and the negative electrode peel strength are 2.5 N/10 mm or more.

○: One of the positive electrode peel strength and the negative electrode peel strength is 2.5 N/10 mm or more, and the other is 2.0 N/10 mm or more and less than 2.3 N/10 mm Δ: Both the positive electrode peel strength and the negative electrode peel strength are 2.0 N/10 mm or more and less than 2.3 N/10 mm.

x: Both the positive electrode peel strength and the negative electrode peel strength are less than 2.0 N/10 mm.

[Process Shortening of the Frame Member Preparation]

⊚: The bonding process and the punching process are not required.

○: The bonding process is required, but scrap materials are produced by the punching process.

x: The bonding process is required and scrap materials are produced by the punching process.

[Recyclability]

⊚: All produced scrap materials can be recycled.

○: Some of the produced scrap materials can be recycled by sorting them by resin.

x: Recycling is impossible because produced scrap materials cannot be sorted by resin.

Examples 2 to 3

The electrode for a lithium ion cell (positive electrode), the electrode for a lithium ion cell (negative electrode), and the lithium ion cell were prepared by the same procedure as in Example 1, except that the combination of the frame members was changed as illustrated in Table 2, and the low-temperature adhesiveness, the peel strength, the process shortening of the frame member preparation, and the recyclability in the manufacturing process were evaluated. The results are illustrated in Table 2. Incidentally, the lithium ion cells according to Examples 1 to 3 are the lithium ion cell including the electrode for a lithium ion cell provided with the positive electrode frame member and the negative electrode for a lithium ion cell provided with the negative electrode frame member, and thus correspond to the first aspect of the lithium ion cell of the present invention.

Production Example 9

A film made of a resin D (adhesive resin, melting point: 91° C.) [ADMER VE300 manufactured by Mitsui Chemicals, Inc., thickness: 50 μm] was layered on both surfaces of an extruded film made of a resin C (polyethylene naphthalate, melting point: approx. 250° C.) [PEN film manufactured by TEIJIN LIMITED, Teonex Q51, thickness 250 μm], the resin C and the resin D were bonded by a heating roll, the bonded resin was cut into a 15 mm×15 mm square, and an 11 mm×11 mm region in the center was punched out, to thereby obtain a frame member with the resin D arranged on both surfaces of the resin C.

Production Example 10

A frame member was obtained by the same procedure as in Production example 7, except that the film made of the resin C was replaced with a film made of a resin E (polyetheretherketone, melting point: approx. 330° C.) [PEEK film manufactured by Shin-Etsu Polymer Co., Ltd., Sepla, thickness 50 μm].

Comparative Examples 1 to 2

The electrode for a lithium ion cell (positive electrode), the electrode for a lithium ion cell (negative electrode), and the lithium ion cell were prepared by the same procedure as in Example 1, except that the combination of the frame members was changed as illustrated in Table 2, and the low-temperature adhesiveness, the peel strength, the process shortening of the frame member preparation, and the recyclability in the manufacturing process were evaluated. The results are illustrated in Table 2.

Example 4

A positive electrode frame member having a thickness of 1000 μm was prepared to have the same shape as the pre-punched shape by injection molding by using the resin A: MELTHENE (registered trademark) G (melting point: 77° C.) manufactured by Tosoh Corporation. The obtained positive electrode frame member was used to prepare the positive electrode for a lithium ion cell and the separator was brought into contact with the positive electrode composition of the positive electrode for a lithium ion cell to be bonded thereto, to then be placed on the negative electrode for a lithium ion cell (without the negative electrode frame member) with the negative electrode composition arranged on the negative electrode current collector to be thermally compression-bonded. The separator and the positive electrode current collector were bonded by the positive electrode frame member, and at the same time, by the positive electrode frame member protruding to the outside of the separator, the positive electrode current collector and the negative electrode current collector were bonded to obtain a lithium ion cell. The low-temperature adhesiveness, the peel strength, the process shortening of the frame member preparation, and the recyclability in the manufacturing process were evaluated in the same manner as in Example 1. The results are illustrated in Table 2. However, the measurement sample for measuring the negative electrode peel strength was made by thermally compression-bonding 80% of the center of the positive electrode current collector in the width direction and 80% of the center of the negative electrode current collector in the width direction by the positive electrode frame member. Incidentally, the lithium ion cell according to Example 4 is the lithium ion cell that includes the electrode for a lithium ion cell provided with the positive electrode frame member but does not include the negative electrode frame member, and thus corresponds to the second aspect of the lithium ion cell.

Comparative Example 3

The positive electrode frame member and the positive electrode for a lithium ion cell were prepared in the same manner as in Production example 9 except that in place of the extruded film made of the resin C, an injection-molded body made of the resin C, which has the same plan view shape as the pre-punched shape and a thickness of 900 μm, was used. The obtained positive electrode for a lithium ion cell was used to prepare the lithium ion cell by the method as in Example 4. The low-temperature adhesiveness, the peel strength, the process shortening of the frame member preparation, and the recyclability in the manufacturing process were evaluated in the same manner as in Example 4. The results are illustrated in Table 2.

In the electrode for a lithium ion cell in the above-described one aspect, the electrode active material particles

TABLE 2

| | FRAME MEMBER | | | | | | | |
|---|---|---|---|---|---|---|---|---|
| | POSITIVE ELECTRON SIDE | | | | NEGATIVE ELECTRODE SIDE | | | |
| | RESIN | MELTING POINT [° C.] | THICKNESS [μm] | MOLDING METHOD | RESIN | MELTING POINT [° C.] | THICKNESS [μm] | MOLDING METHOD |
| EXAMPLE 1 | A | 77 | 150 | EXTRUSION | B | 84 | 150 | EXTRUSION |
| EXAMPLE 2 | A | 77 | 400 | | A | 77 | 400 | |
| EXAMPLE 3 | B | 84 | 150 | | B | 84 | 150 | |
| EXAMPLE 4 | A | 77 | 1000 | INJECTION | | | | |
| COMPARATIVE EXAMPLE 1 | C | 250 | 250 | EXTRUSION | E | 330 | 50 | EXTRUSION |
| | D | 91 | 50 | EXTRUSION | D | 91 | 50 | EXTRUSION |
| COMPARATIVE EXAMPLE 2 | C | 250 | 250 | EXTRUSION | C | 250 | 250 | EXTRUSION |
| | D | 91 | 50 | EXTRUSION | D | 91 | 50 | EXTRUSION |
| COMPARATIVE EXAMPLE 3 | C | 250 | 900 | INJECTION | | | | |
| | D | 91 | 50 | EXTRUSION | | | | |

| | EVALUATION | | | | | |
|---|---|---|---|---|---|---|
| | | PEEL STRENGTH | | | | |
| | LOW-TEMPERATURE ADHESIVENESS | POSITIVE ELECTRODE PEEL STRENGTH [N/10 mm] | NEGATIVE ELECTRODE PEEL STRENGTH [N/10 mm] | EVALUATION | PROCESS SHORTENING OF FRAME MEMBER PREPARATION | RECYCLABILITY |
| EXAMPLE 1 | ○ | 2.9 | 2.4 | ○ | ○ | ○ |
| EXAMPLE 2 | ○ | 2.5 | 3.2 | ◉ | ○ | ○ |
| EXAMPLE 3 | ○ | 4.2 | 3.5 | ◉ | ○ | ○ |
| EXAMPLE 4 | ○ | 2.4 | 2.7 | ○ | ◉ | ◉ |
| COMPARATIVE EXAMPLE 1 | × | 0.8 | 1.5 | × | × | × |
| COMPARATIVE EXAMPLE 2 | Δ | 1.2 | 1.7 | × | × | × |
| COMPARATIVE EXAMPLE 3 | Δ | 1.0 | 1.5 | × | × | ○ |

From the results in Table 2, the manufacturing method of the lithium ion cell using the electrode for a lithium ion cell of the present invention has excellent process shortening and high recyclability, thus enabling the suppression of the manufacturing cost. Further, from the results of Example 1 and Example 3, it was confirmed that the positive electrode peel strength was higher when the positive electrode frame member was made of the resin B than when it was made of the resin A. Further, from the results of Example 2 and Example 3, it was confirmed that the negative electrode peel strength was higher when the negative electrode frame member was made of the resin B than when it was made of the resin A. Furthermore, it was confirmed that the lithium ion cell was able to be manufactured without any problems even in the case of using only the positive electrode for a lithium ion cell described above.

The electrode for a lithium ion cell explained above is useful as an electrode for a bipolar secondary cell, a lithium-ion secondary cell, and so on to be used for cellular phones, personal computers, hybrid electric vehicles, and electric vehicles particularly.

As explained above, the electrode for a lithium ion cell in one aspect includes a current collector, an electrode composition containing electrode active material particles arranged on the current collector, and a frame member arranged on the current collector and is annularly arranged to surround the periphery of the electrode composition, in which the frame member is made of polyolefin having a melting point of 75 to 90° C.

In the electrode for a lithium ion cell in the above-described one aspect, the electrode active material particles may be coated electrode active material particles having at least a part of their surfaces coated with a coating layer containing a polymer compound.

The lithium ion cell may be a lithium ion cell including the electrode for a lithium ion cell in the above-described one aspect.

The lithium ion cell in the above-described one aspect may be a lithium ion cell including:

a positive electrode for a lithium ion cell having a positive electrode current collector, a positive electrode composition containing positive electrode active material particles arranged on the positive electrode current collector, and a positive electrode frame member arranged on the positive electrode current collector and annularly arranged to surround the periphery of the positive electrode composition;

a negative electrode for a lithium ion cell having a negative electrode current collector, a negative electrode composition containing negative electrode active material particles arranged on the negative electrode current collector, and a negative electrode frame member arranged on the negative electrode current collector and annularly arranged to surround the periphery of the negative electrode composition; and a separator arranged between the positive electrode composition and the negative electrode composition and bonded to the positive electrode frame member and the negative electrode frame member, in which the positive electrode frame member bonds the positive electrode current collector and the separator, the negative electrode frame member bonds the negative electrode current collector and the separator, and the positive electrode frame member and the negative electrode frame member are both made of polyolefin having a melting point of 75 to 90° C.

The lithium ion cell in the above-described one aspect may be a lithium ion cell including:

a positive electrode for a lithium ion cell having a positive electrode current collector, a positive electrode composition containing positive electrode active material particles arranged on the positive electrode current collector, and a positive electrode frame member arranged on the positive electrode current collector and annularly arranged to surround the periphery of the positive electrode composition;

a negative electrode for a lithium ion cell having a negative electrode current collector and a negative electrode composition containing negative electrode active material particles arranged on the negative electrode current collector; and a separator arranged between the positive electrode composition and the negative electrode composition and bonded to the positive electrode frame member, in which a plan view shape of the positive electrode frame member is larger than a plan view shape of the separator, the positive electrode frame member bonds the positive electrode current collector and the separator, the positive electrode frame member protruding outward from the separator bonds the positive electrode current collector and the negative electrode current collector, and the positive electrode frame member is made of polyolefin having a melting point of 75 to 90° C.

INDUSTRIAL APPLICABILITY

According to the above-explained embodiments, it is possible to provide a cell system capable of suppressing the increase in temperature of a cell and having high industrial applicability while having a simple configuration with a reduced formation region of through holes provided in a lithium ion cell.

The invention claimed is:

1. A cell system, comprising:
a stacked-type cell module including a plurality of lithium ion unit cells being stacked, the lithium ion unit cells each including: a positive electrode that includes a positive electrode current collector containing a resin current collector layer and a positive electrode active material layer containing a positive electrode active material formed on the positive electrode current collector;
a negative electrode that includes a negative electrode current collector containing a resin current collector layer and a negative electrode active material layer containing a negative electrode active material formed on the negative electrode current collector; and
a separator arranged between the positive electrode active material layer and the negative electrode material layer, each lithium ion unit cell of the plurality of lithium ion unit cells having a unit cell through hole penetrating in a stacking direction formed therein, the stacked-type cell module having a through hole formed in the stacking direction by overlapping the unit cell through holes;
a continuous insulating film of a same member that integrally covers a surface of the stacked-type cell module and an inner peripheral surface of the through hole;

a gas supply part that supplies a first gas to the through hole;
a cooling liquid supply part that supplies a cooling liquid to the through hole;
a temperature sensor that detects a temperature of the stacked-type cell module; and
a control part that controls switching between a normal control mode and a high-temperature control mode based on a detection signal output from the temperature sensor, wherein
in the normal control mode, the control part controls the gas supply part to supply the first gas to the through hole and at the same time, controls the cooling liquid supply part to stop supply of the cooling liquid, and
in the high-temperature control mode, the control part controls the cooling liquid supply part to supply the cooling liquid to the through hole to which the first gas is supplied, and at the same time, controls the gas supply part to stop supply of the first gas.

2. The cell system according to claim 1, wherein
the normal control mode is a mode to be executed by the control part when the temperature detected by the temperature sensor is in a first range, and
the high-temperature control mode is a mode to be executed by the control part when the temperature detected by the temperature sensor is in a second range that is higher than the first range.

3. The cell system according to claim 1, further comprising:
a humidity sensor that detects humidity inside the through hole; and
an air compressor that supplies a second gas into the through hole when switching to the normal control mode from the high-temperature control mode, wherein
the control part controls supply of the second gas from the air compressor based on a detection signal output from the humidity sensor.

4. The cell system according to claim 3, wherein
the control part supplies the second gas into the through hole from the air compressor when switching to the normal control mode from the high-temperature control mode, and the control part stops supply of the second gas from the air compressor when determining that the humidity inside the through hole falls within a predetermined range of the humidity of the outside air based on a detection signal output from the humidity sensor.

5. The cell system according to claim 3, wherein
the gas supply part also serves as the air compressor, and the first gas and the second gas are the same gas.

6. The cell system according to claim 1, wherein
the positive electrode current collector and the negative electrode current collector contain a conductive resin composition having a conductive filler, and
the positive electrode active material layer and the negative electrode active material layer contain coated electrode active material particles made of electrode active material particles having at least a part of surfaces thereof coated with a coating material containing a polymer compound.

7. The cell system according to claim 1, further comprising:
a housing part that houses the stacked-type cell module; and
a liquid supply part that supplies a liquid into the housing part, wherein
the control part controls switching to an abnormal control mode based on a detection signal output from the temperature sensor, and in the abnormal control mode, the control part controls supply of the liquid from the liquid supply part so as to make the stacked-type cell module submerged.

8. The cell system according to claim 7, wherein
the liquid supply part includes a liquid cooling tube spirally arranged inside the through hole, and supplies the liquid into the liquid cooling tube.

9. The cell system according to claim 8, wherein
an arrangement density of the liquid cooling tube is the highest at the center portion inside the through hole.

10. The cell system according to claim 1, wherein
the stacked-type cell module includes a battery pack including two or more unit cells, the unit cells each including an annular frame member arranged around the positive electrode active material layer, the separator, and the negative electrode active material layer between the positive electrode current collector and the negative electrode current collector, and
when a set of a stack unit including a positive electrode current collector, a positive electrode active material layer, a separator, a negative electrode active material layer, and a negative electrode current collector stacked in order is defined,
in each of the unit cells composing the battery pack, a difference in thickness between a portion where the frame member exists and a portion where the stack unit exists is 0.3 mm or less, and in each of the unit cells composing the battery pack, a gap between the frame member and the stack unit is 0.5 mm or less.

11. The cell system according to claim 10, wherein
a difference between a total thickness of a thickness of the positive electrode active material layer, a thickness of the separator, and a thickness of the negative electrode active material layer and a thickness of the frame member is 0.3 mm or less.

12. The cell system according to claim 10, wherein
a step filler is provided on the positive electrode current collector and/or on the negative electrode current collector on the frame member and in a gap between the frame member and the stack unit, and
the step filler is provided so as to obtain 0.3 mm or less of a difference between a thickness at the portion where the frame member exists, a thickness at a portion between the portion where the frame member exists and the portion where the stack unit exists, and a thickness at the portion where the stack unit exists.

13. The cell system according to claim 1, wherein
the lithium ion unit cell is a lithium ion unit cell including:
a positive electrode for a lithium ion cell having the positive electrode current collector, a positive electrode composition containing positive electrode active material particles arranged on the positive electrode current collector, and a positive electrode frame member arranged on the positive electrode current collector and annularly arranged to surround the periphery of the positive electrode composition;
a negative electrode for a lithium ion cell having the negative electrode current collector, a negative electrode composition containing negative electrode active material particles arranged on the negative electrode current collector, and a negative electrode frame member arranged on the negative electrode current collector and annularly arranged to surround the periphery of the negative electrode composition; and
a separator arranged between the positive electrode composition and the negative electrode composition and bonded to the positive electrode frame member and the negative electrode frame member,
the positive electrode frame member bonds the positive electrode current collector and the separator,
the negative electrode frame member bonds the negative electrode current collector and the separator, and
the positive electrode frame member and the negative electrode frame member are both made of polyolefin having a melting point of 75 to 90° C.

14. The cell system according to claim 1, wherein
the lithium ion unit cell is a lithium ion unit cell including:
a positive electrode for a lithium ion cell having the positive electrode current collector, a positive electrode composition containing positive electrode active material particles arranged on the positive electrode current collector, and a positive electrode frame member arranged on the positive electrode current collector and annularly arranged to surround the periphery of the positive electrode composition;
a negative electrode for a lithium ion cell having the negative electrode current collector and a negative electrode composition containing negative electrode active material particles arranged on the negative electrode current collector; and
a separator arranged between the positive electrode composition and the negative electrode composition and bonded to the positive electrode frame member,
a plan view shape of the positive electrode frame member is larger than a plan view shape of the separator,
the positive electrode frame member bonds the positive electrode current collector and the separator,
the positive electrode frame member protruding outward from the separator bonds the positive electrode current collector and the negative electrode current collector, and
the positive electrode frame member is made of polyolefin having a melting point of 75 to 90° C.

\* \* \* \* \*